United States Patent
Yin et al.

(10) Patent No.: US 11,820,690 B2
(45) Date of Patent: Nov. 21, 2023

(54) APPARATUS AND METHOD FOR TREATING WASTE WATER CONTAINING AMMONIUM SALTS

(71) Applicants: China Petroleum & Chemical Corporation, Beijing (CN); Sinopec Catalyst Co., Ltd., Beijing (CN)

(72) Inventors: Xiping Yin, Beijing (CN); Ye Li, Beijing (CN); Songyuan Gu, Beijing (CN); Zhijian Liu, Beijing (CN); Tao Wang, Beijing (CN); Jin'ai Gao, Shandong (CN); Yuhua Chen, Shandong (CN); Yan Zhou, Shandong (CN); Ling Yang, Shandong (CN); Zhiwei Yuan, Beijing (CN); Hongliang Yi, Beijing (CN); Tao An, Shandong (CN); Fuzu Liu, Shandong (CN); Zhimin Zhang, Shandong (CN); Shupeng Xu, Shandong (CN); Hongqi Guo, Shandong (CN)

(73) Assignees: China Petroleum & Chemical Corporation, Beijing (CN); Sinopec Catalyst Co., Ltd., Beijing (CN)

( * ) Notice: Subject to any disclaimer, the term of this patent is extended or adjusted under 35 U.S.C. 154(b) by 540 days.

(21) Appl. No.: 17/037,529

(22) Filed: Sep. 29, 2020

(65) Prior Publication Data

US 2021/0017059 A1 Jan. 21, 2021

Related U.S. Application Data

(62) Division of application No. 16/115,167, filed on Aug. 28, 2018, now Pat. No. 10,829,401.

(30) Foreign Application Priority Data

Aug. 28, 2017 (CN) .................. 201710750767.X
Aug. 28, 2017 (CN) .................. 201710751942.7
(Continued)

(51) Int. Cl.
*C02F 9/00* (2023.01)
*C02F 1/22* (2023.01)
(Continued)

(52) U.S. Cl.
CPC ............. *C02F 9/00* (2013.01); *C02F 1/004* (2013.01); *C02F 1/041* (2013.01); *C02F 1/048* (2013.01);
(Continued)

(58) Field of Classification Search
None
See application file for complete search history.

(56) References Cited

U.S. PATENT DOCUMENTS

| | | | | |
|---|---|---|---|---|
| 4,323,430 A | * | 4/1982 | Glassman | ............... B01D 3/38 423/357 |
| 2011/0044879 A1 | | 2/2011 | Soos | |
| 2016/0280571 A1 | | 9/2016 | Mack et al. | |

FOREIGN PATENT DOCUMENTS

| | | |
|---|---|---|
| CN | 1944256 A | 4/2007 |
| CN | 101161596 A | 4/2008 |

(Continued)

OTHER PUBLICATIONS

Wei Song et al., "Evaporative crystallization separation process of mixed salt wastewater from a coal chemical enterprise", Coal Processing & Comprehensive Utilization, No. 4, 2016, pp. 32-33.

*Primary Examiner* — Richard C Gurtowski
(74) *Attorney, Agent, or Firm* — NKL Law; Allen Xue

(57) ABSTRACT

In a method for treating waste water containing ammonium salts, sodium sulfate crystal is obtained by freezing crystal-
(Continued)

lization, then the pH value of the waste water is adjusted to a specific range, and next sodium chloride crystal and ammonia water is obtained by evaporation. Alternatively, the pH value of the waste water is adjusted to a specific range, then sodium chloride crystal and ammonia water is obtained by evaporation, and next sodium sulfate crystal is obtained by freezing crystallization. This method can recover ammonia, sodium sulfate, and sodium chloride from the waste water.

14 Claims, 9 Drawing Sheets

(30) Foreign Application Priority Data

Aug. 28, 2017 (CN) .......................... 201710752394.X
Aug. 28, 2017 (CN) .......................... 201710752805.5

(51) Int. Cl.
  *C02F 1/66* (2023.01)
  *C02F 1/52* (2023.01)
  *C02F 1/38* (2023.01)
  *C02F 101/12* (2006.01)
  *C02F 101/10* (2006.01)
  *C02F 103/34* (2006.01)
  *C02F 1/04* (2023.01)
  *C02F 101/16* (2006.01)
  *C02F 1/00* (2023.01)
  *C02F 1/06* (2023.01)

(52) U.S. Cl.
  CPC  *C02F 1/06* (2013.01); *C02F 1/22* (2013.01); *C02F 1/385* (2013.01); *C02F 1/66* (2013.01); *C02F 2001/5218* (2013.01); *C02F 2101/101* (2013.01); *C02F 2101/12* (2013.01); *C02F 2101/16* (2013.01); *C02F 2103/34* (2013.01); *C02F 2301/046* (2013.01); *C02F 2301/08* (2013.01)

(56) References Cited

FOREIGN PATENT DOCUMENTS

| CN | 101935128 A | 1/2011 |
|---|---|---|
| CN | 101935128 B | 12/2011 |
| CN | 102616891 A | 8/2012 |
| CN | 103172088 A | 6/2013 |
| CN | 104609633 A | 5/2015 |
| CN | 104692575 A | 6/2015 |
| CN | 204417272 U | 6/2015 |
| CN | 105000733 B | 10/2015 |
| CN | 105036222 A | 11/2015 |
| CN | 105110542 A | 12/2015 |
| CN | 104326612 B | 3/2016 |
| CN | 105384293 A | 3/2016 |
| CN | 106145223 A | 11/2016 |
| CN | 106630349 A | 5/2017 |
| CN | 106698561 A | 5/2017 |
| CN | 106746135 A | 5/2017 |
| CN | 106830454 A | 6/2017 |
| CN | 206359377 U | 7/2017 |
| CN | 107867707 A | 4/2018 |
| JP | 2005262004 A | 9/2005 |
| JP | 2008223115 A | 9/2008 |
| JP | 2009095821 A | 5/2009 |
| JP | 2013094780 A | 5/2013 |
| RU | 2281258 C2 | 8/2006 |
| RU | 2006213535 A | 8/2006 |

* cited by examiner

APPARATUS AND METHOD FOR TREATING WASTE WATER CONTAINING AMMONIUM SALTS

CROSS REFERENCE TO RELATED APPLICATIONS

This application is a divisional application of U.S. patent application Ser. No. 16/115,167, filed Aug. 28, 2018, which claims priority to Chinese Application Nos. 201710752805.5 and 201710751942.7 entitled "Method for Treating Waste Water Containing Ammonium Salts" and Chinese Application Nos. 201710752394.X and 201710750767.X, entitled "Method for Treating Catalyst Production Waste Water", which are specifically and entirely incorporated by reference.

FIELD OF THE INVENTION

The present invention relates to the waste water treatment field, particularly to apparatus and method for treating waste water containing ammonium salts, more particularly to apparatus and method for treating waste water containing ammonium salts, which contains $NH_4^+$, $SO_4^{2-}$, $Cl^-$ and $Na^+$.

BACKGROUND OF THE INVENTION

In an oil refining catalyst production process, large quantities of inorganic acids, alkalis and salts, such as sodium hydroxide, hydrochloric acid, sulfuric acid, ammonium salts, sulfates, and hydrochlorides, etc., are required, and a large quantity of mixed waste water that contains ammonium, sodium sulfate, sodium chloride and aluminosilicate is produced. For such waste water, a common practice in the prior art is to adjust the pH to a range of 6-9 and remove the majority of suspended substances first, then remove ammonium ions through a biochemical process, air stripping process or steam stripping process, adjust the pH of the obtained salt-containing waste water, remove the majority of suspended substances, decrease the hardness, remove silica and a part of organic substances from the salt-containing waste water, remove the majority of organic substances through ozone biological activated carbon adsorption and oxidization or other advanced oxidization processes, further decrease the hardness in an ion exchange apparatus, concentrate in a concentration apparatus (e.g., reverse osmosis and/or electrodialysis apparatus), and then crystallize by MVR evaporating crystallization or multi-effect evaporation, to obtain mixed salts of sodium sulfate and sodium chloride that contain some ammonium salt; or adjust the pH to a range of 6.5-7.5 and remove the majority of suspended substances first, then decrease the hardness, remove silica and a part of organic substances, remove the majority of organic substances through ozone biological activated carbon adsorption and oxidization or other advanced oxidization processes, further decrease the hardness in an ion exchange apparatus, concentrate in a concentration apparatus (e.g., reverse osmosis and/or electrodialysis apparatus), and then crystallize by MVR evaporating crystallization or multi-effect evaporation, to obtain mixed salts of sodium sulfate and sodium chloride that contain some ammonium salts. However, at present, it is difficult to treat the mixed salts that contain ammonium, or the treatment cost is very high; in addition, the waste water treatment cost is increased additionally owing to the ammonium ion removal process in the early stage.

Besides, the biochemical ammonia removal process can only deal with waste water with low ammonium content; moreover, the catalyst waste water can't be treated directly by biochemical treatment because the COD content in it is not enough; instead, additional organic substances, such as glucose or starch, etc. have to be added in the biochemical treatment process to treat ammoniacal nitrogen through the biochemical treatment process. The most critical problem is that the total nitrogen contant in the waste water treated through a biochemical ammonia removal process often doesn't meet the standard (the contents of nitrate ions and nitrite ions are out of specification), and additional advanced treatment is required; in addition, since the salt content in the waste water is not decreased (20 g/L-30 g/L), the waste water can't be directly discharged, and further desalting treatment is required. To remove ammoniacal nitrogen in the waste water treated through an air stripping ammonia removal process, a large quantity of alkali has to be added to adjust the pH, and the alkali consumption is heavy; since the alkali in the waste water after ammonia removal can't be recovered, the pH of the treated waste water is very high, quantities of alkaline substance is wasted, and the treatment cost is very high; moreover, since the COD content in the catalyst waste water treated through the air stripping process has little change, the salt content in the waste water is not decreased (20 g/L-30 g/L), the pH is very high, the waste water can't be directly discharged, further desalting treatment is required.

SUMMARY OF THE INVENTION

To overcome the drawbacks in the prior art, i.e., the treatment cost of waste water that contains $NH_4^+$, $SO_4^{2-}$, $Cl^-$ and $Na^+$ is very high, and only mixed salt crystals can be obtained, the present invention provides a low-cost and environment-friendly treatment apparatus and method of water waste that contains $NH_4^+$, $SO_4^{2-}$, and $Na^+$. The apparatus and method can be used to recover ammonium, sodium sulfate, and sodium chloride from the waste water respectively, and thereby the resources in the waste water can be reused as far as possible.

To attain the object described above, in a first aspect, the present invention provides a waste water treatment apparatus for treating waste water containing ammonium salts, which comprises: a cooling crystallization unit, a first solid-liquid separation unit, a pH adjustment unit, a first evaporation unit, and a second solid-liquid separation unit, which are connected sequentially, wherein the cooling crystallization unit is configured to treat the waste water by cooling crystallization, to obtain crystal-containing crystalline solution;

the first solid-liquid separation unit is configured to treat the crystal-containing crystalline solution by first solid-liquid separation;

the pH adjustment unit is configured to adjust the pH of the waste water before evaporation is executed;

the first evaporation unit is configured to treat the liquid phase obtained in the first solid-liquid separation unit by first evaporation, to obtain first ammonia-containing vapor and first crystal-containing concentrated solution;

the second solid-liquid separation unit is configured to treat the first crystal-containing concentrated solution by second solid-liquid separation.

In a second aspect, the present invention provides a waste water treatment apparatus for treating waste water containing ammonium salts, which comprises: a pH adjustment unit, a second evaporation unit, a third solid-liquid separation unit, a cooling crystallization unit, a first solid-liquid separation unit, a first evaporation unit, and a second solid-liquid separation unit, which are connected sequentially, the pH adjustment unit is configured to adjust the pH of the waste water before evaporation is executed;

the second evaporation unit is configured to treat the waste water by second evaporation, to obtain second ammonia-containing vapor and second crystal-containing concentrated solution;

the third solid-liquid separation unit is configured to treat the second crystal-containing concentrated solution by third solid-liquid separation;

the cooling crystallization unit is configured to treat the liquid phase obtained in the third solid-liquid separation by cooling crystallization, to obtain crystal-containing crystalline solution;

the first solid-liquid separation unit is configured to treat the crystal-containing crystalline solution by first solid-liquid separation;

the first evaporation unit is configured to treat the liquid phase obtained in the first solid-liquid separation unit by first evaporation, to obtain first ammonia-containing vapor and first crystal-containing concentrated solution;

the second solid-liquid separation unit is configured to treat the first crystal-containing concentrated solution by second solid-liquid separation.

In a third aspect, the present invention provides a waste water treatment apparatus for treating waste water containing ammonium salts, which comprises: a pH adjustment unit, a first evaporation unit, a first solid-liquid separation unit, a cooling crystallization unit, and a second solid-liquid separation unit, which are connected sequentially, wherein the pH adjustment unit is configured to adjust the pH of the waste water before evaporation is executed;

the first evaporation unit is configured to treat the waste water by first evaporation, to obtain first ammonia-containing vapor and first crystal-containing concentrated solution;

the first solid-liquid separation unit is configured to treat the first crystal-containing concentrated solution by first solid-liquid separation;

the cooling crystallization unit is configured to treat the liquid phase obtained in the first solid-liquid separation unit by cooling crystallization, to obtain crystal-containing crystalline solution;

the second solid-liquid separation unit is configured to treat the crystal-containing crystalline solution by second solid-liquid separation.

In a fourth aspect, the present invention provides a method for treating waste water containing ammonium salts that contains $NH_4^+$, $SO_4^{2-}$, $Cl^-$ and $Na^+$, which comprises the following steps:

1) treating waste water to be treated by cooling crystallization to obtain crystalline solution that contains sodium sulfate crystal, wherein the waste water to be treated contains the waste water containing ammonium salts;

2) treating the crystalline solution that contains sodium sulfate crystal by first solid-liquid separation, and treating the liquid phase obtained in the first solid-liquid separation by first evaporation, to obtain first ammonia-containing vapor and first concentrated solution that contains sodium chloride crystal;

3) treating the first concentrated solution that contains sodium chloride crystal by second solid-liquid separation;

wherein the pH of the waste water to be treated is adjusted to a value greater than 7, before the waste water to be treated is treated by the cooling crystallization; in the waste water to be treated, the concentration of $SO_4^{2-}$ is 0.01 mol/L or higher, and the concentration of $Cl^-$ is 5.2 mol/L or lower.

In a fifth aspect, the present invention provides a method for treating waste water containing ammonium salts that contains $NH_4^+$, $SO_4^{2-}$, $Cl^-$ and $Na^+$, which comprises the following steps:

1) treating waste water to be treated by second evaporation, to obtain second ammonia-containing vapor and second concentrated solution that contains sodium sulfate crystal, wherein the waste water to be treated contains the waste water containing ammonium salts;

2) treating the second concentrated solution that contains sodium sulfate crystal by third solid-liquid separation, and treating the liquid phase obtained in the third solid-liquid separation by cooling crystallization, to obtain crystalline solution that contains sodium sulfate crystal;

3) treating the crystalline solution that contains sodium sulfate crystal by fourth solid-liquid separation, and treating the liquid phase obtained in the fourth solid-liquid separation by third evaporation, to obtain third ammonia-containing vapor and third concentrated solution that contains sodium chloride crystal;

4) treating the third concentrated solution that contains sodium chloride crystal by fifth solid-liquid separation;

wherein the pH of the waste water to be treated is adjusted to a value greater than 9, before the waste water to be treated is treated by the second evaporation; in relation to 1 mol $SO_4^{2-}$ contained in the waste water to be treated, the $Cl^-$ contained in the waste water to be treated is 14 mol or less; the second evaporation is executed in a way that no sodium chloride crystallizes and precipitates.

In a sixth aspect, the present invention provides a method for treating waste water containing ammonium salts that contains $NH_4^+$, $SO_4^{2-}$, $Cl^-$ and $Na^+$, which comprises the following steps:

1) treating waste water to be treated by fourth evaporation, to obtain fourth ammonia-containing vapor and fourth concentrated solution that contains sodium chloride crystal, wherein the waste water to be treated contains the waste water containing ammonium salts;

2) treating the fourth concentrated solution that contains sodium chloride crystal by sixth solid-liquid separation, and treating the liquid phase obtained in the sixth solid-liquid separation by cooling crystallization, to obtain crystalline solution that contains sodium sulfate crystal;

3) treating the concentrated solution that contains sodium sulfate crystal by seventh solid-liquid separation;

wherein the pH of the waste water to be treated is adjusted to a value equal to or greater than 9, before the waste water to be treated is treated by the fourth evaporation; in relation to 1 mol $SO_4^{2-}$ contained in the waste water to be treated, the $Cl^-$ contained in the waste water to be treated is 7.15 mol or more; the cooling crystallization is executed in a way that no sodium chloride crystallizes and precipitates.

With the technical scheme described above, for waste water containing ammonium salts, which contains $NH_4^+$, $SO_4^{2-}$, $Cl^-$ and $Na^+$, first, sodium sulfate crystal is obtained through cooling crystallization and solid-liquid separation, then the pH value of the liquid phase obtained in the solid-liquid separation is adjusted to a specific range, and then sodium chloride crystal and first ammonia water are obtained by first evaporation; alternatively, the pH value of the waste water to be treated is adjusted to a specific range in advance, then sodium chloride crystal and ammonia water are obtained by fourth evaporation, the concentration of chloride ions in the sixth mother liquid subject to cooling crystallization is controlled, and then sodium sulfate crystal is obtained through solid-liquid separation by means of cooling crystallization. With the method, high-purity sodium sulfate and sodium chloride can be obtained respectively, difficulties in mixed salt treatment and reuse can be avoided, the ammonia and salt separation process is accomplished at the same time, the temperature of the waste water is increased and the temperature of the ammonia-containing vapor is decreased at the same time through heat exchange, and thereby a condenser is not required, the heat in the evaporation process is utilized reasonably, energy is saved, the waste water treatment cost is reduced, the ammonium in the waste water is recovered in the form of ammonia water, the sodium chloride and sodium sulfate are recovered in the form of crystal respectively, no waste residue or waste liquid is produced in the entire process, and a purpose of changing wastes into valuables is achieved.

Furthermore, by utilizing evaporation and cooling treatment in combination, the method improves the concentration ratio of evaporation and the efficiency of evaporation, reduces the quantity of circulating liquid in the treatment system, and attains an energy-saving effect as well. By cooling crystallization, the content of sodium sulfate in the mother liquid for producing sodium sulfate is greatly decreased, and the efficiency of evaporation for sodium chloride production is improved; besides, before the liquid phase obtained in the sixth solid-liquid separation is treated by cooling crystallization, preferably the concentration of $Cl^-$ in the liquid phase is adjusted with the waste water containing ammonium salts and sodium sulfate crystal eluent to avoid precipitation of sodium chloride in the cooling crystallization process and thereby improve the precipitation ratio of sodium sulfate in the cooling crystallization process.

BRIEF DESCRIPTION OF THE SYMBOLS 1-first MVR evaporation device
2-cooling crystallization device
3-second MVR evaporation device
22, 55-low temperature treatment tank
31-first heat exchange device
32-second heat exchange device
33-third heat exchange device
34-fourth heat exchange device
35-fifth heat exchange device
36-sixth heat exchange device
38-eighth heat exchange device
30-eleventh heat exchange device
50-third mother liquid tank
51-first ammonia water storage tank
52-second ammonia water storage tank
53-first mother liquid tank
54-second mother liquid tank
61-first pH measuring device
62-second pH measuring device
63-third pH measuring device
70-eleventh circulation pump
71-first circulation pump
72-second circulation pump
73-third circulation pump
74-fourth circulation pump
75-fifth circulation pump
76-sixth circulation pump
77-seventh circulation pump
78-eighth circulation pump
79-ninth circulation pump
80-tenth circulation pump
81-vacuum pump
82-circulating water tank
83-tail gas absorption tower
84-fourteenth circulation pump
9-concentration device
91-first solid-liquid separation device
92-second solid-liquid separation device
101, 102-compressor

DETAILED DESCRIPTION OF THE EMBODIMENTS

The ends points and any value in the ranges disclosed in the present invention are not limited to the exact ranges or values; instead, those ranges or values shall be comprehended as encompassing values that are close to those ranges or values. For numeric ranges, the end points of the ranges, the end points of the ranges and the discrete point values, and the discrete point values may be combined to obtain one or more new numeric ranges, which shall be deemed as having been disclosed specifically in this document.

Hereunder the present invention will be detailed with reference to FIGS. 1-9, but the present invention is not limited to FIGS. 1-9.

Figure 1:
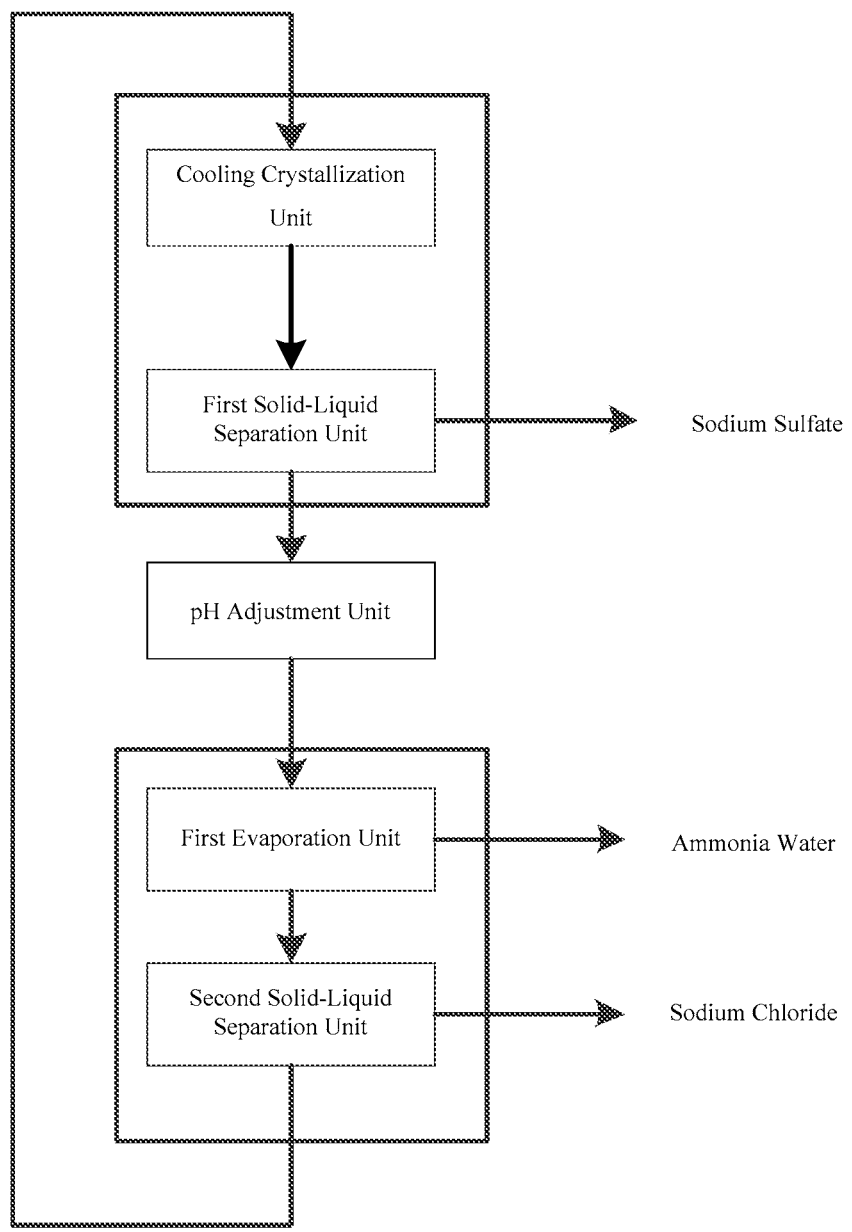
FIG. 1 is a schematic structural diagram of the waste water treatment apparatus in an embodiment of the present invention.

In a first aspect, the present invention provides a waste water treatment apparatus for treating waste water containing ammonium salts, as shown in FIG. 1, which comprises: a cooling crystallization unit, a first solid-liquid separation unit, a pH adjustment unit, a first evaporation unit, and a second solid-liquid separation unit, which are connected sequentially, wherein the cooling crystallization unit is configured to treat the waste water by cooling crystallization, to obtain crystal-containing crystalline solution;

the first solid-liquid separation unit is configured to treat the crystal-containing crystalline solution by first solid-liquid separation;

the pH adjustment unit is configured to adjust the pH of the waste water before evaporation is executed;

the first evaporation unit is configured to treat the liquid phase obtained in the first solid-liquid separation unit by first evaporation, to obtain first ammonia-containing vapor and first crystal-containing concentrated solution;

the second solid-liquid separation unit is configured to treat the first crystal-containing concentrated solution by second solid-liquid separation.

According to a preferred embodiment of the present invention, the waste water treatment apparatus further comprises a low-temperature treatment unit arranged between the first evaporation unit and the second solid-liquid separation unit and configured to treat the concentrated solution obtained in the first evaporation unit by low temperature treatment to obtain treated solution. By providing the low-temperature treatment unit, the evaporation process in the first evaporation unit can be used in combination with low temperature treatment, so that the evaporation process in the first evaporation unit may be executed at a higher temperature, and thereby the solid content in the concentrated solution obtained in the first evaporation and the efficiency of evaporation can be improved, and an energy-saving effect can be attained at the same time.

Any conventional cooling device in the art may be used as the low-temperature treatment unit. For example, the low-temperature treatment unit may be a low temperature treatment tank 55. Preferably, the low temperature treatment tank 55 may be equipped with a cooling component in it; specifically, the cooling component may be a component that introduces cooling water. With the cooling component, the first concentrated solution in the low temperature treatment tank can be cooled quickly. Preferably, the low temperature treatment tank 55 may be equipped with a stirring component in it. Under the stirring action of the stirring component, the solid phase and liquid phase distribution and the temperature distribution in the first concentrated solution are uniform, and a purpose that the sodium sulfate crystal is dissolved fully and the sodium chloride crystal precipitates as far as possible is attained.

Preferably, the waste water treatment apparatus further comprises a pipeline configured to return the liquid phase obtained in the second solid-liquid separation unit to the cooling crystallization unit.

According to the present invention, there is no particular restriction on the evaporation device used in the evaporation process, as long as the evaporation device can accomplish evaporation. For example, the first evaporation unit may be selected from one or more of MVR evaporation device, single-effect evaporation device, multi-effect evaporation device, and flash evaporation device respectively. Preferably, the first evaporation unit is a MVR evaporation device.

The MVR evaporation device may be selected from one or more of MVR falling film evaporator, MVR forced circulation evaporator, MVR-FC continuous crystallizing evaporator, and MVR-OSLO continuous crystallizing evaporator. Wherein the MVR evaporation device preferably is a MVR forced circulation evaporator or MVR-FC continuous crystallizing evaporator, more preferably is a two-stage MVR evaporating crystallizer that incorporates falling film and forced circulation.

The single-effect evaporation device or the evaporators in the multi-effect evaporation device may be selected from one or more of falling-film evaporator, rising-film evaporator, scraped evaporator, central circulation tube evaporator, basket evaporator, external heating evaporator, forced circulation evaporator, and Levin evaporator, for example. Wherein the evaporators preferably are forced circulation evaporators or external heating evaporators. Each of the above evaporators consists of a heating chamber and an evaporation chamber, and may include other auxiliary evaporation components as required, such as froth separator configured to further separate liquid and froth, condenser configured to condense the secondary steam fully, and vacuum device for depressurization, etc. In the case that the evaporation device is a multi-effect evaporation device, there is no particular restriction on the number of evaporators included in the multi-effect evaporation device; in other words, the number of evaporators included in the multi-effect evaporation device may be selected according to the evaporation conditions as required, and may be 2 or more, preferably is 2-5, more preferably is 2-4.

The flash evaporation device may be single-stage flash evaporation device or multistage flash evaporation device. The single-stage flash evaporation device or the evaporators in the multistage flash evaporation device may be selected from one or more of thin-film flash evaporator, high-efficiency vapor-liquid flash evaporator, rotary flash evaporator, for example. Wherein the evaporators preferably are thin-film flash evaporator, high-efficiency vapor-liquid flash evaporator. In the case that the evaporation device is a multistage flash evaporation device, the number of evaporators included in the multistage flash evaporation device may be 2 or more, preferably is 2-4.

According to the present invention, there is no particular restriction on the cooling crystallization unit, as long as it can accomplish cooling crystallization. For example, a continuous cooling crystallizer equipped with an external cooling heat exchanger may be used, or a crystallization tank with a cooling component (e.g., cooling crystallization device 2) may be used. The cooling component may cool the waste water to be treated in the cooling crystallization device to a condition required for cooling crystallization by introducing a cooling medium. Preferably a mixing component (e.g., a stirrer, etc.) is provided in the cooling crystallization device to mix the waste water to be treated homogeneously and attain a uniform cooling effect, so that the sodium sulfate in the waste water to be treated can precipitate fully and the grain size can be increased. The cooling crystallization device is preferably equipped with a circulation pump. To avoid the generation of a large quantity of fine crystal nuclei and prevent the generation of a large quantity of secondary crystal nuclei incurred by high-speed collision between the crystal grains in the circulating crystal slurry and the impeller, the circulation pump preferably is a low-speed centrifugal pump, more preferably is a high-flow low-speed induced flow pump impeller or high-flow, low lift and low-speed axial pump.

According to the present invention, there is no particular restriction on the first solid-liquid separation unit and the second solid-liquid separation unit, as long as they can attain a solid-liquid separation effect. For example, they can be selected from one or more of centrifugation device, filtering device, and sedimentation device respectively. For the purpose of improving the solid-liquid separation efficiency, preferably, both of the first solid-liquid separation unit and the second solid-liquid separation unit are centrifugation devices.

According to the present invention, there is no particular restriction on the pH adjustment unit, as long as it can adjust the pH of the waste water to be treated to the specified range. For example, the pH adjustment unit may be a pH adjustor (pH adjustment reagent) introduction device. NaOH may be used as the pH adjustor, for example. Specifically, NaOH solution may be added into the waste water to be treated to accomplish pH adjustment. To monitor the pH after the adjustment, the device may further comprise a pH measuring device, which may be any pH meter in the art.

Figure 3:
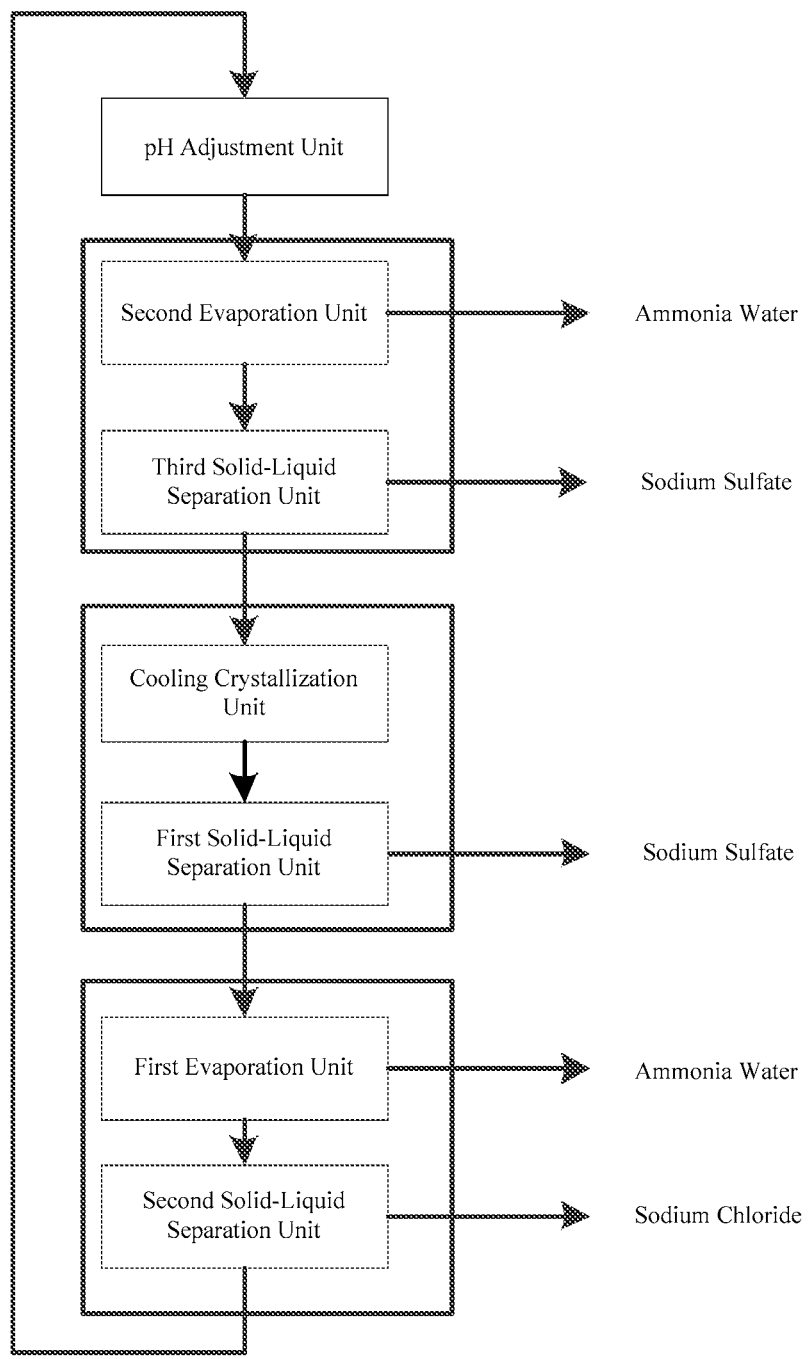
FIG. 3 is a schematic structural diagram of the waste water treatment apparatus in another embodiment of the present invention.

In a second aspect, the present invention provides a waste water treatment apparatus for treating waste water containing ammonium salts, as shown in FIG. 3, which comprises: a pH adjustment unit, a second evaporation unit, a third solid-liquid separation unit, a cooling crystallization unit, a first solid-liquid separation unit, a first evaporation unit, and a second solid-liquid separation unit, which are connected sequentially, wherein the pH adjustment unit is configured to adjust the pH of the waste water before evaporation is executed;

the second evaporation unit is configured to treat the waste water by second evaporation, to obtain second ammonia-containing vapor and second crystal-containing concentrated solution;

the third solid-liquid separation unit is configured to treat the second crystal-containing concentrated solution by third solid-liquid separation;

the cooling crystallization unit is configured to treat the liquid phase obtained in the third solid-liquid separation by cooling crystallization, to obtain crystal-containing crystalline solution;

the first solid-liquid separation unit is configured to treat the crystal-containing crystalline solution by first solid-liquid separation;

the first evaporation unit is configured to treat the liquid phase obtained in the first solid-liquid separation unit by first evaporation, to obtain first ammonia-containing vapor and first crystal-containing concentrated solution;

the second solid-liquid separation unit is configured to treat the first crystal-containing concentrated solution by second solid-liquid separation.

preferably, the waste water treatment apparatus further comprises a pipeline configured to return the liquid phase obtained in the second solid-liquid separation unit to the second evaporation unit.

According to a preferred embodiment of the present invention, the waste water treatment apparatus further comprises a low-temperature treatment unit arranged between the first evaporation unit and the second solid-liquid separation unit and configured to treat the concentrated solution obtained in the first evaporation unit by low temperature treatment to obtain treated solution. By providing the low-temperature treatment unit, the evaporation process in the first evaporation unit can be used in combination with low temperature treatment, so that the evaporation process in the first evaporation unit may be executed at a higher temperature, and thereby the solid content in the concentrated solution obtained in the first evaporation and the efficiency of evaporation can be improved, and an energy-saving effect can be attained at the same time.

Here, the evaporation unit, the cooling crystallization unit, the solid-liquid separation unit, the pH adjustment unit, and the low-temperature treatment unit are the same as those in the first aspect.

Figure 2:
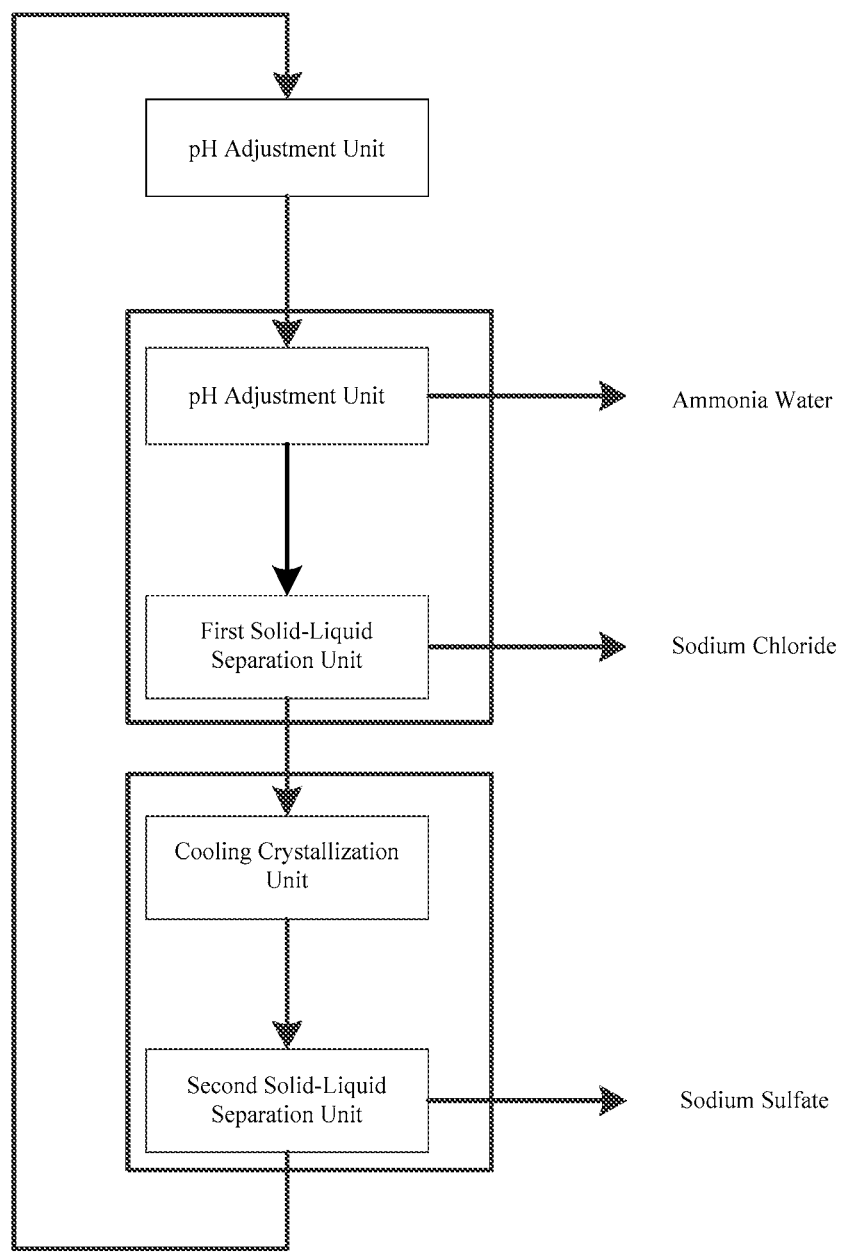
FIG. 2 is a schematic structural diagram of the waste water treatment apparatus in another embodiment of the present invention.

In a third aspect, the present invention provides a waste water treatment apparatus for treating waste water containing ammonium salts, as shown in FIG. 2, which comprises: a pH adjustment unit, a first evaporation unit, a first solid-liquid separation unit, a cooling crystallization unit, and a second solid-liquid separation unit, which are connected sequentially, wherein the pH adjustment unit is configured to adjust the pH of the waste water before evaporation is executed;

the first evaporation unit is configured to treat the waste water by first evaporation, to obtain first ammonia-containing vapor and first crystal-containing concentrated solution;

the first solid-liquid separation unit is configured to treat the first crystal-containing concentrated solution by first solid-liquid separation;

the cooling crystallization unit is configured to treat the liquid phase obtained in the first solid-liquid separation unit by cooling crystallization, to obtain crystal-containing crystalline solution;

the second solid-liquid separation unit is configured to treat the crystal-containing crystalline solution by second solid-liquid separation.

According to a preferred embodiment of the present invention, the waste water treatment apparatus further comprises a low-temperature treatment unit arranged between the first evaporation unit and the first solid-liquid separation unit and configured to treat the concentrated solution obtained in the first evaporation unit by low temperature treatment to obtain treated solution. By providing the low-temperature treatment unit, the evaporation process in the first evaporation unit can be used in combination with low temperature treatment, so that the evaporation process in the first evaporation unit may be executed at a higher temperature, and thereby the solid content in the concentrated solution obtained in the first evaporation and the efficiency of evaporation can be improved, and an energy-saving effect can be attained at the same time.

Preferably, the waste water treatment apparatus further comprises a pipeline configured to return the liquid phase obtained in the second solid-liquid separation unit to the first evaporation unit.

Here, the evaporation unit, the cooling crystallization unit, the solid-liquid separation unit, and the pH adjustment unit are the same as those in the first aspect.

According to the present invention, the devices described above may be used in the waste water treatment method in the present invention. According to the waste water treatment apparatus for treating waste water containing ammonium salts, preferably, the apparatus does not comprise separate non-evaporation deamination device (device only for removing ammonia from waste water, such as biochemical treatment device, deamination membrane and the like), and high-purity ammonia water, sodium sulfate crystals and sodium chloride crystals can be separated from the waste water containing $NH_4^+$, $SO_4^{2-}$, $Cl^-$ and $Na^+$ only by the combination of the evaporation unit and the solid-liquid separation unit.

In the present invention, the waste water treatment apparatus may further comprise heat exchange devices, such as heat exchangers, etc. There is no particular restriction on the quantity and positions of the heat exchange devices. For example, the heat exchange devices may be the fourth heat exchange device 34 and the third heat exchange device 33 in the FIG. 4 for cooling the first ammonia-containing vapor and heating the liquid phase obtained in the first solid-liquid separation unit, and the second heat exchange device 32 and the sixth heat exchange device 36 for heating the waste water to be treated. According to the present invention, the waste water treatment apparatus further comprises a tail gas absorption unit configured to absorb ammonia in the tail gas from the waste water treatment apparatus. A tail gas absorption tower 83 may be used as the tail gas absorption unit. There is no particular restriction on the tail gas absorption tower 83; in other words, the tail gas absorption tower 83 may be any conventional absorption tower in the art, such as plate-type absorption tower, packed absorption tower, falling film absorption tower, or void tower, etc. The tail gas absorption tower 83 may be used in combination with a fourth circulation pump 74 which is configured to drive the circulating water to circulate in the tail gas absorption tower 83. The tail gas absorption tower 83 may further be used in combination with a circulating water tank 82; for example, water may be replenished with a third circulation pump 73 from the circulating water tank 82 to the tail gays absorption tower 83; fresh water may be replenished to the circulating water tank 82, and thereby the temperature and ammonia content of the service water of the vacuum pump 81 may be decreased at the same time.

In the present invention, it should be understood that the ammonia-containing vapors are secondary steam generally referred in the art. All the pressure values are gauge pressure values.

Figure 4:
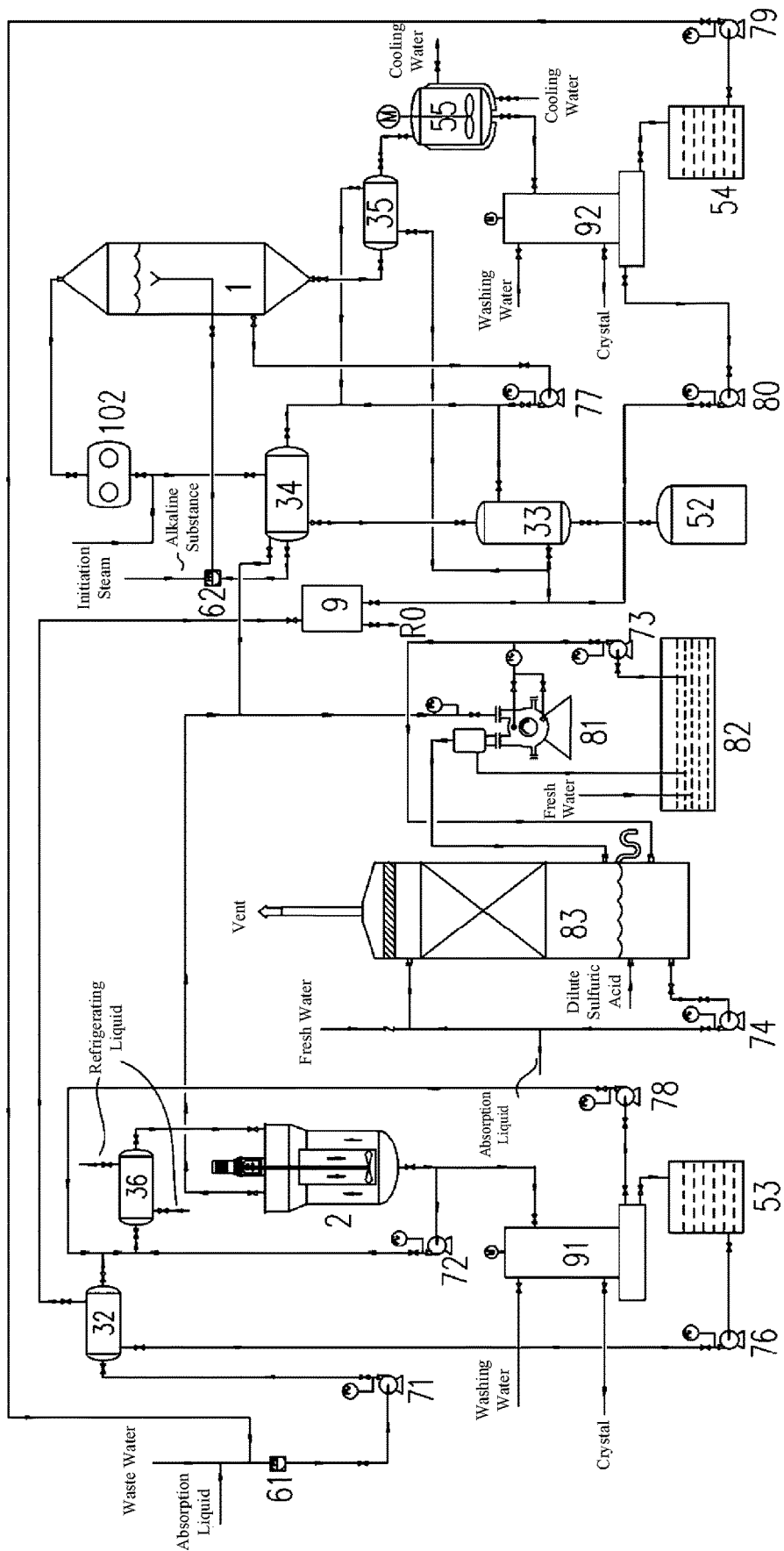
FIG. 4 is a flow diagram of the method for treating waste water containing ammonium salts in an embodiments of the present invention.
Figure 5:
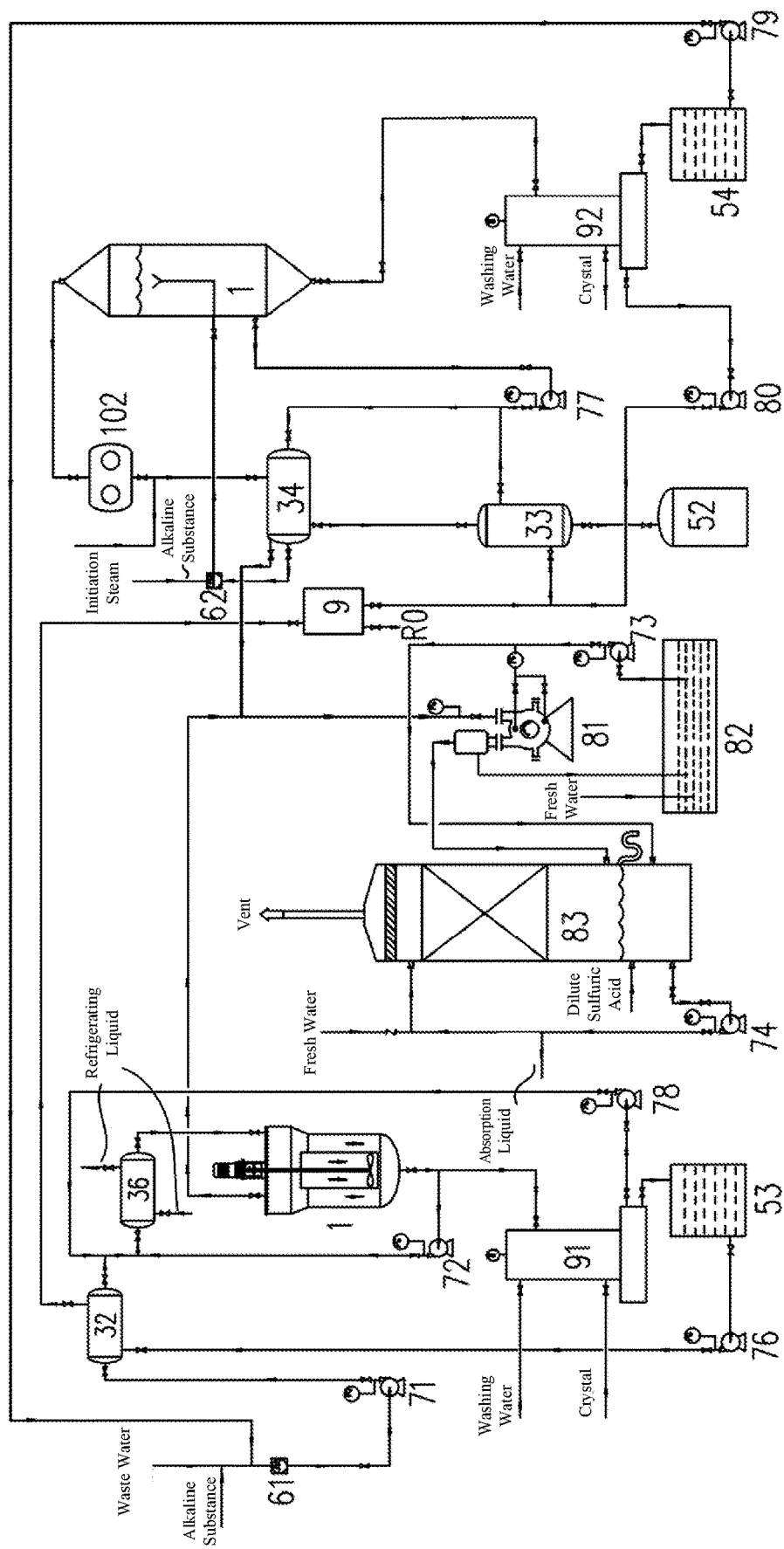
FIG. 5 is a flow diagrams of the method for treating waste water containing ammonium salts in another embodiments of the present invention.

In a fourth aspect, the present invention provides a method for treating waste water containing ammonium salts that contains $NH_4^+$, $SO_4^{2-}$, $Cl^-$ and $Na^+$ as shown in FIGS. 4-5, which comprises the following steps:
1) treating waste water to be treated by cooling crystallization to obtain crystalline solution that contains sodium sulfate crystal, wherein the waste water to be treated contains the waste water containing ammonium salts;
2) treating the crystalline solution that contains sodium sulfate crystal by first solid-liquid separation, and treating the liquid phase obtained in the first solid-liquid separation by first evaporation, to obtain first ammonia-containing vapor and first concentrated solution that contains sodium chloride crystal;
3) treating the first concentrated solution that contains sodium chloride crystal by second solid-liquid separation;
wherein the pH of the waste water to be treated is adjusted to a value greater than 7, before the waste water to be treated is treated by the cooling crystallization; in the waste water to be treated, the concentration of $SO_4^{2-}$ is 0.01 mol/L or higher, and the concentration of $Cl^-$ is 5.2 mol/L or lower.

Preferably, the waste water to be treated is the waste water containing ammonium salts; or the waste water to be treated contains the waste water containing ammonium salts and the liquid phase obtained in the second solid-liquid separation.

More preferably, the waste water to be treated is mixed solution of the waste water containing ammonium salts and at least a part of the liquid phase obtained in the second solid-liquid separation.

The method provided in the present invention can treat waste water containing ammonium salts, which contains $NH_4^+$, $SO_4^{2-}$, $Cl^-$ and $Na^+$, and there is no particular restriction on the waste water containing ammonium salts, except that the waste water contains $NH_4^+$, $SO_4^{2-}$, $Cl^-$ and $Na^+$. For the purpose of improving the waste water treatment efficiency, the concentration of $SO_4^{2-}$ contained in the waste water to be treated is 0.01 mol/L or higher, more preferably is 0.07 mol/L or higher, further preferably is 0.1 mol/L or higher, still further preferably is 0.2 mol/L or higher, particularly preferably is 0.3 mol/L or higher, e.g., 0.4-1 mol/L. In addition, the concentration of $Cl^-$ in the waste water to be treated is 5.2 mol/L or lower, preferably is 4.5 mol/L or lower, more preferably is 3 mol/L or lower, e.g., 1.5-3 mol/L. By controlling the concentration values of $SO_4^{2-}$ and $Cl^-$ within the above-mentioned ranges, sodium sulfate precipitates but sodium chloride hardly precipitates in the cooling crystallization, and thereby a purpose of separating sodium sulfate efficiently is attained.

Examples of the content of $SO_4^{2-}$ in the waste water to be treated may include: 0.01 mol/L, 0.03 mol/L, 0.05 mol/L, 0.08 mol/L, 0.1 mol/L, 0.2 mol/L, 0.3 mol/L, 0.4 mol/L, 0.5 mol/L, 0.6 mol/L, 0.7 mol/L, 0.8 mol/L, 0.9 mol/L, 1 mol/L, 1.1 mol/L, 1.2 mol/L, 1.3 mol/L, 1.4 mol/L, or 1.5 mol/L, etc.

Examples of the content of $Cl^-$ in the waste water to be treated may include: 0.01 mol/L, 0.05 mol/L, 0.1 mol/L, 0.3 mol/L, 0.6 mol/L, 0.8 mol/L, 1 mol/L, 1.2 mol/L, 1.4 mol/L, 1.6 mol/L, 1.8 mol/L, 2.0 mol/L, 2.2 mol/L, 2.4 mol/L, 2.6 mol/L, 2.8 mol/L, 3 mol/L, 3.2 mol/L, 3.4 mol/L, 3.6 mol/L, 3.8 mol/L, 4 mol/L, 4.5 mol/L, 5 mol/L, or 5.1 mol/L, etc.

In the present invention, there is no particular restriction on the order of the first heat exchange, the adjustment of pH value of the waste water to be treated, and the blending process of the waste water to be treated (in the case that the waste water to be treated contains the waste water containing ammonium salts and the liquid phase obtained in the second solid-liquid separation, a blending process of the waste water to be treated is required); in other words, the order may be selected appropriately as required; for example, these procedures may be accomplished before the waste water to be treated is treated by cooling crystallization.

In the present invention, the purpose of the cooling crystallization is to drive the sodium sulfate to precipitate while prevent the sodium chloride, ammonium chloride, and ammonium sulfate from precipitating, so that the sodium sulfate can be separated successfully from the waste water. The cooling crystallization only drives the sodium sulfate to precipitate, but doesn't exclude sodium chloride and other substances, which are entrained in the sodium sulfate crystal or absorbed to the surface of the sodium sulfate crystal. In the present invention, preferably the content of sodium sulfate in the obtained sodium sulfate crystal is 92 mass % or higher, more preferably is 96 mass % or higher, further preferably is 98 mass % or higher. It should be understood that the quantity of the obtained sodium sulfate crystal is measured by dry mass. If the content of sodium sulfate in the obtained sodium sulfate crystal is within the above-mentioned range, it is deemed that only sodium sulfate precipitates. In the present invention, there is no particular restriction on the conditions of the cooling crystallization; in other words, the conditions may be selected appropriately as required, as long as an effect of separation and crystallization of the sodium sulfate is attained. The conditions of the cooling crystallization may include: temperature: $-21.7°$ C.-$17.5°$ C., preferably $-20°$ C.-$5°$ C., more preferably $-10°$ C.-$5°$ C., further preferably $-10°$ C.-$0°$ C., particularly preferably $-4°$ C.-$0°$ C.; time (e.g., measured as the retention time in the cooling crystallization device 2): 5 min. or more, preferably 60 min.-180 min., more preferably 90 min.-150 min., further preferably 120 min.-150 min., or 130 min.-150 min., or 120 min.-130 min. By controlling the conditions of the cooling crystallization within the above-mentioned ranges, the sodium sulfate can precipitate fully.

Examples of the temperature of the cooling crystallization may include: −21° C., −20° C., −19° C., −18° C., −17° C., −16° C., −15° C., −14° C., −13° C., −12° C., −11° C., −10° C., −9° C., −8° C., −7° C., −6° C., −5° C., −4° C., −3° C., −2° C., −1° C., or 0° C., etc.

Examples of the time of the cooling crystallization may include: 5 min., 6 min., 7 min., 8 min., 10 min., 15 min., 20 min., 25 min., 30 min., 35 min., 40 min., 45 min., 50 min., 52 min., 54 min., 56 min., 58 min., 60 min., 65 min., 70 min., 75 min., 80 min., 85 min., 90 min., 95 min., 100 min., 105 min., 110 min., 115 min., 120 min., 130 min., 140 min., 150 min., or 160 min.

According to the present invention, there is no particular restriction on the method of cooling crystallization. For example, the cooling crystallization may be executed continuously or in batch, as long as the purpose of cooling the waste water to be treated and driving the sodium sulfate to crystallize and precipitate is attained. Preferably, the cooling crystallization is executed continuously. The cooling crystallization of sodium sulfate may be executed in any conventional cooling crystallization apparatus in the art. For example, the cooling crystallization may be executed in a continuous cooling crystallizer equipped with an external cooling heat exchanger or in a crystallization tank with a cooling component (i.e., the cooling crystallization device 2). The cooling component may cool the waste water to be treated in the cooling crystallization device to a condition required for cooling crystallization by introducing a cooling medium. Preferably a mixing component (e.g., a stirrer, etc.) is provided in the cooling crystallization device to mix the waste water to be treated homogeneously and attain a uniform cooling effect, so that the sodium sulfate in the waste water to be treated can precipitate fully and the grain size can be increased. The cooling crystallization device is preferably equipped with a circulation pump. To avoid the generation of a large quantity of fine crystal nuclei and prevent the generation of a large quantity of secondary crystal nuclei incurred by high-speed collision between the crystal grains in the circulating crystal slurry and the impeller, the circulation pump preferably is a low-speed centrifugal pump, more preferably is a high-flow low-speed induced flow pump impeller or high-flow, low lift and low-speed axial pump.

According to the present invention, the pH of the waste water to be treated is adjusted to a value greater than 7, before the waste water to be treated is treated by the cooling crystallization. By adjusting the pH value of the waste water to be treated, the majority of $NH_4^+$ exists in the form of ammonia molecules; thus, ammonium sulfate and/or ammonium chloride will not precipitate in the cooling crystallization process, and the precipitation ratio of sodium sulfate can be improved. Preferably, the pH value of the waste water to be treated is adjusted to 8 or above before the waste water to be treated is treated by cooling crystallization, so that ammonium sulfate and/or ammonium chloride will not precipitate in the cooling crystallization process (the content of ammonium salts in the obtained crystal is 1 mass % or lower, preferably is 0.5 mass % or lower).

In the present invention, there is no particular restriction on the pH adjustment method. For example, the pH value of the waste water to be treated may be adjusted by adding an alkaline substance. There is no particular restriction on the alkaline substance, as long as the alkaline substance can attain the purpose of adjusting the pH. To avoid introducing any new impurity into the waste water to be treated and improve the purity of the obtained crystal, the alkaline substance preferably is NaOH. In addition, in view that the second mother liquid (i.e., the liquid phase obtained in the second solid-liquid separation) contains NaOH at relatively high concentration, preferably the second mother liquid is used as the alkaline substance.

The alkaline substance may be added with a conventional method in the art. However, preferably the alkaline substance is mixed in the form of water solution with the waste water to be treated. For example, water solution that contains the alkaline substance may be charged into a pipeline through which the waste water to be treated is inputted. There is no particular restriction on the content of the alkaline substance in the water solution, as long as the water solution can attain the purpose of adjusting the pH. However, to reduce the amount of water and further reduce the cost, preferably a saturated water solution of the alkaline substance or a second mother liquid is used. To monitor the pH of the waste water to be treated, the pH of the waste water to be treated may be measured after the pH adjustment.

According to a preferred embodiment of the present invention, the cooling crystallization is executed in the cooling crystallization device 2. Before the waste water to be treated is fed into the cooling crystallization device 2, the pH value of the waste water to be treated is adjusted by introducing the water solution that contains the alkaline substance into the pipeline through which the waste water to be treated is to be fed into the cooling crystallization device 2 and mixing the water solution that contains the alkaline substance with the waste water to be treated in the pipeline. In addition, the pH value is measured with a first pH measuring device 61 after the adjustment.

By controlling the cooling crystallization to proceed at the above-mentioned temperature and pH, sodium sulfate can precipitate fully while sodium chloride, ammonium sulfate and/or ammonium chloride don't precipitate in the cooling crystallization process, so that the purpose of separating and purifying sodium sulfate is attained.

In the present invention, to control the grain size distribution of the crystal in the cooling crystallization device 2 and decrease the content of fine grains, preferably a part of the liquid after the crystallization in the cooling crystallization device 2 (i.e., the liquid in the cooling crystallization device 2, hereinafter also referred to as cooled circulating liquid) is mixed with the waste water to be treated and then returned to the cooling crystallization device 2 for further cooling crystallization. For example, the process of returning the cooled circulating liquid to the cooling crystallization device 2 for further cooling crystallization may be executed by returning the cooled circulating liquid with a second circulation pump 72 to a position just before the sixth heat exchange device 36, so that the cooled circulating liquid is mixed with the waste water to be treated and then enters into the cooling crystallization device 2 again for further cooling crystallization. The quantity of returned cooled circulating liquid may be defined by the recirculation ratio of the cooling crystallization, which refers to the ratio of the recirculated amount to the difference between the total amount of liquid fed into the cooling crystallization device 2 and the recirculated amount. The recirculation ratio may be set appropriately according to the degree of supersaturation of sodium sulfate in the cooling crystallization device 2, to ensure the granularity of sodium sulfate crystal. To control the grain size distribution of the crystal obtained in the cooling crystallization and decrease the content of fine grains, preferably the degree of super-saturation is controlled to be lower than 1.5 g/L, more preferably is lower than 1 g/L.

To obtain relatively thick first ammonia water and improve the purity of sodium sulfate obtained in the cooling crystallization and the efficiency of the cooling crystallization, preferably the waste water to be treated is concentrated to obtain ammonia-containing vapor and concentrated waste water to be treated before the waste water to be treated is treated by the cooling crystallization. Here, the purpose of the concentration is to obtain first ammonia water at relatively high concentration and control the concentration of the first ammonia water more easily, and concentrate the waste water to be treated to facilitate the cooling crystallization. There is no particular restriction on the degree of the concentration, as long as the concentrated waste water to be treated meets the above-mentioned cooling crystallization requirement. The conditions and equipment of the concentration are the same as those of the first evaporation. However, preferably the temperature of the concentration is higher than the temperature of the first evaporation, so that the waste water to be treated can be treated quickly by the first evaporation, and thereby the efficiency of the first evaporation can be improved while thick first ammonia water is obtained. Furthermore, the pH value of the waste water to be treated is adjusted to a value greater than 9, more preferably greater than 10.8, before the waste water to be treated is concentrated. Here, preferably the pH value is adjusted by means of NaOH.

By adjusting the pH value of the waste water to a value greater than 9 and concentrating the waste water before the waste water is treated by the cooling crystallization, first ammonia water at relatively high concentration can be obtained, the purity of sodium sulfate obtained in the cooling crystallization can be improved, and the efficiency can be improved.

In the present invention, through first solid-liquid separation of the crystalline solution that contains sodium sulfate crystal, sodium sulfate crystal and first mother liquid (i.e., a liquid phase obtained in the first solid-liquid separation) are obtained. There is no particular restriction on the method of the first solid-liquid separation. For example, the method may be selected from one or more of centrifugation, filtering, and sedimentation.

According to the present invention, the first solid-liquid separation may be executed in a first solid-liquid separation device 91 (e.g., centrifugal machine, or filter, etc.). After the first solid-liquid separation, the first mother liquid obtained in the first solid-liquid separation device 91 is stored temporarily in a first mother liquid tank 53, and may be pumped by a sixth circulation pump 76 into the first MVR evaporation device 1 for first evaporation. Besides, it is inevitable that the obtained sodium sulfate crystal has some impurities absorbed thereon, such as chloride ions, free ammonia, and hydroxyl ions, etc. Preferably, the sodium sulfate crystal is washed in first washing with water or sodium sulfate solution to remove the absorbed impurities, reduce off-odor of the solid salt, decrease causticity, and improve the purity of the crystal, and may be dried if anhydrous sodium sulfate is to be obtained.

There is no particular restriction on the specific method for the first solid-liquid separation and the first washing. For example, the first solid-liquid separation and the first washing may be executed with a conventional solid-liquid separation apparatus in the art, or may be executed in a staged solid-liquid separation apparatus, such as a band filter. The first washing comprises elutriation and/or elution. There is no particular restriction on the above-mentioned washing; in other words, the washing may be executed with a conventional method in the art. There is no particular restriction on the number of cycles of the washing. For example, one or more cycles may be used. To obtain sodium sulfate crystal at higher purity, preferably the washing is executed for 2-4 cycles. The first washing preferably is executed with sodium sulfate solution (the concentration of the sodium sulfate solution preferably is the concentration of sodium sulfate in water solution where both sodium chloride and sodium sulfate are saturated at the temperature corresponding to the sodium sulfate crystal to be washed). The liquid produced in the washing preferably is returned to the cooling crystallization device 2. For example, the liquid may be returned by means of an eighth circulation pump 78 to the cooling crystallization device 2.

According to a preferred embodiment of the present invention, after the crystalline solution that contains sodium sulfate is obtained through cooling crystallization, solid-liquid separation is executed with a solid-liquid separation device, and the crystal obtained in the solid-liquid separation is eluted with sodium sulfate solution (the concentration of the sodium sulfate solution preferably is the concentration of sodium sulfate in water solution where both sodium chloride and sodium sulfate are saturated at the temperature corresponding to the sodium sulfate crystal to be washed), and the liquid obtained in the elution is returned to the cooling crystallization device 2. Through the washing process described above, the purity of the obtained sodium sulfate crystal can be improved.

In the present invention, to reduce the cost of the waste water treatment, the first mother liquid is concentrated after the first solid-liquid separation is finished, preferably before the first mother liquid is charged into the first MVR evaporation device 1; preferably, the concentration is executed in a way that no crystal precipitates from the liquid phase obtained in the first solid-liquid separation. The concentration may be executed with a conventional concentration method in the art, such as reverse osmosis or electrodialysis, etc. Wherein for the purpose of reducing the cost and improving the efficiency of the follow-up first evaporation, the concentration preferably is executed through an electrodialysis process; for example, the concentration may be executed with a concentration device 9 (an electrodialysis apparatus). The thick solution obtained in the electrodialysis process is treated by first evaporation in the next step, while the thin solution preferably is returned to the concentration step before the treatment of the waste water containing ammonium salts for further concentration and then treated with the method in the present invention. Through the concentration, the liquid volume in the first evaporation process can be reduced, the efficiency of the first evaporation can be improved, and thereby the efficiency of waste water treatment can be improved and the cost can be reduced.

According to the present invention, to take full advantage of the cooling capacity of the first mother liquid, preferably first heat exchange between the first mother liquid and the waste water to be treated is executed before the waste water to be treated is treated by cooling crystallization.

According to a preferred embodiment of the present invention, the first heat exchange is executed in a second heat exchange device 32; specifically, the first mother liquid and the waste water to be treated flow through the second heat exchange device 32 respectively, so that they exchange heat and thereby the temperature of the waste water to be treated is decreased to facilitate cooling crystallization, while the temperature of the first mother liquid is increased to facilitate first evaporation. After the first heat exchange in the second heat exchange device 32, the temperature of the waste water to be treated is −20.7° C.-16.5° C., preferably is −5° C.-10° C., close to the temperature of cooling crystallization.

According to the present invention, to facilitate cooling crystallization, preferably first heat exchange between the waste water to be treated and refrigerating liquid is executed further. According to a preferred embodiment of the present invention, the first heat exchange between the waste water to be treated and the refrigerating liquid is executed in a sixth heat exchange device 36; specifically, the refrigerating liquid and the waste water to be treated flow through the sixth heat exchange device 36 respectively so that they exchange heat with each other, and thereby the temperature of the waste water to be treated is decreased to facilitate cooling crystallization. The refrigerating liquid may be any conventional refrigerating liquid for cooling in the art, as long as it can cool the waste water to be treated to a temperature that meets the cooling crystallization requirement.

In the present invention, the purpose of the first evaporation is to drive sodium chloride to precipitate or drive sodium chloride and sodium sulfate to precipitate together, and evaporate ammonia, to attain a purpose of separating the ammonia and salts in the waste water. According to the present invention, by controlling the conditions of the first evaporation, sodium chloride precipitates first as the solvent is reduced continuously, and then some sodium sulfate precipitates, so that first concentrated solution that contains sodium chloride crystal is obtained (the first concentrated solution that only contains sodium chloride crystal or contains sodium chloride crystal and sodium sulfate crystal).

In the present invention, the first evaporation may be executed in a conventional evaporation device in the art, such as a MVR evaporation device, single-effect evaporation device, flash evaporation device, or multi-effect evaporation device.

The MVR evaporation device may be selected from one or more of MVR falling film evaporator, MVR forced circulation evaporator, MVR-FC continuous crystallizing evaporator, and MVR-OSLO continuous crystallizing evaporator. Wherein the MVR evaporation device preferably is a MVR forced circulation evaporator or MVR-FC continuous crystallizing evaporator, more preferably is a two-stage MVR evaporating crystallizer that incorporates falling film and forced circulation.

The single-effect evaporation device or the evaporators in the multi-effect evaporation device may be selected from one or more of falling-film evaporator, rising-film evaporator, scraped evaporator, central circulation tube evaporator, basket evaporator, external heating evaporator, forced circulation evaporator, and Levin evaporator, for example. Wherein the evaporators preferably are forced circulation evaporators or external heating evaporators. Each of the above evaporators consists of a heating chamber and an evaporation chamber, and may include other auxiliary evaporation components as required, such as froth separator configured to further separate liquid and froth, condenser configured to condense the secondary steam fully, and vacuum device for depressurization, etc. In the case that the evaporation device is a multi-effect evaporation device, there is no particular restriction on the number of the evaporators included in the multi-effect evaporation device; preferably 2 or more evaporators are used, more preferably 3-5 evaporators are used. According to a preferred embodiment of the present invention, the first evaporation is executed in a first MVR evaporation device 1.

The flash evaporation device may be single-stage flash evaporation device or multistage flash evaporation device. The single-stage flash evaporation device or the evaporators in the multistage flash evaporation device may be selected from one or more of thin-film flash evaporator, high-efficiency vapor-liquid flash evaporator, rotary flash evaporator, for example. Wherein the evaporators preferably are thin-film flash evaporator and high-efficiency vapor-liquid flash evaporator. In the case that the evaporation device is a multistage flash evaporation device, the number of evaporators included in the multistage flash evaporation device may be 2 or more, preferably is 2-4.

In the present invention, there is no particular restriction on the evaporation conditions of the first evaporation; in other words, the evaporation conditions may be selected appropriately as required, as long as the purpose of crystallization can be attained. To improve the efficiency of the first evaporation, the conditions of the first evaporation may include: temperature: 35° C. or above; pressure: −98 kPa or above; preferably, the conditions of the first evaporation include: temperature: 45° C.-175° C.; pressure: −95 kPa-653 kPa; preferably, the conditions of the first evaporation include: temperature: 60° C.-175° C.; pressure: −87 kPa-653 kPa; preferably, the conditions of the first evaporation include: temperature: 75° C.-175° C.; pressure: −73 kPa-653 kPa; preferably, the conditions of the first evaporation include: temperature: 80° C.-130° C.; pressure: −66 kPa-117 kPa; preferably, the conditions of the first evaporation include: temperature: 95° C.-110° C.; pressure: −37 kPa-12 kPa; preferably, the conditions of the first evaporation include: temperature: 105° C.-110° C.; pressure: −8 kPa-12 kPa.

If a multi-effect evaporation device is used for the first evaporation, in the case of co-current feeding or counter-current feeding, the conditions of the first evaporation refer to the evaporation conditions in the last evaporator of the multi-effect evaporation device; in the case of parallel-current feeding, the conditions of the first evaporation include the evaporation conditions in each evaporator in the multi-effect evaporation device. In addition, to take full advantage of the heat in the first evaporation process, preferably the difference in the temperature of the first evaporation between every two adjacent evaporators is 5° C.-30° C.; more preferably, difference in the temperature of the first evaporation between every two adjacent evaporators in the first evaporation is 10° C.-20° C.

In the present invention, the operating pressure of the first evaporation preferably is the saturated vapor pressure of the evaporated feed liquid in the first evaporation. In addition, the amount of evaporation in the first evaporation may be selected appropriately according to the processing capacity of the apparatus and the amount of the waste water to be treated. For example, the amount of evaporation may be 0.1 m$^3$/h or more (e.g., 0.1 m$^3$/h-500 m$^3$/h).

To ensure sodium chloride crystal precipitates as far as possible in the first evaporation process while sodium sulfate doesn't precipitate or precipitates in a very small amount and can be dissolved in the cooling treatment, preferably, in relation to 1 mol $SO_4^{2-}$ contained in the liquid phase obtained in the first solid-liquid separation, the Cl$^-$ contained in the liquid phase obtained in the first solid-liquid separation is 7.15 mol or more, preferably is 10 mol or more, more preferably is 20 mol or more, even more preferably is 44 mol or more, further preferably is 50 mol or more, still further preferably is 74 mol or more, preferably is 460 mol or less, more preferably is 230 mol or less, further preferably is 100 mol or less. For example, in relation to 1 mol $SO_4^{2-}$ contained in the liquid phase obtained in the first solid-liquid separation, the Cl⁻ contained in the liquid phase obtained in the first solid-liquid separation may be 9.5 mol, 10.5 mol, 11 mol, 11.5 mol, 12 mol, 12.5 mol, 13 mol, 13.5 mol, 14 mol, 14.5 mol, 15 mol, 15.5 mol, 16 mol, 16.5 mol, 17 mol, 17.5 mol, 18 mol, 18.5 mol, 19 mol, 19.5 mol, 20 mol, 21 mol, 22 mol, 23 mol, 25 mol, 27 mol, 29 mol, 31 mol, 35 mol, 40 mol, 45 mol, or 50 mol, etc. By controlling the molar ratio of $SO_4^{2-}$ to Cl⁻ to the above-mentioned range, relatively pure sodium chloride crystal can be obtained through the first evaporation and cooling treatment, separation of sodium sulfate and sodium chloride can be realized, and energy consumption in the cooling crystallization process can be reduced.

According to a preferred embodiment of the present invention, the first evaporation ensures that the sodium sulfate in the waste water to be treated doesn't crystallize and precipitate (i.e., the sodium sulfate is not over-saturated); preferably, through the first evaporation, the concentration of sodium sulfate in the first concentrated solution is Y or lower, more preferably is 0.9 Y-0.99 Y, further preferably is 0.95 Y-0.98 Y (wherein Y is the concentration of sodium sulfate in the first concentrated solution when both sodium sulfate and sodium chloride are saturated under the conditions of the first evaporation). By controlling the degree of the first evaporation within the above-mentioned range, sodium chloride crystallizes and precipitates as far as possible while sodium sulfate doesn't precipitate. By increasing the amount of evaporation as far as possible, the efficiency of the waste water treatment can be improved, and energy waste can be reduced.

According to another preferred embodiment of the present invention, to reduce the quantity of circulating water in the treatment system, improve the efficiency of the first evaporation and thereby improve the efficiency of the waste water treatment, the first evaporation preferably is executed to a degree that both the sodium chloride and the sodium sulfate precipitate at the same time, which is to say, preferably first concentrated solution that contains sodium chloride crystal and sodium sulfate crystal is obtained in the first evaporation. In that case, in order to obtain high-purity sodium chloride crystal, before the second solid-liquid separation is executed, the first concentrated solution that contains sodium chloride crystal is treated by cooling treatment to obtain treated solution that contains sodium chloride crystal; then the treated solution that contains sodium chloride crystal is treated by the second solid-liquid separation. Here, the method provided in the present invention comprises the following steps:

1) treating waste water to be treated by cooling crystallization to obtain crystalline solution that contains sodium sulfate crystal, wherein the waste water to be treated contains the waste water containing ammonium salts;
2) treating the crystalline solution that contains sodium sulfate crystal by first solid-liquid separation, and treating the liquid phase obtained in the first solid-liquid separation by first evaporation, to obtain first ammonia-containing vapor and first concentrated solution that contains sodium chloride crystal;
3) treating the first concentrated solution that contains sodium chloride crystal by cooling treatment, to obtain treated solution that contains sodium chloride crystal;
4) treating the treated solution by second solid-liquid separation.

In the embodiment described above, for the purpose of improving the efficiency of the waste water treatment, the greater the degree of the first evaporation is, the better the result is; however, if the degree of the first evaporation exceeds a certain degree, treated solution that only contains sodium chloride crystal can't be obtained through the cooling treatment; in that case, though the crystal may be dissolved, for example, by adding water into the treated solution, the efficiency of the waste water treatment will be degraded. Therefore, preferably the first evaporation is executed to a degree that both sodium chloride crystal and sodium sulfate crystal precipitate at the same time, and the sodium sulfate crystal that has precipitated can be dissolved in the cooling treatment, i.e., first concentrated solution that contains sodium chloride crystal and sodium sulfate crystal is obtained through the step 2), and the sodium sulfate crystal in the first concentrated solution that contains sodium chloride crystal and sodium sulfate crystal is dissolved in the cooling treatment. To ensure that the sodium sulfate crystal in the first concentrated solution that contains sodium chloride crystal and sodium sulfate crystal can be dissolved in the cooling treatment, for example, the degree of the first evaporation may be controlled so that the concentration of sodium sulfate in the treated solution is Y' or lower (wherein Y' is the concentration of sodium sulfate when both sodium sulfate and sodium chloride are saturated in the treated solution under the conditions of the cooling treatment), and thereby sodium chloride precipitates as far as possible while sodium sulfate is dissolved fully in the follow-up cooling treatment procedure; preferably, after the first evaporation, the concentration of sodium sulfate in the treated solution is 0.9 Y'-0.99 Y', more preferably is 0.95 Y'-0.98 Y'. By controlling the degree of the first evaporation to the above-mentioned range, the sodium chloride can precipitate as far as possible in the first evaporation process, and the sodium sulfate crystal is dissolved fully in the cooling treatment, so that pure sodium chloride crystal is obtained through separation finally. By causing the sodium chloride to crystallize in the first evaporation as far as possible, the efficiency of the waste water treatment can be improved, and energy waste can be reduced.

In the present invention, the purpose of the cooling treatment is to drive the sodium sulfate crystal that is contained possibly in the first concentrated solution that contains sodium chloride crystal to dissolve and drive the sodium chloride to further precipitate. Causing the sodium sulfate crystal in the first concentrated solution that contains sodium chloride crystal to dissolve in the cooling treatment process means that the degree of the first evaporation must be controlled appropriately to obtain pure sodium chloride crystal, which is to say, the concentration of sodium sulfate in the mixture system is controlled so that it doesn't exceed the corresponding solubility of sodium sulfate under the conditions of the cooling treatment. Besides, in the cooling treatment process, sodium sulfate crystal may be entrained in the sodium chloride crystal or absorbed to the surface of the sodium chloride crystal. In the present invention, the content of sodium sulfate in the obtained sodium chloride crystal preferably is 8 mass % or lower, more preferably is 4 mass % or lower. In the present invention, if the content of sodium sulfate crystal in the obtained sodium chloride crystal is 8 mass % or lower, it is deemed that the sodium sulfate is dissolved. It should be understood that the quantity of the obtained sodium chloride crystal is measured by dry mass.

There is no particular restriction on the conditions of the cooling treatment, as long as the above-mentioned purpose can be attained through the cooling treatment. For example, the conditions of the cooling treatment may include: temperature: 13° C.-100° C., preferably 15° C.-45° C., more preferably 15° C.-35° C., further preferably 17.9° C.-35° C.; still further preferably 17.9° C.-25° C. To ensure the effect of the cooling treatment, preferably, the conditions of the cooling treatment include: time: 5 min. or longer, preferably 5 min.-120 min., more preferably 30 min.-90 min.; further preferably 50 min.-60 min. Examples of the temperature of the cooling treatment may include: 13° C., 14° C., 15° C., 15.5° C., 16° C., 16.5° C., 17° C., 17.5° C., 17.9° C., 18° C., 18.5° C., 19° C., 19.5° C., 20° C., 21° C., 23° C., 25° C., 27° C., 30° C., 31° C., 31.5° C., 32° C., 33° C., 34° C., 35° C., 40° C., 45° C., 50° C., or 55° C., etc.

Examples of the time of the cooling treatment may include: 5 min., 6 min., 7 min., 8 min., 10 min., 15 min., 20 min., 25 min., 30 min., 35 min., 40 min., 45 min., 50 min., 52 min., 54 min., 56 min., 58 min., 60 min., 70 min., 100 min., or 120 min.

According to the present invention, the cooling treatment is executed in a low temperature treatment tank 55. After the first concentrated solution that contains sodium chloride crystal is treated by cooling treatment in the low temperature treatment tank 55, the treated solution that contains sodium chloride crystal is obtained. There is no particular restriction on the low temperature treatment tank 55. For example, the low temperature treatment tank 55 may be a thickener, a crystallization tank with a stirrer, or a crystallization tank with external circulation, wherein preferably the low temperature treatment tank 55 is a crystallization tank with a stirrer. Preferably the low temperature treatment tank 55 is equipped with a mixing component, which mixes the first concentrated solution to a homogeneous state in the cooling treatment process. For example, the low temperature treatment tank 55 may be equipped with a conventional mechanical stirrer, electromagnetic stirrer, and/or external circulation device, which preferably maintains the solid-liquid distribution in the first concentrated solution in a homogeneous state. By mixing the first concentrated solution to a homogenous state, the parts of the first concentrated solution are maintained in a uniform temperature and concentration state, so as to avoid insufficient dissolution of sodium sulfate crystal and improve the efficiency of the cooling treatment. Preferably the low temperature treatment tank 55 has a cooling component, which decreases the temperature in the low temperature treatment tank 55 to a value required for the cooling treatment by introducing a cooling medium.

In the present invention, the degree of the first evaporation is ascertained by monitoring the amount of evaporation (or amount of the condensate) in the first evaporation or the concentration of the first concentrated solution. Specifically, if the degree of the first evaporation is ascertained by measuring the amount of evaporation, concentration ratio is controlled by controlling the amount of evaporation (i.e., the amount of secondary steam or amount of first ammonia water), and the degree of the concentration by first evaporation is monitored by measuring the amount of evaporation, so that the sodium sulfate crystal precipitating in the first concentrated solution obtained in the first evaporation can be dissolved in the cooling treatment. Specifically, a mass flow meter may be used to measure the flow and thereby measure the amount of the secondary steam, or the amount of the condensate may be measured; if the degree of the first evaporation is ascertained by measuring the concentration, the sodium sulfate in the first concentrated solution doesn't crystallize and precipitate in the first evaporation by controlling the concentration of the first concentrated solution obtained in the first evaporation within the above-mentioned range, and the concentration of the liquid obtained in the first evaporation is monitored by measuring the density; specifically, a densitometer may be used to measure the density.

According to the present invention, to take full advantage of the heat in the first ammonia-containing vapor obtained in the first evaporation, preferably second heat exchange between the first mother liquid and the first ammonia-containing vapor is executed, before the first mother liquid is fed into the first MVR evaporation device 1.

According to a preferred embodiment of the present invention, the second heat exchange between the first mother liquid and the first ammonia-containing vapor is executed in a third heat exchange device 33 and a fourth heat exchange device 34 respectively. Specifically, the first mother liquid flows through the third heat exchange device 33 and the fourth heat exchange device 34 sequentially, and the first ammonia-containing vapor flows through the fourth heat exchange device 34 and the third heat exchange device 33 sequentially, so that the temperature of the first mother liquid is increased to facilitate the first evaporation, while the first ammonia-containing vapor is condensed to obtain first ammonia water. After the heat exchange in the third heat exchange device 33, the temperature of the first mother liquid is increased to 44° C.-174° C., preferably 94° C.-109° C.; after the heat exchange in the fourth heat exchange device 34, the temperature of the first mother liquid is increased to 52° C.-182° C., preferably 102° C.-117° C.

According to the present invention, to take full advantage of the heat in the first crystal-containing concentrated solution obtained in the first evaporation, preferably second heat exchange between the first crystal-containing concentrated solution and the first mother liquid is executed before the cooling treatment.

According to a preferred embodiment of the present invention, the second heat exchange between the first crystal-containing concentrated solution and the first mother liquid is executed in a fifth heat exchange device 35. Specifically, the first mother liquid and the first crystal-containing concentrated solution flow through the fifth heat exchange device 35 respectively, so that the temperature of the first mother liquid is increased to facilitate first evaporation, while the first crystal-containing concentrated solution is cooled to facilitate cooling treatment. After the heat exchange in the fifth heat exchange device 35, the temperature of the first mother liquid is increased to 44° C.-174° C., preferably 94° C.-109° C.

According to the present invention, preferably the pH value of the first mother liquid is adjusted to a value greater than 9, preferably greater than 10.8, before the first mother liquid (i.e., the liquid phase obtained in the first solid-liquid separation) is fed into the first MVR evaporation device 1. Besides, there is no particular restriction on the upper limit of adjustment of the pH value of the first mother liquid. For example, the adjusted pH value may be 14 or lower, preferably is 13.5 or lower, more preferably is 13 or lower, further preferably is 12 or lower, still further preferably is 11.5 or lower. By adjusting the pH of the first mother liquid to the above-mentioned range, ammonia can be fully evaporated in the first evaporation process, and thereby the purity of the obtained sodium chloride can be improved. The pH adjustment for the first mother liquid may be executed with reference to the pH adjustment for the waste water to be treated as described above, except that the target range of the pH adjustment is different.

For example, before the first mother liquid is fed into the first MVR evaporation device 1, the pH value of the first mother liquid may be adjusted to any of the following values: 9, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.2, 12.4, 12.6, 12.8, 13, 13.5, or 14, etc.

According to a preferred embodiment of the present invention, before the first mother liquid is fed into the first MVR evaporation device 1, water solution of an alkaline substance is introduced into the pipeline through which the first mother liquid is fed into the first MVR evaporation device 1, and is mixed with the first mother liquid, to attain the purpose of pH adjustment. In addition, the pH value of the first mother liquid after the adjustment may be monitored with a second pH measuring device 62.

According to the present invention, the second solid-liquid separation may be executed in a second solid-liquid separation device 92 (e.g., centrifugal machine, band filter, or plate and frame filter, etc.). After the second solid-liquid separation, the second mother liquid obtained in the second solid-liquid separation device 92 (i.e., the liquid phase obtained in the second solid-liquid separation) is returned to the cooling crystallization device 2 for further cooling crystallization, or is returned to the concentration device for concentration. Specifically, the second mother liquid may be returned by means of a ninth circulation pump 79 to a position just before the first pH adjustment. Besides, it is inevitable that the obtained sodium chloride crystal has some impurities absorbed thereon, such as sulfate ions, free ammonia, and hydroxyl ions, etc. Preferably, the sodium chloride crystal is washed in a second washing with water, the waste water containing ammonium salts, or sodium chloride solution and dried, to remove the absorbed impurities, reduce off-odor of the solid salt, decrease causticity, and improve the purity of the crystal. To prevent the sodium chloride crystal from dissolved in the washing process, preferably, the sodium chloride crystal is washed with sodium chloride solution. More preferably, the concentration of the sodium chloride solution preferably is the concentration of sodium chloride in water solution where sodium chloride and sodium sulfate are saturated at the same time at the temperature corresponding to the sodium chloride crystal to be washed. The second washing preferably is elutriation followed by elution. The second washing liquid obtained in the above washing process preferably is returned by means of a tenth circulation pump 80 to the first MVR evaporation device 1 for first evaporation again.

There is no particular restriction on the specific method for the second solid-liquid separation and the second washing. For example, the second solid-liquid separation and the second washing may be executed with conventional elutriation apparatus and solid-liquid separation apparatus in combination, or may be executed in a staged solid-liquid separation apparatus, such as a band filter. There is no particular restriction on the elutriation and elution. In other words, they can be executed with a conventional method in the art. There is no particular restriction on the number of cycles of the elutriation and elution. For example, one cycle or more may be selected. To obtain sodium chloride crystal at higher purity, preferably the elutriation and elution are executed for 2-4 cycles. In the elutriation process, the elutriating liquid usually is not reused by circulation if the waste water containing ammonium salts is used as the elutriating liquid; or the elutriating liquid may be reused by counter-current circulation if the washing liquid recycled in the second washing is used as the elutriating liquid. Before the elutriation is executed, preferably slurry that contains sodium chloride crystal (as long as the liquid content is 35 mass % or lower) is obtained through preliminary solid-liquid separation by sedimentation. In the elutriation process, in relation to 1 pbw slurry that contains sodium chloride crystal, the liquid used for the elutriation is 1-20 pbw. The elution preferably is executed with sodium chloride solution (the concentration of the sodium chloride solution preferably is the concentration of sodium chloride in water solution where both sodium chloride and sodium sulfate are saturated at the temperature corresponding to the sodium chloride crystal to be washed). To further improve the effect of the elutriation and obtain sodium chloride crystal at higher purity, the elutriation is executed preferably with the eluent obtained in the elution. For the liquid produced in the washing, preferably the washing liquid (water or sodium chloride solution) and the elutriant are returned to the first MVR evaporation device 1.

According to a preferred embodiment of the present invention, the first concentrated solution that contains sodium chloride crystal or the treated solution that contains sodium chloride crystal is elutriated in another elutriation tank with the liquid obtained in the follow-up sodium chloride crystal washing after it is treated by preliminary solid-liquid separation by means of sedimentation, and then the elutriated treated solution that contains sodium chloride crystal is fed into a solid-liquid separation device for solid-liquid separation; the crystal obtained in the solid-liquid separation is eluted with sodium chloride solution (the concentration of the sodium chloride solution preferably is the concentration of sodium chloride in the water solution when both sodium chloride and sodium sulfate are saturated at the temperature corresponding to the sodium chloride crystal to be washed), and the liquid obtained in the elution is returned as elutriant to the elutriation process. Through the above washing process that incorporates elutriation and elution, the purity of the obtained sodium chloride crystal is improved, no excessive washing liquid is introduced into the system, and the efficiency of the waste water treatment is improved.

Figure 6:
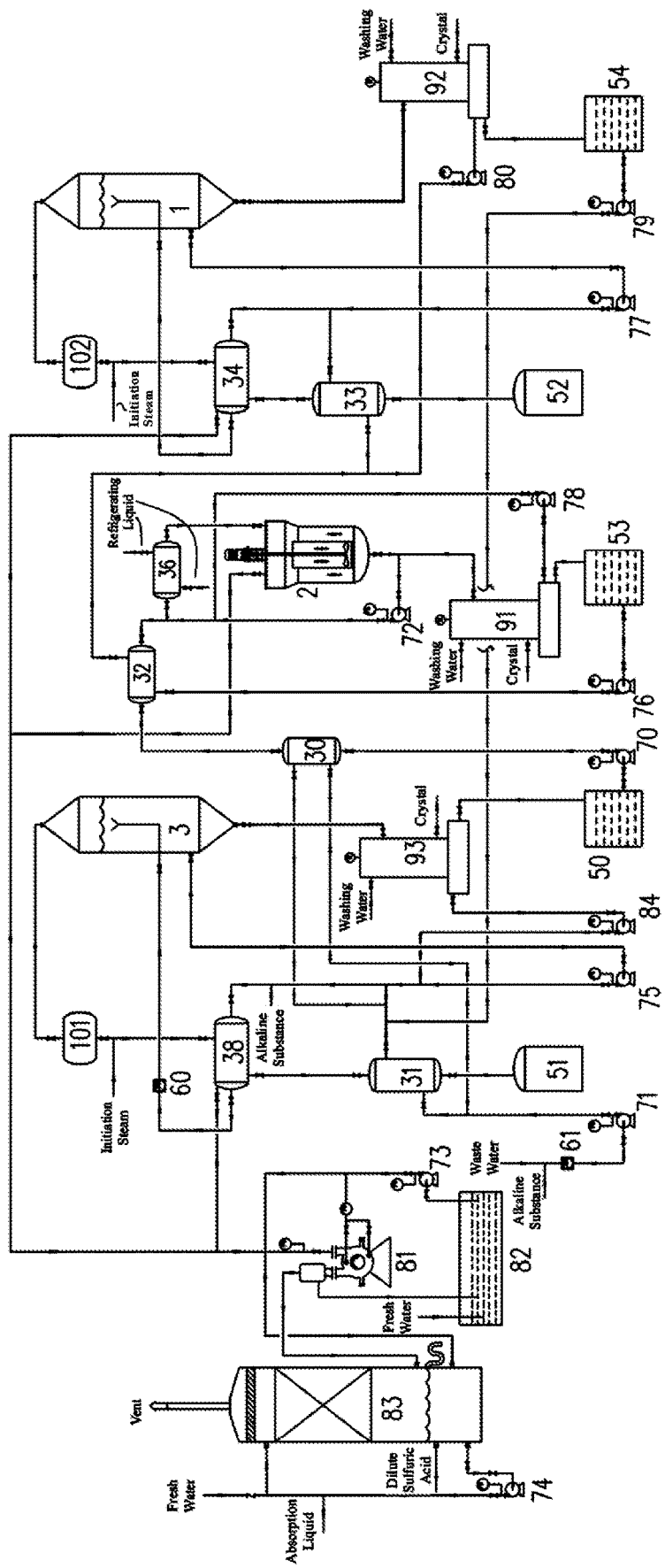
FIG. 6 is a flow diagram of the method for treating waste water containing ammonium salts in another embodiments of the present invention.
Figure 7:
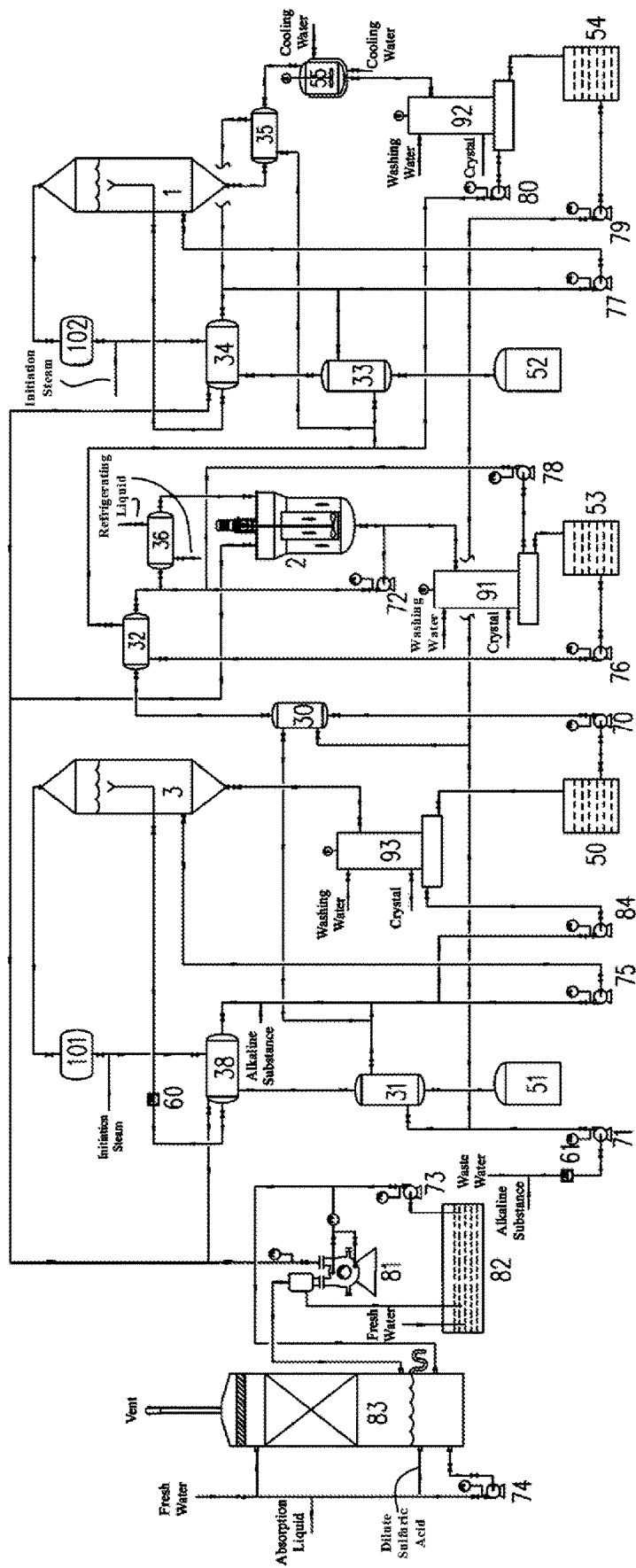
FIG. 7 is a flow diagram of the method for treating waste water containing ammonium salts in another embodiments of the present invention.

In a fifth aspect, the present invention provides a method for treating waste water containing ammonium salts that contains $NH_4^+$, $SO_4^{2-}$, $Cl^-$ and $Na^+$ as shown in FIGS. 6-7, which comprises the following steps:

1) treating waste water to be treated by second evaporation, to obtain second ammonia-containing vapor and second concentrated solution that contains sodium sulfate crystal, wherein the waste water to be treated contains the waste water containing ammonium salts;
2) treating the second concentrated solution that contains sodium sulfate crystal by third solid-liquid separation, and treating the liquid phase obtained in the third solid-liquid separation by cooling crystallization, to obtain crystalline solution that contains sodium sulfate crystal;
3) treating the crystalline solution that contains sodium sulfate crystal by fourth solid-liquid separation, and treating the liquid phase obtained in the fourth solid-liquid separation by third evaporation, to obtain third ammonia-containing vapor and third concentrated solution that contains sodium chloride crystal;
4) treating the third concentrated solution that contains sodium chloride crystal by fifth solid-liquid separation;

wherein the pH of the waste water to be treated is adjusted to a value greater than 9, before the waste water to be treated is treated by the second evaporation; in relation to 1 mol $SO_4^{2-}$ contained in the waste water to be treated, the $Cl^-$ contained in the waste water to be treated is 14 mol or less; the second evaporation is executed in a way that no sodium chloride crystallizes and precipitates.

Preferably, the waste water to be treated is the waste water containing ammonium salts; or the waste water to be treated contains the waste water containing ammonium salts and the liquid phase obtained in the fifth solid-liquid separation.

More preferably, the waste water to be treated is mixed solution of the waste water containing ammonium salts and at least a part of the liquid phase obtained in the fifth solid-liquid separation.

The method provided in the present invention can treat waste water containing ammonium salts, which contains $NH_4^+$, $SO_4^{2-}$, $Cl^-$ and $Na^+$, and there is no particular restriction on the waste water containing ammonium salts, except that the waste water contains $NH_4^+$, $SO_4^{2-}$, $Cl^-$ and $Na^+$.

In the present invention, there is no particular restriction on the order of the first heat exchange, the adjustment of pH value of the waste water to be treated, and the blending process of the waste water to be treated (in the case that the waste water to be treated contains the waste water containing ammonium salts and the liquid phase obtained in the fifth solid-liquid separation, a blending process of the waste water to be treated is required), and the order may be selected appropriately as required, as long as those procedures are accomplished before the second evaporation of the waste water to be treated.

In the present invention, the purpose of the second evaporation is to drive the sodium sulfate to crystallize and precipitate, concentrate the waste water to be treated, and obtain relatively thick ammonia water at the same time, so as to improve ion concentration and precipitation ratio of cooling crystallization. The degree of the second evaporation may be selected as required according to the components of the waste water to be treated, as long as only sodium sulfate crystallizes and precipitates. For example, the evaporation may be controlled so that only a small quantity of ammonia-containing vapor is obtained, and thereby ammonia water at relatively high concentration is obtained; alternatively, the degree of the evaporation may be controlled so that the waste water to be treated is concentrated, and the ion concentration is controlled at the same time so that pure sodium sulfate can be obtained in the follow-up cooling crystallization; or the evaporation may be controlled to complete fully, so that the waste water to be treated is concentrated and the efficiency of cooling crystallization can be improved.

In the present invention, the device used for the second evaporation is the same as that used for the first evaporation, and will not be further detailed here. For example, the second evaporation may be executed in a second MVR evaporation device 3.

According to the present invention, there is no particular restriction on the conditions of the second evaporation, as long as the purpose of concentrating the waste water to be treated is attained. For example, the conditions of the second evaporation may include: temperature: 35° C. or above; pressure: −98 kPa or above. To improve the efficiency of evaporation, preferably, the conditions of the second evaporation include: temperature: 75° C.-130° C.; pressure: −73 kPa-117 kPa; preferably, the conditions of the second evaporation include: temperature: 85° C.-130° C.; pressure: −58 kPa-117 kPa; preferably, the conditions of the second evaporation include: temperature: 95° C.-110° C.; pressure: −37 kPa-12 kPa; preferably, the conditions of the second evaporation include: temperature: 95° C.-105° C.; pressure: −37 kPa-7 kPa.

In the present invention, the operating pressure of the second evaporation preferably is the saturated vapor pressure of the evaporated feed liquid. In addition, the amount of evaporation in the second evaporation may be selected appropriately according to the processing capacity of the apparatus and the amount of the waste water to be treated. For example, the amount of evaporation may be 0.1 m³/h or more (e.g., 0.1 m³/h-500 m³/h).

For the purpose of improving the waste water treatment efficiency, in relation to 1 mol $SO_4^{2-}$ contained in the waste water to be treated, the $Cl^-$ contained in the waste water to be treated is 14 mol or less, preferably is 13.8 mol or less, more preferably is 13.75 mol or less, even more preferably is 13.5 mol or less, further preferably is 13 mol or less, still further preferably is 12 mol or less, still further preferably is 11 mol or less, still further preferably is 10.5 mol or less, preferably is 2 mol or more, more preferably is 2.5 mol or more, further preferably is 3 mol or more, e.g., 1.5-6.02 mol. By controlling the molar ratio of $SO_4^{2-}$ to $Cl^-$ to the above-mentioned range, sodium sulfate precipitates while sodium chloride doesn't precipitate in the second evaporation.

By controlling the conditions of the second evaporation appropriately, the ammonia contained in the waste water to be treated obtained in the evaporation may be 80 mass % or higher, preferably is 90 mass % or higher, e.g., 80 mass %, 83 mass %, 85 mass %, 86 mass %, 87 mass %, 88 mass %, 89 mass %, 90 mass %, 91 mass %, 93 mass %, 95 mass %, or 98 mass %, etc. The first ammonia water may be directly reused in a catalyst production process, or may be neutralized with acid to obtain ammonium salts and then the ammonium salts are reused, or may be blended with water and corresponding ammonium salts or ammonia water and then reused.

According to a preferred embodiment of the present invention, through the second evaporation, the concentration of sodium chloride in the second concentrated solution is X or lower, where, X is the concentration of sodium chloride in the second concentrated solution when both sodium chloride and sodium sulfate are saturated under the conditions of the second evaporation. Preferably, through the second evaporation, the concentration of sodium chloride in the second concentrated solution is 0.95 X-0.999 X. If sodium sulfate crystal is only obtained in the cooling crystallization, preferably, the concentration of $Cl^-$ in the liquid phase obtained in the third solid-liquid separation (i.e., third mother liquid) is 5.2 mol/L or lower; more preferably, the concentration of $Cl^-$ in the liquid phase obtained in the third solid-liquid separation is 5.0 mol/L or lower. By controlling the degree of the second evaporation, sodium sulfate crystallizes and precipitates as far as possible, and the concentration of chloride ions in the liquid phase obtained in the third solid-liquid separation meets the criterion for preventing sodium chloride from precipitating in the cooling crystallization at the same time, and thereby the efficiency of the waste water treatment can be improved.

In the present invention, the degree of the second evaporation is ascertained by monitoring the concentration of the liquid obtained in the second evaporation. Specifically, by controlling the concentration of the liquid obtained in the second evaporation within the above-mentioned range, the sodium chloride doesn't crystallize and precipitate in the second evaporation. Here, the concentration of the liquid obtained in the second evaporation is monitored by measuring the density of the liquid; specifically, the density may be measured with a densitometer.

According to the present invention, the pH value of the waste water to be treated is adjusted to a value greater than 9, preferably greater than 10.8, before the waste water to be treated is treated by the second evaporation. Besides, there is no particular restriction on the upper limit of pH adjustment of the waste water to be treated. For example, the pH may be 14 or lower, preferably is 13.5 or lower, more preferably is 13 or lower. By executing the second evaporation at the above-mentioned pH value, ammonia evaporation can be promoted, ammonia water at relatively high concentration can be obtained, and high-purity sodium sulfate and sodium chloride crystal can be obtained in the follow-up crystallization process.

For example, before the waste water to be treated is treated by the second evaporation, the pH value of the waste water to be treated may be adjusted to any of the following values: 9, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.2, 12.4, 12.6, 12.8, 13, 13.5, or 14, etc.

In the present invention, there is no particular restriction on the pH adjustment method. For example, the pH value of the waste water to be treated may be adjusted by adding an alkaline substance. There is no particular restriction on the alkaline substance, as long as the alkaline substance can attain the purpose of adjusting the pH. To avoid introducing any new impurity into the waste water to be treated and improve the purity of the obtained crystal, the alkaline substance preferably is NaOH. In addition, in view that the fifth mother liquid (i.e., the liquid phase obtained in the fifth solid-liquid separation) contains NaOH at relatively high concentration, preferably the fifth mother liquid is used as the alkaline substance, and additional NaOH may be added.

The alkaline substance may be added with a conventional method in the art. However, preferably the alkaline substance is mixed in the form of water solution with the waste water to be treated. For example, water solution that contains the alkaline substance may be charged into a pipeline through which the waste water to be treated is inputted. There is no particular restriction on the content of the alkaline substance in the water solution, as long as the water solution can attain the purpose of adjusting the pH. However, to reduce the amount of water and further reduce the cost, preferably saturated water solution of the alkaline substance or the fifth mother liquid is used. To monitor the pH of the waste water to be treated, the pH of the waste water to be treated may be measured after the pH adjustment.

According to a preferred embodiment of the present invention, the second evaporation is executed in a second MVR evaporation device 3. Before the waste water to be treated is fed into the second MVR evaporation device 3, the pH value is adjusted by introducing the water solution that contains an alkaline substance into the pipeline through which the waste water to be treated is fed into the second MVR evaporation device 3 and mixing the water solution that contains an alkaline substance with the waste water to be treated there, and the adjusted pH value is measured with a first pH measuring device 61 and a second pH measuring device 60.

According to the present invention, to take full advantage of the heat in the second ammonia-containing vapor, preferably first heat exchange between the waste water to be treated and the second ammonia-containing vapor is executed before the waste water to be treated is treated by second evaporation, to obtain first ammonia water and increase the temperature of the waste water to be treated at the same time to facilitate evaporation.

According to a preferred embodiment of the present invention, the first heat exchange between the waste water to be treated and the second ammonia-containing vapor is executed in a first heat exchange device 31 and an eighth heat exchange device 38. Specifically, the ammonia-containing vapor flows through the eighth heat exchange device 38 and the first heat exchange device 31 sequentially, and the waste water to be treated flows through the first heat exchange device 31 to exchange heat with condensate of the second ammonia-containing vapor, and then flows through the eighth heat exchange device 38 to exchange heat with the second ammonia-containing vapor. Through the first heat exchange, first ammonia water is obtained and stored in a first ammonia water storage tank 51, and the temperature of the waste water to be treated is increased to 82° C.-137° C. at the same time, preferably is increased to 102° C.-117° C., to facilitate evaporation.

According to the present invention, to take full advantage of the heat in the second concentrated solution, preferably first heat exchange between the waste water to be treated and the second concentrated solution is executed before the waste water to be treated is treated by second evaporation, so that the temperature of the second concentrated solution is decreased to facilitate cooling crystallization, while the temperature of the waste water to be treated is increased to facilitate evaporation.

According to a preferred embodiment of the present invention, the first heat exchange between the waste water to be treated and the second concentrated solution is executed in an eleventh heat exchange device 30; thus, the waste water to be treated exchanges heat with the second concentrated solution in the eleventh heat exchange device 30.

In the present invention, through third solid-liquid separation of the second concentrated solution that contains sodium sulfate crystal, sodium sulfate crystal and third mother liquid (i.e., the liquid phase obtained in the third solid-liquid separation) are obtained. There is no particular restriction on the method of the third solid-liquid separation. For example, the method may be selected from one or more of centrifugation, filtering, and sedimentation.

According to the present invention, the third solid-liquid separation for the second concentrated solution may be executed in a third solid-liquid separation device 93 (e.g., centrifugal machine, band filter, or plate and frame filter, etc.). As shown in FIG. 6, after the third solid-liquid separation, the third mother liquid obtained in the third solid-liquid separation device 93 is stored temporarily in a third mother liquid tank 50, and may be fed by means of an eleventh circulation pump 70 into the cooling crystallization device 2 for cooling crystallization. In addition, preferably the solid phase obtained in the third solid-liquid separation is washed by third washing.

The third solid-liquid separation and the third washing may be executed in the same way as the first solid-liquid separation and the first washing respectively, and will not be further detailed here. The liquid produced in the washing preferably is returned to a position before the first heat exchange is completed before the second evaporation.

According to a preferred embodiment of the present invention, after the second concentrated solution that contains sodium sulfate crystal is treated through preliminary solid-liquid separation by sedimentation, the obtained solution is elutriated for the first time with the waste water containing ammonium salts in an elutriation tank, then is elutriated for the second time with the liquid obtained in the follow-up sodium sulfate crystal washing in another elutriation tank, and finally the slurry obtained through twice elutriations is fed into the second solid-liquid separation device for solid-liquid separation; then, the crystal obtained in the solid-liquid separation is eluted with sodium sulfate solution, and the liquid obtained in the elution is returned to the second elutriation. Through the above washing process, the purity of the obtained sodium sulfate crystal is improved, no excessive washing liquid is introduced into the system, and the efficiency of the waste water treatment is improved.

In the present invention, crystalline solution that only contains sodium sulfate crystal or crystalline solution that contains sodium sulfate crystal and sodium chloride crystal may be obtained in the cooling crystallization. If the cooling crystallization is executed for a purpose of driving the sodium sulfate to precipitate so that the sodium sulfate is separated from the waste water, preferably the cooling crystallization is executed in a way that ensures the crystalline solution obtained in the cooling crystallization only contains sodium sulfate crystal. Here, the obtained sodium sulfate crystal (i.e., the solid phase obtained in the fourth solid-liquid separation) is sodium sulfate hydrate crystal (e.g., sodium sulfate decahydrate crystal), which may be directly used as a product; or the combined water in the sodium sulfate hydrate crystal may be removed, e.g., through a heating procedure, to obtain sodium sulfate crystal; or the sodium sulfate hydrate crystal may be returned to the second evaporation process for evaporation so as to obtain sodium sulfate crystal that doesn't include combined water. In addition, if the cooling crystallization is executed for a purpose of obtaining sodium sulfate that doesn't include combined water, the cooling crystallization may be executed in a way that ensures the obtained crystalline solution contains sodium sulfate crystal (sodium sulfate crystal hydrate) and sodium chloride crystal. Here, preferably the sodium sulfate crystal and sodium chloride crystal obtained in the cooling crystallization (i.e., the solid phase obtained in the fourth solid-liquid separation) are returned to the second evaporation process together for evaporation, so as to obtain sodium sulfate crystal that doesn't include combined water. As a method for returning the crystal obtained in the cooling crystallization to the second evaporation process, preferably it is returned to a position before the pH adjustment and the first heat exchange procedures before the second evaporation; for example, the crystal may be returned to the waste water pipeline before the first pH adjustment device 61.

According to a preferred embodiment of the present invention, to obtain high-purity sodium sulfate crystal, preferably the cooling crystallization is executed in a way that no sodium chloride crystal precipitates, i.e., crystalline solution that only contains sodium sulfate crystal is obtained, so that the sodium sulfate can be separated from the waste water successfully. The cooling crystallization only drives the sodium sulfate to precipitate, but doesn't exclude sodium chloride, which is entrained in the sodium sulfate crystal or absorbed to the surface of the sodium sulfate crystal. In the present invention, preferably the content of sodium sulfate in the obtained sodium sulfate crystal is 92 mass % or higher, more preferably is 96 mass % or higher, further preferably is 98 mass % or higher. It should be understood that the quantity of the obtained sodium sulfate crystal is measured by dry mass. If the content of sodium sulfate in the obtained sodium sulfate crystal is within the above-mentioned range, it is deemed that only sodium sulfate precipitates. Namely, if the total content of impurities (sodium chloride, etc.) in the obtained sodium sulfate crystal is 8 mass % or lower, it is deemed that only sodium sulfate precipitates.

To ensure that sodium sulfate crystal is obtained in the cooling crystallization, the concentration of $SO_4^{2-}$ in the third mother liquid preferably is 0.01 mol/L or higher, more preferably is 0.07 mol/L or higher, further preferably is 0.1 mol/L or higher, still further preferably is 0.2 mol/L or higher, particularly preferably is 0.3 mol/L or higher. According to the present invention, to improve the purity of the sodium sulfate crystal obtained in the cooling crystallization, the concentration of $Cl^-$ in the third mother liquid preferably is 5.2 mol/L or lower, more preferably is 5 mol/L or lower, further preferably is 4.5 mol/L or lower, still further preferably is 4 mol/L or lower, so that the sodium chloride doesn't precipitate in the cooling crystallization.

By controlling the concentration values of $SO_4^{2-}$ and $Cl^-$ in the third mother liquid within the above-mentioned ranges, the second evaporation can be executed fully, and sodium sulfate crystallizes and precipitates but sodium chloride doesn't precipitate in the cooling crystallization, and thereby a purpose of separating sodium sulfate efficiently is attained. In the present invention, if the concentration of $SO_4^{2-}$ or $Cl^-$ in the third mother liquid is not within the above-mentioned range, the concentration may be adjusted before the cooling crystallization is executed. Preferably, the concentration may be adjusted with the waste water containing ammonium salts, the sodium sulfate crystal washing liquid, and/or the fifth mother liquid, etc., which may be mixed with the fifth mother liquid in the third mother liquid tank 50 specifically.

Examples of the content of $SO_4^{2-}$ in the third mother liquid may include: 0.01 mol/L, 0.03 mol/L, 0.05 mol/L, 0.08 mol/L, 0.1 mol/L, 0.2 mol/L, 0.3 mol/L, 0.4 mol/L, 0.5 mol/L, 0.6 mol/L, or 0.7 mol/L, etc.

In addition, examples of the content of $Cl^-$ in the third mother liquid may include: 2.0 mol/L, 2.2 mol/L, 2.4 mol/L, 2.6 mol/L, 2.8 mol/L, 3 mol/L, 3.2 mol/L, 3.4 mol/L, 3.6 mol/L, 3.8 mol/L, 4 mol/L, 4.5 mol/L, or 5 mol/L, etc.

According to another preferred embodiment of the present invention, if the solid phase obtained in the fourth solid-liquid separation is not used as a product of the waste water treatment, the cooling crystallization may be executed in a way that sodium chloride crystallizes and precipitates, i.e., sodium sulfate crystal and sodium chloride crystal are obtained at the same time in the cooling crystallization; here, the sodium sulfate crystal and sodium chloride crystal obtained in the cooling crystallization are returned to the second evaporation process together for evaporation, so as to obtain sodium sulfate crystal that doesn't include combined water. By using the second evaporation and the cooling crystallization in combination, the second evaporation is easier to control, and the efficiency of waste water treatment is improved as well.

By adjusting the pH value of the waste water to be treated to a value greater than 9 before the second evaporation, the majority of $NH_4^+$ is evaporated out in the form of ammonia molecules in the second evaporation; thus, ammonium sulfate and/or ammonium chloride will not precipitate in the cooling crystallization process, and the precipitation ratio of sodium sulfate can be improved because the concentration of sodium chloride is improved.

According to the present invention, the conditions of the cooling crystallization are the same as the conditions of the cooling crystallization in the method in the third aspect, and will not be further detailed here.

In the present invention, through fourth solid-liquid separation of the crystalline solution that contains sodium sulfate crystal, sodium sulfate crystal and fourth mother liquid (i.e., the liquid phase obtained in the fourth solid-liquid separation) are obtained. There is no particular restriction on the method of the fourth solid-liquid separation. For example, the method may be selected from one or more of centrifugation, filtering, and sedimentation.

According to the present invention, the fourth solid-liquid separation may be performed in a first solid-liquid separation device 91 (e.g., centrifugal machine, band filter, or plate and frame filter, etc.). After the fourth solid-liquid separation, the fourth mother liquid obtained in the first solid-liquid separation device 91 is stored temporarily in a first mother liquid tank 53, and may be pumped by a sixth circulation pump 76 into the first MVR evaporation device 1 for third evaporation. In addition, preferably the solid phase obtained in the fourth solid-liquid separation is washed by fourth washing.

The fourth solid-liquid separation and the fourth washing may be executed in the same way as the first solid-liquid separation and the first washing respectively, and will not be further detailed here. For the liquid produced in the washing, preferably the washing liquid (water or sodium sulfate solution) is returned to the cooling crystallization device 2. For example, the liquid may be returned by means of an eighth circulation pump 78 to the cooling crystallization device 2.

According to a preferred embodiment of the present invention, after the crystalline solution that contains sodium sulfate is obtained through cooling crystallization, solid-liquid separation is executed with a solid-liquid separation device, and the crystal obtained in the solid-liquid separation is eluted with sodium sulfate solution (the concentration of the sodium sulfate solution is the concentration of sodium sulfate in water solution where both sodium chloride and sodium sulfate are saturated at the temperature corresponding to the sodium sulfate crystal to be washed), and the liquid obtained in the elution is returned to the cooling crystallization device 2. Through the washing process described above, the purity of the obtained sodium sulfate crystal can be improved.

According to the present invention, to take full advantage of the cooling capacity of the fourth mother liquid, preferably second heat exchange between the fourth mother liquid and the third mother liquid is executed before the third mother liquid is treated by cooling crystallization.

According to a preferred embodiment of the present invention, the second heat exchange is executed in a second heat exchange device 32; specifically, the fourth mother liquid and the third mother liquid flow through the second heat exchange device 32 respectively, so that they exchange heat and thereby the temperature of the third mother liquid is decreased to facilitate cooling crystallization, while the temperature of the fourth mother liquid is increased to facilitate third evaporation. After the second heat exchange in the second heat exchange device 32, the temperature of the third mother liquid is −20.7° C.-16.5° C., preferably is −5° C.-10° C., close to the temperature of cooling crystallization.

According to the present invention, to facilitate cooling crystallization, second heat exchange between the third mother liquid and refrigerating liquid is executed. According to a preferred embodiment of the present invention, the second heat exchange between the third mother liquid and the refrigerating liquid is executed in a sixth heat exchange device 36; specifically, the refrigerating liquid and the third mother liquid flow through the sixth heat exchange device 36 respectively so that they exchange heat with each other, and thereby the temperature of the third mother liquid is decreased to facilitate cooling crystallization. The refrigerating liquid may be any conventional refrigerating liquid for cooling in the art, as long as it can cool the third mother liquid to a temperature that meets the cooling crystallization requirement.

In the present invention, the device used for the third evaporation is the same as that used for the first evaporation, and will not be further detailed.

According to a preferred embodiment of the present invention, in a case that the cooling treatment is not used, the purpose of the third evaporation is to drive the sodium chloride to precipitate and evaporate the ammonia further, so as to attain a purpose of separating the ammonia and salts in the waste water.

In the present invention, there is no particular restriction on the evaporation conditions of the third evaporation; in other words, the evaporation conditions may be selected appropriately as required, as long as the purpose of crystallization can be attained. The conditions of the third evaporation may include: temperature: temperature: 17.5° C. or above; pressure: −101 kPa or above; preferably, the conditions of the third evaporation include: temperature: 35° C.-110° C.; pressure: −98 kPa-12 kPa; preferably, the conditions of the third evaporation include: temperature: 45° C.-110° C.; pressure: −95 kPa-12 kPa; preferably, the conditions of the third evaporation include: temperature: 50° C.-100° C.; pressure: −93 kPa-22 kPa.

In the present invention, the operating pressure of the third evaporation preferably is the saturated vapor pressure of the evaporated feed liquid. In addition, the amount of evaporation in the third evaporation may be selected appropriately according to the processing capacity of the apparatus and the amount of the waste water to be treated. For example, the amount of evaporation may be 0.1 m$^3$/h or more (e.g., 0.1 m$^3$/h-500 m$^3$/h).

To obtain sodium chloride crystal in the third evaporation process in a better way, preferably, in relation to 1 mol SO$_4^{2-}$ contained in the liquid phase obtained in the fourth solid-liquid separation, the Cl$^-$ contained in the liquid phase obtained in the fourth solid-liquid separation is 7.15 mol or more, preferably is 10 mol or more, preferably is 20 mol or more, more preferably is 44 mol or more, more preferably is 50 mol or more, more preferably is 74 mol or more, preferably is 460 mol or less, more preferably is 230 mol or less, e.g., 43.4-49.8 mol, such as 9.5 mol, 10.5 mol, 11 mol, 11.5 mol, 12 mol, 12.5 mol, 13 mol, 13.5 mol, 14 mol, 14.5 mol, 15 mol, 15.5 mol, 16 mol, 16.5 mol, 17 mol, 17.5 mol, 18 mol, 18.5 mol, 19 mol, 19.5 mol, 20 mol, 21 mol, 22 mol, 23 mol, 25 mol, 27 mol, 29 mol, 31 mol, 35 mol, 40 mol, 45 mol, 50 mol, 60 mol, or 65 mol, etc. By controlling the molar ratio of SO$_4^{2-}$ to Cl$^-$ to the above-mentioned range, high-purity sodium chloride crystal can be obtained through the third evaporation, and separation of sodium sulfate and sodium chloride can be realized.

According to the present invention, for the purpose of improving the efficiency of the waste water treatment, the greater the degree of the third evaporation is, the better the result is; however, if the degree of the third evaporation exceeds a certain degree, third concentrated solution that only contains sodium chloride crystal can't be obtained; in that case, though the crystal may be dissolved, for example, by adding water into the third concentrated solution, the efficiency of the waste water treatment will be degraded. Therefore, preferably the third evaporation is executed to a degree that no sodium sulfate crystal crystallizes and precipitates, which is to say, through the third evaporation, the concentration of sodium sulfate in the third concentrated solution is Y or lower (wherein Y is the concentration of sodium sulfate in the third concentrated solution when both sodium sulfate and sodium chloride are saturated under the conditions of the third evaporation). In view of driving the sodium chloride to precipitate as far as possible while preventing the sodium sulfate from precipitating in the third evaporation procedure, preferably, through the third evaporation, the concentration of sodium sulfate in the third concentrated solution is 0.9 Y-0.99 Y, more preferably is 0.95 Y-0.98 Y. By controlling the degree of the third evaporation to the above-mentioned range, the sodium chloride can precipitate as far as possible in the third evaporation process, and the sodium sulfate doesn't precipitate, so that pure sodium chloride crystal is obtained through separation finally. By causing the sodium chloride to crystallize in the third evaporation as far as possible, the efficiency of the waste water treatment can be improved, and energy waste can be reduced.

In the present invention, the degree of the third evaporation is ascertained by monitoring the concentration of the liquid obtained in the third evaporation. Specifically, by controlling the concentration of the liquid obtained in the third evaporation within the above-mentioned range, the sodium sulfate doesn't crystallize and precipitate in the third evaporation. Here, the concentration of the liquid obtained in the third evaporation is monitored by measuring the density of the liquid; specifically, the density may be measured with a densitometer.

According to another preferred embodiment of the present invention, before the fifth solid-liquid separation is executed, the third concentrated solution that contains sodium chloride crystal is treated by cooling to obtain treated solution that contains sodium chloride crystal; then the treated solution that contains sodium chloride crystal is treated by the fifth solid-liquid separation.

Namely, as shown in FIG. 7, the method for treating waste water containing ammonium salts that contains $NH_4^+$, $SO_4^{2-}$, $Cl^-$ and $Na^+$ in the present invention comprises the following steps:

1) treating waste water to be treated by second evaporation, to obtain second ammonia-containing vapor and second concentrated solution that contains sodium sulfate crystal, wherein the waste water to be treated contains the waste water containing ammonium salts;
2) treating the second concentrated solution that contains sodium sulfate crystal by third solid-liquid separation, and treating the liquid phase obtained in the third solid-liquid separation by cooling crystallization, to obtain crystalline solution that contains sodium sulfate crystal;
3) treating the crystalline solution that contains sodium sulfate crystal by fourth solid-liquid separation, and treating the liquid phase obtained in the fourth solid-liquid separation by third evaporation, to obtain third ammonia-containing vapor and third concentrated solution that contains sodium chloride crystal;
4) treating the third concentrated solution that contains sodium chloride crystal by cooling treatment, to obtain treated solution that contains sodium chloride crystal;
5) treating the treated solution by fifth solid-liquid separation;

wherein the pH of the waste water to be treated is adjusted to a value greater than 9, before the waste water to be treated is treated by the second evaporation;

in relation to 1 mol $SO_4^{2-}$ contained in the waste water to be treated, the $Cl^-$ contained in the waste water to be treated is 14 mol or less;

the second evaporation ensures that the sodium chloride doesn't crystallize and precipitate.

Preferably, the third concentrated solution that contains sodium chloride crystal is third concentrated solution that contains sodium chloride crystal and sodium sulfate crystal, and the sodium sulfate crystal in the third concentrated solution that contains sodium chloride crystal and sodium sulfate crystal is dissolved through the cooling treatment.

In the present invention, in a case that the cooling treatment is used, the purpose of the third evaporation is to drive the sodium chloride and/or sodium sulfate to precipitate and evaporate the ammonia further, so as to attain a purpose of separating the ammonia and salts in the waste water. According to the present invention, the conditions of the third evaporation are controlled so that sodium chloride precipitated first as the solvent is continuously reduced, and then sodium sulfate may precipitate, and third concentrated solution that contains sodium chloride crystal is obtained. To reduce the quantity of circulating water in the treatment system, improve the efficiency of the third evaporation and thereby improve the efficiency of the waste water treatment, the third evaporation preferably is executed to a degree that both the sodium chloride and the sodium sulfate precipitate at the same time, which is to say, preferably third concentrated solution that contains sodium sulfate crystal and sodium chloride crystal is obtained in the third evaporation.

The conditions of the third evaporation may include: temperature: the conditions of the third evaporation include: temperature: 35° C. or above; pressure: −98 kPa or above; preferably, the conditions of the third evaporation include: temperature: 45° C.-175° C.; pressure: −95 kPa-653 kPa; preferably, the conditions of the third evaporation include: temperature: 60° C.-175° C.; pressure: −87 kPa-653 kPa; preferably, the conditions of the third evaporation include: temperature: 75° C.-175° C.; pressure: −73 kPa-653 kPa; preferably, the conditions of the third evaporation include: temperature: 80° C.-130° C.; pressure: −66 kPa-117 kPa; preferably, the conditions of the third evaporation include: temperature: 95° C.-110° C.; pressure: −37 kPa-12 kPa; preferably, the conditions of the third evaporation include: temperature: 105° C.-107° C.; pressure: −8 kPa-0 kPa.

According to the present invention, for the purpose of improving the efficiency of the waste water treatment, the greater the degree of the third evaporation is, the better the result is; however, if the degree of the third evaporation exceeds a certain degree, treated solution that only contains sodium chloride crystal can't be obtained through the cooling treatment; in that case, though the crystal may be dissolved, for example, by adding water into the treated solution, the efficiency of the waste water treatment will be degraded. Therefore, preferably the third evaporation is executed to a degree that sodium chloride crystal and sodium sulfate crystal precipitate at the same time and the sodium sulfate crystal in the third concentrated solution that contains sodium chloride crystal can be dissolved in the cooling treatment; namely, preferably the third concentrated solution that contains sodium chloride crystal, which is obtained in the step 3), is concentrated solution that contains sodium chloride crystal and sodium sulfate crystal, and the sodium sulfate crystal in the concentrated solution that contains sodium chloride crystal and sodium sulfate crystal is dissolved through the cooling treatment. To ensure that the sodium sulfate crystal in the concentrated solution that contains sodium chloride crystal and sodium sulfate crystal can be dissolved in the cooling treatment, for example, the degree of the third evaporation may be controlled so that concentration of sodium sulfate in the treated solution is Y' or lower (wherein Y' is the concentration of sodium sulfate in the treated solution when both sodium sulfate and sodium chloride are saturated under the conditions of the cooling treatment). For the purpose of driving the sodium chloride to precipitate as far as possible and ensuring that the sodium sulfate can be dissolved fully in the follow-up cooling treatment procedure, preferably, through the third evaporation, the concentration of sodium sulfate in the treated solution is 0.9 Y'-0.99 Y', more preferably is 0.95 Y'-0.98 Y'. By controlling the degree of the third evaporation to the above-mentioned range, the sodium chloride can precipitate as far as possible in the third evaporation process, and the sodium sulfate is dissolved fully in the cooling treatment, so that pure sodium chloride crystal is obtained through separation finally. By causing the sodium chloride to crystallize in the third evaporation as far as possible, the efficiency of the waste water treatment can be improved, and energy waste can be reduced.

In the present invention, the degree of the third evaporation is ascertained by monitoring the amount of evaporation in the third evaporation (i.e., the amount of liquid obtained in the third evaporation). Specifically, the concentration ratio is controlled by controlling the amount of evaporation in the third evaporation (i.e., the amount of ammonia water), so that the sodium sulfate crystal that precipitates in the third concentrated solution obtained in the third evaporation can be dissolved in the cooling treatment. Here, the degree of the third evaporation is monitored by measuring the amount of evaporation in the third evaporation; specifically, flow measurement may be performed with a mass flow meter, i.e., the amount of secondary steam or the amount of condensate may be measured.

In the present invention, the purpose of the cooling treatment is to drive the sodium sulfate crystal that is contained possibly in the third concentrated solution that contains sodium chloride crystal to dissolve and drive the sodium chloride to further precipitate. Causing the sodium sulfate crystal in the third concentrated solution that contains sodium chloride crystal to dissolve in the cooling treatment process means that the degree of the third evaporation must be controlled appropriately to obtain pure sodium chloride crystal, which is to say, the concentration of sodium sulfate in the mixture system is controlled so that it doesn't exceed the corresponding solubility of sodium sulfate under the conditions of the cooling treatment, without excluding sodium sulfate that is entrained in the sodium chloride crystal or absorbed to the surface of the sodium chloride crystal. Owing to the fact that the moisture content in the crystal after solid-liquid separation is different, usually the content of sodium sulfate in the obtained sodium chloride crystal is 8 mass % or lower (preferably 4 mass % or lower). In the present invention, it is deemed that the sodium sulfate crystal is dissolved if the content of sodium sulfate in the obtained sodium chloride crystal is 8 mass % or lower.

There is no particular restriction on the conditions of the cooling treatment, as long as the sodium sulfate crystal in the third concentrated solution that contains sodium chloride crystal can be fully dissolved in the cooling treatment process. For example, the conditions of the cooling treatment may include: temperature: 13° C.-100° C., preferably 15° C.-45° C., more preferably 15° C.-35° C., further preferably 17.9° C.-35° C. To ensure the effect of the cooling treatment, preferably, the conditions of the cooling treatment include: time: 5 min. or longer, preferably 5 min.-120 min., more preferably 30 min.-90 min.; further preferably 50 min.-60 min.

The specific temperature, time, and device of the cooling treatment may be the same as those of the cooling treatment in the method in the third aspect, and will not be further detailed here.

According to the present invention, to take full advantage of the heat in the third ammonia-containing vapor obtained in the third evaporation, preferably third heat exchange between the fourth mother liquid and the third ammonia-containing vapor is executed, before the fourth mother liquid is fed into the first MVR evaporation device 1.

According to a preferred embodiment of the present invention, the third heat exchange between the fourth mother liquid and the third ammonia-containing vapor is executed in a third heat exchange device 33 and a fourth heat exchange device 34 respectively. Specifically, the fourth mother liquid flows through the third heat exchange device 33 and the fourth heat exchange device 34 sequentially, and the third ammonia-containing vapor flows through the fourth heat exchange device 34 and the third heat exchange device 33 sequentially, so that the temperature of the fourth mother liquid is increased to facilitate the first evaporation, while the third ammonia-containing vapor is condensed to obtain ammonia water. After the heat exchange in the third heat exchange device 33, the temperature of the fourth mother liquid is increased to 34° C.-109° C., preferably 44° C.-109° C. After the heat exchange in the fourth heat exchange device 34, the temperature of the fourth mother liquid is increased to 42° C.-117° C., preferably 53° C.-117° C.

According to the present invention, the fifth solid-liquid separation may be performed in a second solid-liquid separation device 92 (e.g., centrifugal machine, band filter, or plate and frame filter, etc.). After the fifth solid-liquid separation, the fifth mother liquid obtained in the second solid-liquid separation device 92 (i.e., the liquid phase obtained in the fifth solid-liquid separation) is returned to the second MVR evaporation device 3 for second evaporation again. Specifically, the fifth mother liquid may be returned by means of the ninth circulation pump 79 to a position just before the second pH adjustment. Preferably the solid phase obtained in the fifth solid-liquid separation is washed by fifth washing.

The fifth solid-liquid separation and the fifth washing may be executed in the same way as the second solid-liquid separation and the second washing respectively, and will not be further detailed here. For the liquid produced in the washing, preferably the washing liquid, water or sodium chloride solution washing liquid and the elutriant are returned to the first MVR evaporation device 1. For example, the liquid may be returned by means of an tenth circulation pump 80 to the first MVR evaporation device 1.

According to a preferred embodiment of the present invention, the tail gas produced in the cooling crystallization is treated by ammonia removal and then exhausted; the residual tail gas after condensation in the third heat exchange is treated by ammonia removal and then exhausted; the residual tail gas after condensation in the first heat exchange is treated by ammonia removal and then exhausted. The tail gas produced in the cooling crystallization is the tail gas exhausted from the cooling crystallization device 2, and the residual tail gas after condensation in the third heat exchange is the incondensable gas exhausted from the fourth heat exchange device 34; the residual tail gas after condensation in the first heat exchange is the tail gas exhausted from the eighth heat exchange device 38. By removing ammonia from the above-mentioned tail gas, the content of pollutants in the tail gas can be further decreased, so that the tail gas can be vented directly.

Figure 8:
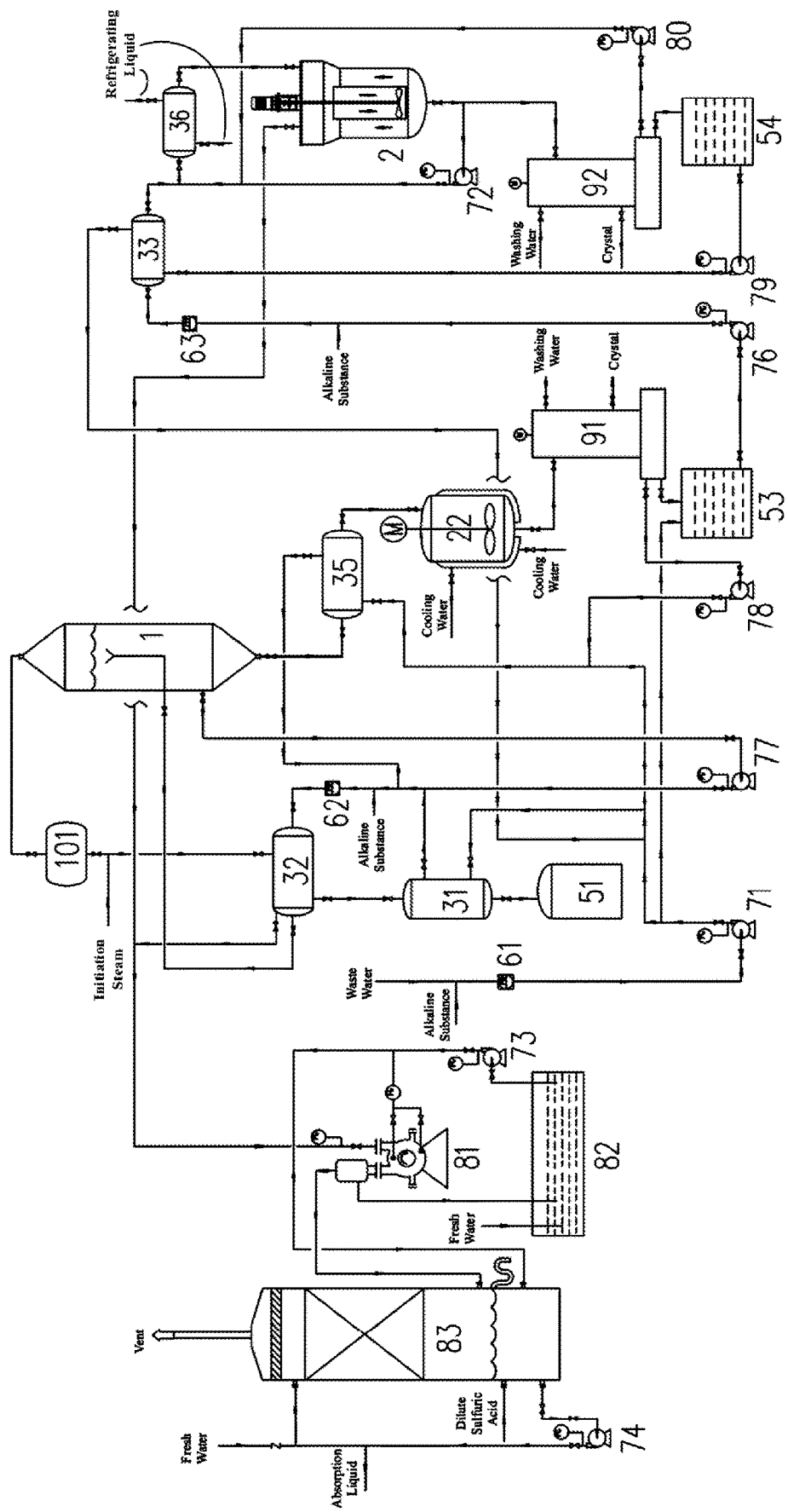
FIG. 8 is a flow diagram of the method for treating waste water containing ammonium salts in another embodiments of the present invention.
Figure 9:
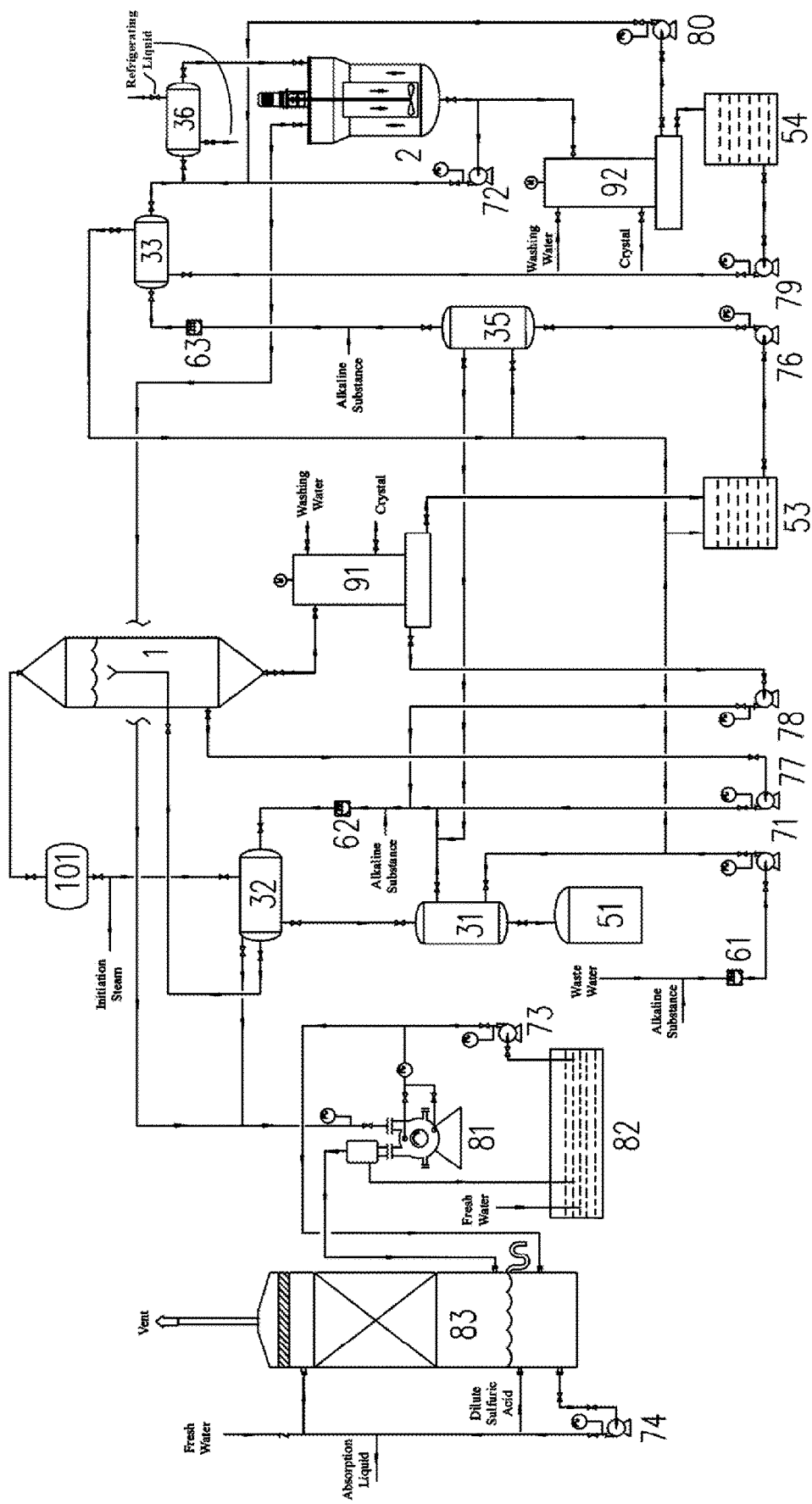
FIG. 9 is a flow diagram of the method for treating waste water containing ammonium salts in another embodiments of the present invention

In a sixth aspect, the present invention provides a method for treating waste water containing ammonium salts that contains $NH_4^+$, $SO_4^{2-}$, $Cl^-$ and $Na^+$ as shown in FIGS. 8-9, which comprises the following steps:

1) treating waste water to be treated by fourth evaporation, to obtain fourth ammonia-containing vapor and fourth concentrated solution that contains sodium chloride crystal, wherein the waste water to be treated contains the waste water containing ammonium salts;
2) treating the fourth concentrated solution that contains sodium chloride crystal by sixth solid-liquid separation, and treating the liquid phase obtained in the sixth solid-liquid separation by cooling crystallization, to obtain crystalline solution that contains sodium sulfate crystal;
3) treating the concentrated solution that contains sodium sulfate crystal by seventh solid-liquid separation;

wherein the pH of the waste water to be treated is adjusted to a value equal to or greater than 9, before the waste water to be treated is treated by the fourth evaporation; in relation to 1 mol $SO_4^{2-}$ contained in the waste water to be treated, the $Cl^-$ contained in the waste water to be treated is 7.15 mol or more; the cooling crystallization is executed in a way that no sodium chloride crystallizes and precipitates.

Preferably, the waste water to be treated is the waste water containing ammonium salts; or the waste water to be treated contains the waste water containing ammonium salts and the liquid phase obtained in the seventh solid-liquid separation.

More preferably, the waste water to be treated is mixed solution of the waste water containing ammonium salts and at least a part of the liquid phase obtained in the seventh solid-liquid separation. The method provided in the present invention can treat waste water containing ammonium salts, which contains $NH_4^+$, $SO_4^{2-}$, $Cl^-$ and $Na^+$, and there is no particular restriction on the waste water containing ammonium salts, except that the waste water contains $NH_4^+$, $SO_4^{2-}$, $Cl^-$ and $Na^+$.

In the present invention, there is no particular restriction on the order of the first heat exchange, the adjustment of pH value of the waste water to be treated, and the blending process of the waste water to be treated (in the case that the waste water to be treated contains the waste water containing ammonium salts and the liquid phase obtained in the seventh solid-liquid separation, a blending process of the waste water to be treated is required); in other words, the order may be selected appropriately as required; for example, these procedures may be accomplished before the waste water to be treated is treated by fourth evaporation.

In the present invention, the purpose of the fourth evaporation is to drive sodium chloride to precipitate or drive sodium chloride and sodium sulfate to precipitate together, and evaporate ammonia, to attain a purpose of separating the ammonia and salts in the waste water. According to the present invention, by controlling the conditions of the fourth evaporation, sodium chloride precipitates first as the solvent is reduced continuously, and then sodium sulfate precipitates, so that fourth concentrated solution that contains sodium chloride crystal is obtained (the fourth concentrated solution only contains sodium chloride crystal or contains sodium chloride crystal and sodium sulfate crystal).

In the present invention, the device used for the fourth evaporation is the same as that used for the first evaporation, and will not be further detailed here. For example, the fourth evaporation may be executed in a first MVR evaporation device 1.

In the present invention, there is no particular restriction on the conditions of the fourth evaporation; in other words, the evaporation conditions may be selected appropriately as required, as long as the purpose of crystallization can be attained. To improve the efficiency of evaporation, the conditions of the fourth evaporation include: temperature: 35° C. or above; pressure: −98 kPa or above; preferably, the conditions of the evaporation include: temperature: 45° C.-175° C.; pressure: −95 kPa-653 kPa; preferably, the conditions of the fourth evaporation include: temperature: 60° C.-160° C.; pressure: −87 kPa-414 kPa; preferably, the conditions of the fourth evaporation include: temperature: 75° C.-150° C.; pressure: −73 kPa-292 kPa; preferably, the conditions of the fourth evaporation include: temperature: 80° C.-130° C.; pressure: −66 kPa-117 kPa; preferably, the conditions of the fourth evaporation include: temperature: 95° C.-110° C.; pressure: −37 kPa-12 kPa; preferably, the conditions of the fourth evaporation include: temperature: 105° C.-110° C.; pressure: −23 kPa-12 kPa.

If a multi-effect evaporation device is used for the evaporation, in the case of co-current feeding or counter-current feeding, the conditions of the evaporation refer to the evaporation conditions in the last evaporator of the multi-effect evaporation device; in the case of parallel-current feeding, the conditions of the evaporation include the evaporation conditions in each evaporator in the multi-effect evaporation device. In addition, to take full advantage of the heat in the evaporation process, preferably the temperature difference between every two adjacent evaporators is 5° C.-30° C.; more preferably, the temperature difference between every two adjacent evaporators in the first evaporation is 10° C.-20° C. In the present invention, the operating pressure of the evaporation preferably is the saturated vapor pressure of the evaporated feed liquid. In addition, the amount of evaporation in the evaporation may be selected appropriately according to the processing capacity of the apparatus and the amount of the waste water to be treated. For example, the amount of evaporation may be 0.1 $m^3/h$ or more (e.g., 0.1 $m^3/h$-500 $m^3/h$).

To ensure high-purity sodium chloride crystal can be obtained in the fourth evaporation process, in relation to 1 mol $SO_4^{2-}$ contained in the waste water to be treated, the $Cl^-$ contained in the waste water to be treated is 7.15 mol or more, preferably is 8 mol or more, preferably is 10 mol or more, preferably is 20 mol or more, more preferably is 30 mol or more, e.g., 10-20 mol. Specifically, examples may include: 9.5 mol, 10.5 mol, 11 mol, 11.5 mol, 12 mol, 12.5 mol, 13 mol, 13.5 mol, 14 mol, 14.5 mol, 15 mol, 15.5 mol, 16 mol, 16.5 mol, 17 mol, 17.5 mol, 18 mol, 18.5 mol, 19 mol, 19.5 mol, 20 mol, 21 mol, 22 mol, 23 mol, 25 mol, 27 mol, 29 mol, 31 mol, 35 mol, 40 mol, 45 mol, or 50 mol, etc. By controlling the molar ratio of $SO_4^{2-}$ to $Cl^-$ to the above-mentioned range, pure sodium chloride crystal can be obtained through the evaporation, and separation of sodium sulfate and sodium chloride can be realized.

According to a preferred embodiment of the present invention, the sodium sulfate in the waste water to be treated doesn't crystallize and precipitate in the fourth evaporation (i.e., the sodium sulfate is not over-saturated); preferably, through the fourth evaporation, the concentration of sodium sulfate in the fourth concentrated solution is Y or lower (preferably 0.9 Y-0.99 Y, more preferably 0.95 Y-0.98 Y), where Y is the concentration of sodium sulfate in the fourth concentrated solution when both sodium chloride and sodium sulfate are saturated under the conditions of the fourth evaporation. By controlling the degree of the fourth evaporation within the above-mentioned range, sodium chloride crystallizes and precipitates as far as possible while sodium sulfate doesn't precipitate. By increasing the amount of evaporation as far as possible, the efficiency of the waste water treatment can be improved, and energy waste can be reduced.

According to another preferred embodiment of the present invention, to reduce the quantity of circulating water in the treatment system, improve the efficiency of the fourth evaporation and thereby improve the efficiency of the waste water treatment, the fourth evaporation preferably is executed to a degree that both the sodium chloride and the sodium sulfate precipitate at the same time, which is to say, preferably fourth concentrated solution that contains sodium chloride crystal and sodium sulfate crystal is obtained in the fourth evaporation. In that case, in order to obtain high-purity sodium chloride crystal, before the sixth solid-liquid separation is executed, the fourth concentrated solution that contains sodium chloride crystal is treated by cooling treatment to obtain treated solution that contains sodium chloride crystal; then the treated solution that contains sodium chloride crystal is treated by the sixth solid-liquid separation. Here, the method provided in the present invention comprises the following steps:

1) treating waste water to be treated by fourth evaporation, to obtain fourth ammonia-containing vapor and fourth concentrated solution that contains sodium chloride crystal, wherein the waste water to be treated contains the waste water containing ammonium salts;
2) treating the fourth concentrated solution that contains sodium chloride crystal by cooling treatment, to obtain treated solution that contains sodium chloride crystal;
3) treating the treated solution that contains sodium chloride crystal by sixth solid-liquid separation, and treating the liquid phase obtained in the sixth solid-liquid separation by cooling crystallization, to obtain crystalline solution that contains sodium sulfate crystal;
4) treating the concentrated solution that contains sodium sulfate crystal by seventh solid-liquid separation.

In the embodiment described above, for the purpose of improving the efficiency of the waste water treatment, the greater the degree of the fourth evaporation is, the better the result is; however, if the degree of the fourth evaporation exceeds a certain degree, treated solution that only contains sodium chloride crystal can't be obtained through the cooling treatment; in that case, though the crystal may be dissolved, for example, by adding water into the treated solution, the efficiency of the waste water treatment will be degraded. Therefore, preferably the fourth evaporation is executed to a degree that sodium chloride crystal and sodium sulfate crystal precipitate at the same time, i.e., preferably, the fourth concentrated solution that contains crystal, which is obtained in the step 1), is fourth concentrated solution that contains sodium chloride crystal and sodium sulfate crystal, and the sodium sulfate crystal in the fourth concentrated solution that contains sodium chloride crystal and sodium sulfate crystal is dissolved through the cooling treatment. To ensure that the sodium sulfate crystal in the fourth concentrated solution that contains sodium chloride crystal and sodium sulfate crystal can be dissolved in the cooling treatment, for example, the degree of the fourth evaporation may be controlled so that concentration of sodium sulfate in the treated solution is Y' or lower (wherein Y' is the concentration of sodium sulfate in the treated solution when both sodium sulfate and sodium chloride are saturated under the conditions of the cooling treatment). For the purpose of driving the sodium chloride to precipitate as far as possible and ensuring that the sodium sulfate can be dissolved fully in the follow-up cooling treatment procedure, preferably, through the fourth evaporation, the concentration of sodium sulfate in the treated solution is 0.9 Y'-0.99 Y', more preferably is 0.95 Y'-0.98 Y'. By controlling the degree of the fourth evaporation to the above-mentioned range, the sodium chloride can precipitate as far as possible in the fourth evaporation process, and the sodium sulfate is dissolved fully in the cooling treatment, so that pure sodium chloride crystal is obtained through separation finally. By increasing the amount of evaporation as far as possible, the efficiency of the waste water treatment can be improved, and energy can be saved.

In the present invention, the purpose of the cooling treatment is to drive the sodium sulfate crystal that is contained in the fourth concentrated solution that contains sodium chloride crystal to dissolve and drive the sodium chloride to further precipitate. Causing the sodium sulfate crystal in the fourth concentrated solution that contains sodium chloride crystal to dissolve in the cooling treatment process means that the degree of the fourth evaporation must be controlled appropriately to obtain pure sodium chloride crystal, which is to say, the concentration of sodium sulfate in the mixture system is controlled so that it doesn't exceed the corresponding solubility of sodium sulfate under the conditions of the cooling treatment. Besides, in the cooling treatment process, sodium sulfate crystal may be entrained in the sodium chloride crystal or absorbed to the surface of the sodium chloride crystal. In the present invention, the content of sodium sulfate in the obtained sodium chloride crystal preferably is 8 mass % or lower, more preferably is 4 mass % or lower. In the present invention, if the content of sodium sulfate crystal in the obtained sodium chloride crystal is 8 mass % or lower, it is deemed that the sodium sulfate is dissolved.

There is no particular restriction on the conditions of the cooling treatment, as long as the sodium sulfate crystal in the fourth concentrated solution that contains sodium chloride crystal can be fully dissolved in the cooling treatment process. For example, the conditions of the cooling treatment may include: temperature: 13° C.-100° C., preferably 16° C.-45° C., more preferably 16.5° C.-35° C., further preferably 17.9° C.-31.5° C.; still further preferably 17.9° C.-25° C. To ensure the effect of the cooling treatment, preferably, the conditions of the cooling treatment include: time: 5 min. or longer, preferably 5 min.-120 min., more preferably 45 min.-90 min.; further preferably 50 min.-70 min.

Examples of the temperature of the cooling treatment may include: 13° C., 14° C., 15° C., 15.5° C., 16° C., 16.5° C., 17° C., 17.5° C., 17.9° C., 18° C., 18.5° C., 19° C., 19.5° C., 20° C., 21° C., 23° C., 25° C., 27° C., 30° C., 31° C., 31.5° C., 32° C., 33° C., 34° C., 35° C., 40° C., 45° C., 50° C., or 55° C., etc.

Examples of the time of the cooling treatment may include: 5 min., 6 min., 7 min., 8 min., 10 min., 15 min., 20 min., 25 min., 30 min., 35 min., 40 min., 45 min., 50 min., 52 min., 54 min., 56 min., 58 min., 60 min., 70 min., 100 min., or 120 min.

According to the present invention, the cooling treatment is executed in a low temperature treatment tank 22. The low temperature treatment tank 22 may be the same as the above-mentioned low temperature treatment tank 55, and will not be further detailed here.

In the present invention, the degree of the fourth evaporation is ascertained by monitoring the amount of evaporation (or amount of the condensate) in the fourth evaporation or the concentration of the fourth concentrated solution.

Specifically, if the degree of the fourth evaporation is ascertained by measuring the amount of evaporation, the concentration ratio is controlled by controlling the amount of evaporation (i.e., the amount of secondary steam or amount of ammonia water), and the degree of the fourth concentration by evaporation is monitored by measuring the amount of evaporation, so that the sodium sulfate crystal precipitating in the fourth concentrated solution obtained in the fourth evaporation can be dissolved in the cooling treatment. Specifically, a mass flow meter may be used to measure the flow and thereby measure the amount of the secondary steam; or the amount of the condensate may be measured; if the degree of the fourth evaporation is ascertained by measuring the concentration, the sodium sulfate in the fourth concentrated solution doesn't crystallize and precipitate in the fourth evaporation by controlling the concentration of the fourth concentrated solution obtained in the fourth evaporation within the above-mentioned range, and the concentration of the liquid obtained in the fourth evaporation is monitored by measuring the density; specifically, a densitometer may be used to measure the density.

According to the present invention, to take full advantage of the heat in the fourth ammonia-containing vapor obtained in the fourth evaporation, preferably first heat exchange between the waste water to be treated and the fourth ammonia-containing vapor is executed, before the waste water to be treated is fed into the first MVR evaporation device 1. To take full advantage of the heat in the sixth mother liquid and/or the fourth concentrated solution that contains sodium chloride crystal, more preferably, first heat exchange between the waste water to be treated and the sixth mother liquid and/or the fourth concentrated solution that contains sodium chloride crystal is executed before the waste water to be treated is fed into the first MVR evaporation device 1.

According to a preferred embodiment of the present invention, as shown in FIG. 8, the first heat exchange between the waste water to be treated and the fourth ammonia-containing vapor is executed in a first heat exchange device 31 and a second heat exchange device 32 respectively; the first heat exchange between the waste water to be treated and the fourth concentrated solution that contains sodium chloride crystal is executed in a fifth heat exchange device 35. Specifically, the fourth ammonia-containing vapor flows through the second heat exchange device 32 and the first heat exchange device 31 sequentially, and the fourth concentrated solution that contains sodium chloride crystal flows through the fifth heat exchange device 35; at the same time, a part of the waste water to be treated exchanges heat with the condensate of the fourth ammonia-containing vapor in the first heat exchange device 31, and the remaining part of the waste water to be treated exchanges heat with the fourth concentrated solution that contains sodium chloride crystal in the fifth heat exchange device 35; then the two parts of waste water to be treated are merged, and the merged waste water to be treated exchanges heat with the fourth ammonia-containing vapor in the second heat exchange device 32, so that the temperature of the waste water to be treated is increased to facilitate evaporation, while the fourth ammonia-containing vapor is condensed to obtain ammonia water, and the temperature of the fourth concentrated solution that contains sodium chloride crystal is decreased to facilitate cooling treatment.

According to another preferred embodiment of the present invention, as shown in FIG. 9, the first heat exchange between the waste water to be treated and the fourth ammonium-containing vapor is executed in a first heat exchange device 31 and a second heat exchange device 32 respectively; the first heat exchange between the waste water to be treated and the sixth mother liquid (i.e., the liquid phase obtained in sixth solid-liquid separation described below) is executed in a fifth heat exchange device 35. Specifically, the fourth ammonia-containing vapor flows through the second heat exchange device 32 and the first heat exchange device 31 sequentially, and the sixth mother liquid flows through the fifth heat exchange device 35; at the same time, a part of the waste water to be treated exchanges heat with the condensate of the fourth ammonia-containing vapor in the first heat exchange device 31, and the remaining part of the waste water to be treated exchanges heat with the sixth mother liquid in the fifth heat exchange device 35; then the two parts of waste water to be treated are merged, and the merged waste water to be treated exchanges heat with the fourth ammonia-containing vapor in the second heat exchange device 32, so that the temperature of the waste water to be treated is increased to facilitate evaporation, while the fourth ammonia-containing vapor is condensed to obtain ammonia water, and the temperature of the sixth mother liquid is decreased to facilitate cooling crystallization.

After the heat exchange in the first heat exchange device 31, the temperature of the waste water to be treated is increased to 44° C.-174° C., preferably 94° C.-109° C.; after the heat exchange in the fifth heat exchange device 35, the temperature of the waste water to be treated is increased to 44° C.-174° C., preferably 94° C.-109° C.; after the first heat exchange in the second heat exchange device 32, the temperature of the waste water to be treated is increased to 52° C.-182° C., preferably 102° C.-117° C.

According to the present invention, preferably the pH value of the waste water to be treated is adjusted to a value greater than 9, preferably greater than 10.8, more preferably is 10.8-11.5, before the waste water to be treated is treated by the evaporation. Besides, there is no particular restriction on the upper limit of pH adjustment of the waste water to be treated. For example, the pH may be 14 or lower, preferably is 13.5 or lower, more preferably is 13 or lower. By adjusting the pH of the waste water to be treated to the above-mentioned range, ammonia can be fully evaporated in the evaporation process, and thereby the purity of the obtained sodium chloride can be improved.

For example, before the waste water to be treated is treated by the evaporation, the pH value of the waste water to be treated may be adjusted to any of the following values: 9, 9.5, 9.6, 9.7, 9.8, 9.9, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.2, 12.4, 12.6, 12.8, 13, 13.5, or 14, etc.

In the present invention, there is no particular restriction on the pH adjustment method. For example, the pH value of the waste water to be treated may be adjusted by adding an alkaline substance. There is no particular restriction on the alkaline substance, as long as the alkaline substance can attain the purpose of adjusting the pH. To avoid introducing any new impurity into the waste water to be treated and improve the purity of the obtained crystal, the alkaline substance preferably is NaOH.

The alkaline substance may be added with a conventional method in the art. However, preferably the alkaline substance is mixed in the form of water solution with the waste water to be treated. For example, water solution that contains the alkaline substance may be charged into a pipeline through which the waste water to be treated is inputted. There is no particular restriction on the content of the alkaline substance in the water solution, as long as the water solution can attain the purpose of adjusting the pH. However, to reduce the amount of water and further reduce the cost, preferably saturated water solution of the alkaline substance or the seventh mother liquid is used. To monitor the pH of the waste water to be treated, the pH of the waste water to be treated may be measured after the pH adjustment.

According to a preferred embodiment of the present invention, the fourth evaporation process is performed in the first MVR evaporation device 1. Specifically, before the waste water containing ammonium salts is fed into the first heat exchange device 31 for the first heat exchange, pH adjustment is made for the first time by introducing the water solution that contains an alkaline substance into the pipeline through which the waste water containing ammonium salts is fed into the first heat exchange device 31 and mixing with the waste water therein; then, pH adjustment is made for the second time by introducing the water solution that contains an alkaline substance into the pipeline through which the waste water to be treated is fed into the first MVR evaporation device 1.

Through twice pH adjustments, the pH of the waste water to be treated is adjusted to be greater than 9, preferably greater than 10.8, before the waste water to be treated is treated by the evaporation. Preferably, through the first pH adjustment, the pH is adjusted to a value greater than 7 (preferably is 7-9); through the second pH adjustment, the pH is adjusted to a value greater than 9 (preferably is greater than 10.8).

To detect the pH after the first pH adjustment and the second pH adjustment, preferably a first pH measuring device 61 is provided in the pipeline through which the waste water containing ammonium salts is fed into the first heat exchange device 31 to measure the pH after the first pH adjustment, and a second pH measuring device 62 is provided in the pipeline through which the waste water to be treated is fed into the first MVR evaporation device 1 to measure the pH after the second pH adjustment.

According to the present invention, the sixth solid-liquid separation may be performed in a first solid-liquid separation device 91 (e.g., centrifugal machine, band filter, or plate and frame filter, etc.). After the sixth solid-liquid separation, the sixth mother liquid obtained in the first solid-liquid separation device 91 (i.e., the liquid phase obtained in the sixth solid-liquid separation) is fed into the cooling crystallization device 2 for cooling crystallization. Specifically, the sixth mother liquid may be fed by means of a sixth circulation pump 76 into the cooling crystallization device 2. In addition, preferably the solid phase obtained in the sixth solid-liquid separation is washed by sixth washing.

The sixth solid-liquid separation and the sixth washing may be executed in the same way as the second solid-liquid separation and the second washing respectively, and will not be further detailed here. The liquid produced in the washing preferably is returned to the first MVR evaporation device 1. For example, the liquid may be returned by means of an eighth circulation pump 78 to the first MVR evaporation device 1.

In the present invention, the purpose of the cooling crystallization is to drive the sodium sulfate to precipitate while prevent the sodium chloride from precipitating, so that the sodium sulfate can be separated successfully from the waste water. The cooling crystallization only drives the sodium sulfate to precipitate, but doesn't exclude sodium chloride and other substances, which are entrained in the sodium sulfate crystal or absorbed to the surface of the sodium sulfate crystal. In the present invention, preferably the content of sodium sulfate in the obtained sodium sulfate crystal is 92 mass % or higher, more preferably is 96 mass % or higher, further preferably is 98 mass % or higher. It should be understood that the quantity of the obtained sodium sulfate crystal is measured by dry mass. If the content of sodium sulfate in the obtained sodium sulfate crystal is within the above-mentioned range, it is deemed that only sodium sulfate precipitates.

According to the present invention, the conditions of the cooling crystallization are the same as the conditions of the cooling crystallization in the method in the third aspect, and will not be further detailed here.

According to the present invention, to ensure that sodium sulfate crystal is obtained in the cooling crystallization, the concentration of $SO_4^{2-}$ in the sixth mother liquid preferably is 0.01 mol/L or higher, more preferably is 0.07 mol/L or higher, further preferably is 0.1 mol/L or higher, still further preferably is 0.2 mol/L or higher, particularly preferably is 0.3 mol/L or higher. According to the present invention, to improve the purity of the sodium sulfate crystal obtained in the cooling crystallization, the concentration of $Cl^-$ in the sixth mother liquid preferably is 5.2 mol/L or lower, more preferably is 5 mol/L or lower, further preferably is 4.5 mol/L or lower, still further preferably is 4 mol/L or lower.

In the present invention, if the concentration of $SO_4^{2-}$ or in the sixth mother liquid is not within the above-mentioned range, the concentration may be adjusted before the cooling crystallization is executed. Preferably, the concentration is adjusted with the waste water containing ammonium salts. Specifically, the waste water containing ammonium salts may be mixed with the sixth mother liquid in the first mother liquid tank 53.

Examples of the content of $SO_4^{2-}$ in the sixth mother liquid may include: 0.01 mol/L, 0.03 mol/L, 0.05 mol/L, 0.08 mol/L, 0.1 mol/L, 0.2 mol/L, 0.3 mol/L, 0.4 mol/L, 0.5 mol/L, 0.6 mol/L, 0.7 mol/L, 0.8 mol/L, 0.9 mol/L, 1 mol/L, 1.1 mol/L, 1.2 mol/L, 1.3 mol/L, 1.4 mol/L, or 1.5 mol/L, etc.

In addition, examples of the content of $Cl^-$ in the sixth mother liquid may include: 0.01 mol/L, 0.05 mol/L, 0.1 mol/L, 0.3 mol/L, 0.6 mol/L, 0.8 mol/L, 1 mol/L, 1.2 mol/L, 1.4 mol/L, 1.6 mol/L, 1.8 mol/L, 2.0 mol/L, 2.2 mol/L, 2.4 mol/L, 2.6 mol/L, 2.8 mol/L, 3 mol/L, 3.2 mol/L, 3.4 mol/L, 3.6 mol/L, 3.8 mol/L, 4 mol/L, 4.5 mol/L, or 5 mol/L, etc.

According to the present invention, the cooling crystallization is executed in the same way as the cooling crystallization in the method in the third aspect, and will not be further detailed here.

To detect the pH value after the third pH adjustment, preferably a third pH measuring device 63 is provided on the pipeline through which the sixth mother liquid is fed into the third heat exchange device 33 to measure the pH value after the third pH adjustment.

In the present invention, preferably the concentration of $Cl^-$ in the sixth mother liquid is adjusted as required before the sixth mother liquid is treated by cooling crystallization, so that the concentration of sodium chloride in the crystalline solution is X or lower, where X is the concentration of sodium chloride in the crystalline solution when both sodium sulfate and sodium chloride are saturated under the conditions of cooling crystallization. Preferably, the concentration of sodium chloride in the crystalline solution is 0.95 X-0.999 X. Thus, sodium chloride doesn't precipitate in the cooling crystallization process, and the precipitation ratio of sodium sulfate can be improved. By adjusting the concentration of $Cl^-$ in the sixth mother liquid, the concentration of sodium chloride in the crystalline solution is X or lower, and sodium chloride will not precipitate (the content of sodium chloride in the obtained crystal is 8 mass % or lower, preferably is 4 mass % or lower, more preferably is 3 mass % or lower); thus, the precipitation ratio of sodium sulfate in the cooling crystallization process is improved, and the efficiency of the cooling crystallization is improved. The concentration adjustment may be performed with the waste water containing ammonium salts, the washing liquid after eluting the sodium sulfate crystal, and sodium sulfate, etc., preferably the waste water containing ammonium salts is used.

By controlling the cooling crystallization to proceed at the above-mentioned temperature, Cl⁻ concentration, and pH, sodium sulfate can precipitate fully while sodium chloride and other substances don't precipitate in the cooling crystallization process, so that the purpose of separating and purifying sodium sulfate is attained.

In the present invention, through seventh solid-liquid separation of the crystalline solution that contains sodium sulfate crystal, sodium sulfate crystal and seventh mother liquid (i.e., the liquid phase obtained in the seventh solid-liquid separation) are obtained. There is no particular restriction on the method of the seventh solid-liquid separation. For example, the method may be selected from one or more of centrifugation, filtering, and sedimentation.

According to the present invention, the seventh solid-liquid separation may be performed in a second solid-liquid separation device $92$ (e.g., centrifugal machine, band filter, or plate and frame filter, etc.). After the seventh solid-liquid separation, the seventh mother liquid obtained in the second solid-liquid separation device $92$ is stored temporarily in second mother liquid tank $54$, and may be returned by means of a ninth circulation pump $79$ into the first MVR evaporation device $1$ for evaporation. In addition, preferably the solid phase obtained in the seventh solid-liquid separation is washed by seventh washing.

The seventh solid-liquid separation and the seventh washing may be executed in the same way as the first solid-liquid separation and the first washing respectively, and will not be further detailed here. For the liquid produced in the washing, preferably the washing liquid (water or sodium sulfate solution) is returned to the cooling crystallization device $2$. For example, the liquid may be returned by means of a tenth circulation pump $80$ to the cooling crystallization device $2$.

According to a preferred embodiment of the present invention, after the crystalline solution that contains sodium sulfate is obtained through cooling crystallization, solid-liquid separation is executed with a solid-liquid separation device, and the crystal obtained in the solid-liquid separation is eluted with sodium sulfate solution (the concentration of the sodium sulfate solution is the concentration of sodium sulfate in water solution where both sodium chloride and sodium sulfate are saturated at the temperature corresponding to the sodium sulfate crystal to be washed), and the liquid obtained in the elution is returned to the cooling crystallization device $2$. Through the washing process described above, the purity of the obtained sodium sulfate crystal can be improved.

According to the present invention, to take full advantage of the cooling capacity of the seventh mother liquid, preferably second heat exchange between the sixth mother liquid and the seventh mother liquid is executed before the sixth mother liquid is treated by cooling crystallization.

According to a preferred embodiment of the present invention, the second heat exchange is executed in a third heat exchange device $33$; specifically, the sixth mother liquid and the seventh mother liquid flow through the third heat exchange device $33$ respectively, so that they exchange heat and thereby the temperature of the sixth mother liquid is decreased to facilitate cooling crystallization, while the temperature of the seventh mother liquid is increased to facilitate evaporation. After the heat exchange in the third heat exchange device $33$, the temperature of the sixth mother liquid is $-19.7°$ C.$-15.5°$ C., preferably is $-19°$ C.$-9°$ C., more preferably is $-4°$ C.$-6°$ C., close to the temperature of cooling crystallization.

According to the present invention, to facilitate cooling crystallization, preferably second heat exchange between the sixth mother liquid and refrigerating liquid is executed further. According to a preferred embodiment of the present invention, the heat exchange between the sixth mother liquid and the refrigerating liquid is executed in a sixth heat exchange device $36$; specifically, the refrigerating liquid and a mixture of the sixth mother liquid and the cooled circulating liquid flow through the sixth heat exchange device $36$ respectively so that they exchange heat with each other, and thereby the temperature of the mixture of the sixth mother liquid and the cooled circulating liquid is decreased further to facilitate cooling crystallization. The refrigerating liquid may be any conventional refrigerating medium for cooling in the art, as long as it can cool the sixth mother liquid to a temperature that meets the cooling crystallization requirement.

To obtain relatively thick ammonia water and improve the purity of sodium sulfate obtained in the cooling crystallization and the efficiency of the cooling crystallization, preferably the waste water to be treated is concentrated to obtain fourth ammonia-containing vapor and concentrated waste water to be treated before the waste water to be treated is treated by the evaporation. Here, the purpose of the concentration is to obtain ammonia water at relatively high concentration and control the concentration of the ammonia water more easily, and concentrate the waste water to be treated to facilitate the cooling crystallization. There is no particular restriction on the degree of the concentration, as long as the concentrated waste water to be treated meets the above-mentioned evaporation requirement. The conditions and equipment of the concentration are the same as those of the follow-up evaporation. However, preferably the temperature of the concentration is higher than the temperature of the follow-up evaporation, so that the waste water to be treated can be treated quickly by the evaporation, and thereby the efficiency of the evaporation can be improved while thick ammonia water is obtained.

Furthermore, the pH value of the waste water to be treated is adjusted to a value greater than 9, more preferably greater than 10.8, before the waste water to be treated is concentrated. Here, preferably the pH value is adjusted by means of NaOH.

By adjusting the pH value of the waste water to a value greater than 9 and concentrating the waste water before the waste water is treated by the evaporation, ammonia water at relatively high concentration can be obtained, the purity of sodium sulfate obtained in the cooling crystallization can be improved, and the efficiency can be improved.

According to a preferred embodiment of the present invention, the tail gas produced in the cooling crystallization is treated by ammonia removal and then exhausted; the residual tail gas after condensation in the second heat exchange is treated by ammonia removal and then exhausted. The tail gas produced in the cooling crystallization is the tail gas exhausted from the cooling crystallization device $2$, and the residual tail gas after condensation in the second heat exchange is the incondensable gas exhausted from the second heat exchange device $32$. By removing ammonia from the above-mentioned tail gas, the content of pollutants in the tail gas can be further decreased, so that the tail gas can be vented directly.

In the present invention, to improve the salinity of the liquid in the MVR evaporation device and decrease the ammonia content in the liquid, preferably a part of liquid after the evaporation in the MVR evaporation device (i.e., liquid in the MVR evaporation device, hereinafter also referred to as circulating liquid) is returned to the MVR evaporation device for evaporation, preferably is heated up and then returned to the MVR evaporation device for evaporation. The recirculation ratio of evaporation in the MVR evaporation device refers to the ratio of the recirculated amount to the difference between the total amount of liquid in the MVR evaporation device and the recirculated amount. The recirculation ratio may be set appropriately according to the amount of evaporation, to ensure that the MVR evaporation device can evaporate water and ammonia in required amounted at the given evaporation temperature. For example, the recirculation ratio of the first evaporation may be 10-200, preferably is 40-150; the second recirculation ratio of the second evaporation may be 10-200, preferably is 50-100; the third recirculation ratio of the third evaporation may be 10-200, preferably is 50-100; the recirculation ratio of the fourth evaporation may be 10-200, preferably is 40-170.

According to the present invention, preferably, the method further comprises compressing the ammonia-containing vapor obtained in the MVR evaporation device before heat exchange is executed. For example, the compression may be executed by means of compressors 101 and 102. By compressing the ammonia-containing vapor, energy is fed into the MVR evaporation system to ensure that the waste water temperature rise-evaporation-temperature drop process is executed continuously. Initiation steam has to be inputted for initiating the MVR evaporation process, but the energy is solely supplied by means of the compressors 101 and 102 in the continuous operation state, without any other energy input. The compressors 101 and 102 may be conventional compressors in the art, such as centrifugal compressors, turbine compressors, or roots compressors, etc. Through compression with the compressors 101 and 102, the temperature of the ammonia-containing vapor is increased by 5° C.-20° C.

In the present invention, there is no particular restriction on the first heat exchange device 31, the second heat exchange device 32, the third heat exchange device 33, the fourth heat exchange device 34, the fifth heat exchange device 35, the sixth heat exchange device 36, the eighth heat exchange device 38, and the eleventh heat exchange device 30; in other words, different conventional heat exchangers in the art may be used for those heat exchange devices, as long as the heat exchange devices can attain the purpose of heat exchange. Specifically, the heat exchange unit may be a jacket-type heat exchanger, plate-type heat exchanger, or shell and tube heat exchanger, etc., preferably is a plate-type heat exchanger. The material of the heat exchanger may be selected as required. For example, to resist erosion of chloride ions, a heat exchanger made of duplex stainless steel, titanium and titanium alloy, or hastelloy may be selected. At a low temperature, a heat exchanger made of plastic material may be selected; at a high temperature, a duplex stainless steel plate-type heat exchanger may be selected.

According to a preferred embodiment of the present invention, the tail gas produced in the cooling crystallization is treated by ammonia removal and then exhausted; the residual tail gas after condensation in the second heat exchange is treated by ammonia removal and then exhausted. The tail gas produced in the cooling crystallization is the tail gas exhausted from the cooling crystallization device 2, and the residual tail gas after condensation in the second heat exchange is the incondensable gas exhausted from the fourth heat exchange device 34 as shown in FIG. 4; By removing ammonia from the above-mentioned tail gas, the content of pollutants in the tail gas can be further decreased, so that the tail gas can be vented directly.

As a method for the above-mentioned ammonia removal, the ammonia may be absorbed in the tail gas absorption tower 83. There is no particular restriction on the tail gas absorption tower 83; in other words, the tail gas absorption tower 83 may be any conventional absorption tower in the art, such as plate-type absorption tower, packed absorption tower, falling film absorption tower, or void tower, etc. The tail gas absorption tower 83 has circulating water in it, the circulating water is circulated in the tail gas absorption tower 83 under the action of the fourth circulation pump 74, or water can be replenished to the tail gas absorption tower 83 by means of the third circulation pump 73 from the circulating water tank 82; fresh water can be replenished to the circulating water tank 82, and thereby the temperature and ammonia content of the service water of the vacuum pump 81 can be decreased at the same time. The tail gas and the circulating water in the tail gas absorption tower 83 may flow in a counter-current mode or co-current flow mode, preferably flows in a counter-current mode. The circulating water may be replenished with fresh water. To ensure that the tail gas can be absorbed extensively, dilute sulfuric acid may be further added into the tail gas absorption tower 83, so as to absorb ammonia and the like in the tail gas. The circulating water may be reused in the production or directly sold as ammonia water or ammonium sulfate solution after it absorbs the tail gas. The tail gas may be charged into the tail gas absorption tower 83 by means of the vacuum pump 81.

In the present invention, there is no particular restriction on the waste water containing ammonium salts, as long as the waste water containing ammonium salts is waste water that contains $NH_4^+$, $SO_4^{2-}$, $Cl^-$ and $Na^+$. In addition, the method provided in the present invention is especially suitable for treatment of waste water that has high salt content. Specifically, the waste water containing ammonium salts in the present invention may be waste water from a molecular sieve, alumina or oil refining catalyst production process, or waste water obtained by treating waste water produced in a molecular sieve, alumina or oil refining catalyst production process through impurity removal and concentration as described below, preferably is waste water obtained by treating waste water produced in a molecular sieve, alumina or oil refining catalyst production process through impurity removal and concentration as described below.

The content of $NH_4^+$ in the waste water containing ammonium salts may be 8 mg/L or higher, preferably is 300 mg/L or higher.

The content of $Na^+$ in the waste water containing ammonium salts may be 510 mg/L or higher, preferably is 1 g/L or higher, more preferably is 2 g/L or higher, further preferably is 4 g/L or higher, further preferably is 8 g/L or higher, further preferably is 16 g/L or higher, further preferably is 32 g/L or higher, further preferably is 40 g/L or higher, further preferably is 50 g/L or higher, still further preferably is 60 g/L or higher.

The content of $SO_4^{2-}$ in the waste water containing ammonium salts may be 1 g/L or higher, preferably is 2 g/L or higher, more preferably is 4 g/L or higher, further preferably is 8 g/L or higher, further preferably is 16 g/L or higher, further preferably is 32 g/L or higher, further preferably is 40 g/L or higher, further preferably is 50 g/L or higher, further preferably is 60 g/L or higher, still further preferably is 70 g/L or higher.

The content of $Cl^-$ in the waste water containing ammonium salts may be 970 mg/L or higher, preferably is 2 g/L or higher, further preferably is 4 g/L or higher, further preferably is 8 g/L or higher, further preferably is 16 g/L or higher, further preferably is 32 g/L or higher, further preferably is 40 g/L or higher, further preferably is 50 g/L or higher, still further preferably is 60 g/L or higher.

There is no particular restriction on the upper limits of $NH_4^+$, $SO_4^{2-}$, $Cl^-$ and $Na^+$ contained in the waste water containing ammonium salts. In consideration of the availability of the waste water, the upper limits of $SO_4^{2-}$, $Cl^-$ and $Na^+$ in the waste water containing ammonium salts are 200 g/L or lower respectively, preferably are 150 g/L or lower, preferably are 100 g/L or lower; the upper limit of $NH_4^+$ in the waste water containing ammonium salts is 50 g/L or lower, preferably is 40 g/L or lower, preferably is 30 g/L or lower.

In consideration of reducing the energy consumption of the treatment process, preferably the content of $SO_4^{2-}$ contained in the waste water containing ammonium salts is 0.01 mol/L or higher (preferably is 0.1 mol/L or higher, more preferably is 0.2 mol/L or higher, e.g., 0.2-1.5 mol/L); in consideration of improving the purity of the sodium sulfate product, the content of $Cl^-$ contained in the waste water containing ammonium salts is 5.2 mol/L or lower (preferably is 4.7 mol/L or lower, more preferably is 3.5 mol/L or lower, further preferably is 2 mol/L or lower, e.g., 0.5-2 mol/L). By confining the concentration of $SO_4^{2-}$ and $Cl^-$ contained in the waste water containing ammonium salts within the above-mentioned ranges, pure sodium sulfate crystal can be obtained in the cooling crystallization process, energy can be saved, and the treatment process is more economically efficient.

In the present invention, the inorganic salt ions contained in the waste water containing ammonium salts further include inorganic salt ions such as $Mg^{2+}$, $Ca^{2+}$, $K^+$, $Fe^{3+}$, and rare earth element ions, etc., besides $NH_4^+$, $SO_4^{2-}$, $Cl^-$, and $Na^+$. The contents of the inorganic salt ions (e.g., $Mg^{2+}$, $Ca^{2+}$, $K^+$, $Fe^{3+}$, and rare earth element ions, etc.) preferably are 100 mg/L or lower respectively, more preferably are 50 mg/L or lower respectively, further preferably are 10 mg/L or lower respectively, particularly preferably there is no other inorganic salt ion. By confining the contents of other inorganic salt ions in the above ranges, the purity of the sodium sulfate crystal and sodium chloride crystal obtained finally can be further improved. To reduce the contents of other inorganic salt ions in the waste water containing ammonium salts, preferably impurity removal is performed as described below.

The TDS in the waste water containing ammonium salts may be 1.6 g/L or higher, preferably is 4 g/L or higher, more preferably is 8 g/L or higher, further preferably is 16 g/L or higher, further preferably is 32 g/L or higher, further preferably is 40 g/L or higher, further preferably is 50 g/L or higher, further preferably is 60 g/L or higher, further preferably is 100 g/L or higher, further preferably is 150 g/L or higher, still further preferably is 200 g/L or higher.

In the present invention, the pH of the waste water containing ammonium salts preferably is 4-7, such as 5.8-6.6.

In addition, in view that the COD in the waste water may cause the membrane clogged in the concentration process and has adverse effect to the purity and color, etc. of the salts during evaporation and crystallization, the COD in the waste water containing ammonium salts should be low as far as possible (preferably is 20 mg/L or lower, more preferably is 10 mg/L or lower). Preferably the COD is removed by oxidization during pre-treatment. Specifically, the COD may be removed through a biological process or advanced oxidization process, etc. If the COD content is very high, preferably an oxidizer is used for oxidization, and the oxidizer may be Fenton reagent, for example.

In the present invention, to decrease the concentration of impurity ions in the waste water, ensure continuous and stable operation of the treatment process, and reduce equipment operation and maintenance cost, preferably the impurities in the waste water containing ammonium salts are removed before the treatment is executed with the treatment method provided in the present invention. Preferably, the impurity removal method is selected from one or more of solid-liquid separation, chemical precipitation, adsorption, ion exchange, and oxidization.

The solid-liquid separation may be executed by filtering, centrifugation, or sedimentation, etc.; the chemical precipitation may be executed by pH adjustment, carbonate precipitation, or magnesium salt precipitation, etc.; the adsorption may be executed by physical adsorption and/or chemical adsorption, and the specific adsorbent may be selected from active carbon, silica gel, alumina, molecular sieve, and natural clay, etc.; the ion exchange may be executed with any one of strong acidic cationic resins and weak acidic cationic resins; the oxidization may be executed with any conventional oxidizer in the art, such as ozone, hydrogen peroxide solution, or potassium permanganate, etc., and preferably is executed with ozone or hydrogen peroxide solution, etc., to avoid introduction of any new impurity.

The specific impurity removal method may be selected according to the types of impurities contained in the waste water containing ammonium salts. Suspended substances may be removed by solid-liquid separation; inorganic substances and organic substances may be removed by chemical precipitation, ion-exchange, or adsorption, such as weak acidic cation exchange or active carbon adsorption, etc.; organic substances may be removed by adsorption and/or oxidization, preferably are removed by ozone biological activated carbon adsorption and oxidization. According to a preferred embodiment of the present invention, impurities in the waste water containing ammonium salts are removed by filtering, weak acidic cation exchange, and ozone biological activated carbon adsorption and oxidization sequentially. Through the above impurity removal process, the majority of suspended substances, hardness, silica and organic substances can be removed, the scaling risk can be decreased, and the wastewater treatment process can operate continuously and stably.

In the present invention, if the waste water has relatively low salt content, the waste water containing ammonium salts may be treated by concentration so that the salt content reaches the range required for the waste water containing ammonium salts in the present invention, before the treatment is executed with the treatment method provided in the present invention. Preferably, the concentration method is selected from ED membrane concentration and/or reverse osmosis; more preferably, the concentration is executed through ED membrane concentration and reverse osmosis, and there is no particular restriction on the order of the ED membrane concentration and reverse osmosis. The apparatuses and conditions of the ED membrane concentration and reverse osmosis treatment may be conventional ones in the art, and may be selected according to the specific condition of the waste water to be treated. Specifically, the ED membrane concentration may be executed in a unidirectional electrodialysis system or reverse electrodialysis system; the reverse osmosis may be executed with spiral-wound membrane, flat sheet membrane, disc tubular membrane, and vibrating membrane, or a combination of them. Through the concentration, the waste water treatment efficiency can be improved, and energy waste incurred by high evaporation load can be avoided.

In a preferred embodiment of the present invention, the waste water containing ammonium salts is waste water obtained through treating the waste water produced in a molecular sieve production process by impurity removal through chemical precipitation, filtering, weak acidic cation exchange and ozone biological activated carbon adsorption and oxidization, concentration with ED membrane, and concentration through reverse osmosis.

The conditions of the above-mentioned chemical precipitation preferably are: sodium carbonate is used as a treating agent, sodium carbonate is added in a quantity of 1.2-1.4 mol in relation to 1 mol calcium ion in the waste water, the pH of the waste water is adjusted to 7, the reaction temperature is 20-35° C., and the reaction time is 0.5-4 h.

The conditions of the above-mentioned filtering preferably are: the filtering unit is a multi-media filter that employs double layers of filtering media composed of blind coal and quartz sand, the blind coal is in 0.7-1.7 mm particle size, the quartz sand is in 0.5-1.3 mm particle size, and the filtering speed is 10-30 m/h. The filtering media are regenerated through an "air backwashing-air-water backwashing-water backwashing" regeneration process, and the regeneration period is 10-15 h.

The conditions of the above-mentioned weak acidic cation exchange preferably are: pH range: 6.5-7.5; the temperature: ≤40° C., height of the resin layer: 1.5-3.0 m, HCl concentration in the regenerated liquid: 4.5-5 mass %; dose of regenerant (measured in 100%): 50-60 kg/m³ wet resin; regeneration liquid HCl flow speed: 4.5-5.5 m/h, regeneration contact time: 35-45 min.; washing flow speed: 18-22 m/h, washing time: 2-30 min.; operation flow speed: 15-30 m/h; the acidic cation resin may be SNT D113 acidic cation resin from Langfang Sanat Chemical Co., Ltd., for example.

The conditions of the above-mentioned ozone biological activated carbon adsorption and oxidization preferably are: ozone retention time: 50-70 min.; empty bed filtering speed: 0.5-0.7 m/h.

The conditions of the above-mentioned ED membrane concentration preferably are: current: 145-155 A, voltage: 45-65V. The ED membrane may be ED membrane from Astom (a Japanese company), for example.

The conditions of the above-mentioned reverse osmosis preferably are: operating pressure: 5.4-5.6 MPa, inlet temperature: 25-35° C., pH: 6.5-7.5. The reverse osmosis membrane may be TM810C seawater desalination membrane from Toray Bluestar Membrane Co., Ltd., for example.

According to the present invention, the waste water treatment may be commenced directly with the waste water containing ammonium salts. If the ion contents in the waste water containing ammonium salts meet the conditions specified in the present invention, the waste water treatment can be performed with the method described in the present invention; if the ion contents in the waste water containing ammonium salts don't meet the conditions specified in the present invention, the evaporation or cooling crystallization in the second step may be executed first, and the mother liquid obtained through the solid-liquid separation may be mixed with the waste water containing ammonium salts to adjust the ion contents in the waste water to be treated to the ranges specified in the present invention, and then the waste water treatment may be performed with the method described in the present invention. Of course, alternatively the ion contents in the waste water to be treated may be adjusted with sodium sulfate or sodium chloride in the initial stage, as long as the waste water to be treated can meet the requirements for the contents of $SO_4^{2-}$ and $Cl^-$ in the waste water to be treated in the present invention.

Hereunder the present invention will be detailed in embodiments.

In the following embodiments, the waste water containing ammonium salts is waste water obtained through treating the waste water produced in a zeolite production process sequentially by impurity removal through chemical precipitation, filtering, weak acidic cation exchange and ozone biological activated carbon adsorption and oxidization, concentration with ED membrane, and concentration through reverse osmosis sequentially.

Embodiment 1

As shown in FIG. 4, waste water containing ammonium salts (containing 40 g/L NaCl, 120 g/L $Na_2SO_4$, 7 g/L $NH_4Cl$, 21.3 g/L $(NH_4)_2SO_4$, with pH=5.8) is fed at 10 m³/h feed rate into the pipeline of the treatment system, 45.16 mass % sodium hydroxide solution is introduced into the pipeline for the first pH adjustment, the resultant mixture in the pipeline is mixed with the second mother liquid returned by means of the ninth circulation pump 79 to obtain waste water to be treated (the measured concentration of $Cl^-$ is 1.752 mol/L, and the measured concentration of $SO_4^{2-}$ is 0.897 mol/L), the adjusted pH value is monitored with the first pH measuring device 61 (a pH meter) (the measured value is 8); then the waste water to be treated is fed by means of the first circulation pump 71 into the second heat exchange device 32 (a plastic heat exchanger) to exchange heat with the first mother liquid, so that the temperature of the waste water to be treated is decreased to 9° C.; next, the waste water is mixed with the cooled circulating liquid fed from the cooling crystallization device 2 (a freezing crystallization tank) by means of the second circulation pump 72, the resultant mixture exchanges heat with the refrigerating liquid in the sixth heat exchange device 36, so that the temperature of the mixture is further decreased; then, the mixture is fed into the cooling crystallization device 2 and treated by cooling crystallization, so that crystalline solution that contains sodium sulfate crystal is obtained. Wherein the temperature of the cooling crystallization is −2° C., and the time of the cooling crystallization is 150 min., the recirculated amount of the cooled circulating liquid is controlled to be 1,190 m³/h, and the degree of super-saturation of sodium sulfate in the cooling crystallization process is controlled so that it is not greater than 1.1 g/L.

The crystalline solution that contains sodium sulfate crystal is fed into the first solid-liquid separation device 91 (a centrifugal machine) for solid-liquid separation; thus, 9.733 m³ first mother liquid that contains 166.8 g/L NaCl, 39 g/L $Na_2SO_4$, 0.43 g/L NaOH, and 7.85 g/L $NH_3$ is obtained per hour and is stored temporarily in the first mother liquid tank

53; in addition, 5,043.6 kg filter cake of sodium sulfate decahydrate crystal at 99 mass % purity, which contains 76 mass % water, is obtained per hour.

The first mother liquid is fed by means of the sixth circulation pump 76 into the second heat exchange device 32 for heat exchange, and then is fed into the concentration device 9 for concentration by electrodialysis, wherein the flow rate of the thick solution in the concentration is 7.577 m$^3$/h, and the thick solution contains 192.86 g/L NaCl, 45.09 g/L Na$_2$SO$_4$, and 9.081 g/L NH$_3$; next, the thick solution is evaporated by first evaporation, wherein the flow rate of the thin solution in the concentration is 2.156 m$^3$/h, the thin solution contains 75.28 g/L NaCl, 17.60 g/L Na$_2$SO$_4$, and 3.54 g/L NH$_3$, and the thin liquid in the concentration is returned as waste water containing ammonium salts.

The first evaporation process is executed in the first MVR evaporation device 1 (a falling film+forced circulation two-stage MVR evaporating crystallizer). A part of the thick solution obtained through concentration of the first mother liquid is fed into the third heat exchange device 33 (a duplex stainless steel plate-type heat exchanger) to exchange heat with the first ammonium-containing vapor after the compression, the remaining part of the thick solution is fed into the fifth heat exchange device 35 (a duplex stainless steel plate-type heat exchanger) to exchange heat with the first concentrated solution that contains sodium sulfate crystal and sodium chloride crystal; then the two parts of the thick solution in the concentration are merged, and the merged solution is fed into the fourth heat exchange device 34 (a duplex stainless steel plate-type heat exchanger) to exchange heat with the first ammonium-containing vapor, and then is fed into the pipeline of the first MVR evaporation device 1; next, 45.16 mass % sodium hydroxide solution is introduced into the pipeline for pH adjustment, and the adjusted pH is monitored with the second pH measuring device 62 (a pH meter) (the measured value is 11); then the mixture is treated by first evaporation in the first MVR evaporation device 1, to obtain first concentrated solution that contains sodium sulfate crystal and sodium chloride crystal and first ammonium-containing vapor. The temperature of the first evaporation is 105° C., the pressure is −7.02 kPa, and the amount of evaporation is 5.657 m$^3$/h. After the first ammonium-containing vapor is compressed by the compressor 102 (the temperature is increased by 19° C.), it exchanges heat with the first mother liquid in the fourth heat exchange device 34 and the third heat exchange device 33 sequentially, so that first ammonia water is obtained, and is stored in the second ammonia water storage tank 52. In addition, to improve the solid content in the first MVR evaporation device 1, a part of the liquid after the first evaporation in the first MVR evaporation device 1 is circulated as circulating liquid by means of the seventh circulation pump 77 to the first MVR evaporation device 1 again for first evaporation (the recirculation ratio is 51.3). The degree of the first evaporation is monitored with the mass flow meter provided on the first MVR evaporation device 1, to control the amount of evaporation in the first evaporation to 3.523 m$^3$/h (equivalent to controlling the concentration of sodium sulfate in the treated solution to 0.9787 Y (278 g/L)).

The first concentrated solution that contains sodium sulfate crystal and sodium chloride crystal, which is obtained in the first evaporation, is treated by cooling treatment in the low temperature treatment tank 55 (temperature: 17.9° C., time: 50 min.) to obtain treated solution that contains sodium chloride crystal. A stirring paddle is provided in the low temperature treatment tank 55 and operates at 60 r/min. rotation speed.

The treated solution that contains sodium chloride crystal is fed into the second solid-liquid separation device 92 (a centrifugal machine) for second solid-liquid separation, 3.3 m$^3$ second mother liquid that contains 278 g/L NaCl, 92 g/L Na$_2$SO$_4$, 2.2 g/L NaOH and 0.37 g/L NH$_3$ is obtained per hour, and the second mother liquid is temporarily stored in the second mother liquid tank 54. The obtained solid sodium chloride (492.80 kg filter cake of sodium chloride crystal with 15 mass % water content is obtained per hour, wherein the content of sodium sulfate is 1.5 mass % or lower) is eluted with 278 g/L sodium chloride solution in the same dry mass as the sodium chloride, and is dried in a drier, thus 418.87 kg sodium chloride (at 99.5 mass % purity) is obtained per hour; the second washing liquid obtained in the washing is returned by means of the tenth circulation pump 80 to the first MVR evaporation device 1.

In this embodiment, 3.523 m$^3$ first ammonia water at 1.9 mass % concentration is obtained per hour in the second ammonia water storage tank 52.

In addition, the tail gas discharged from the cooling crystallization device 2 and the fourth heat exchange device is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, and water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas. The MVR evaporation is initiated by charging steam at 143.3° C. temperature in the initial stage.

Embodiment 2

The waste water containing ammonium salts is treated with the method described in the embodiment 1, but: waste water containing ammonium salts that contains 68 g/L NaCl, 100 g/L Na$_2$SO$_4$, 6 g/L NH$_4$Cl and 9 g/L (NH$_4$)$_2$SO$_4$ with pH=6.5 is treated, the concentration of Cl$^-$ is 2.219 mol/L, and the concentration of SO$_4^{2-}$ is 0.723 mol/L in the obtained waste water to be treated. After the heat exchange in the second heat exchange device 32, the temperature of the waste water to be treated is 7.6° C.

The temperature of the cooling crystallization is 0° C., and the time is 150 min.; the temperature of the first evaporation is 100° C., the pressure is −22.83 kPa, and the amount of evaporation is 5.055 m$^3$/h; the temperature of the cooling treatment is 20° C., and the time is 55 min.

3,500.8 kg filter cake of sodium sulfate decahydrate crystal with 76 mass % water content (at 98.3 mass % purity) is obtained per hour in the first solid-liquid separation device 91; 11.344 m$^3$ first mother liquid at concentrations of 183.7 g/L NaCl, 37.5 g/L Na$_2$SO$_4$, and 3.68 g/L NH$_3$ is obtained per hour.

In the concentration by electrodialysis, the thick solution in the concentration is at 8.73 m$^3$/h flow rate, and contains 190.96 g/L NaCl, 38.98 g/L Na$_2$SO$_4$, and 6.58 g/L NH$_3$; the thin liquid in the concentration is at 2.613 m$^3$/h flow rate, and contains 75.73 g/L NaCl, 16.27 g/L Na$_2$SO$_4$, and 1.6 g/L NH$_3$.

776 kg filter cake of sodium chloride crystal with 14.5 mass % water content is obtained per hour in second solid-liquid separation device 92, and finally 663 kg sodium chloride (at 99.5 mass % purity) is obtained per hour; 11.343 m³ second mother liquid at concentrations of 280 g/L NaCl, 89 g/L Na$_2$SO$_4$, 2.2 g/L NaOH, and 0.17 g/L NH$_3$ is obtained per hour.

5.055 m³ first ammonia water at 0.7 mass % concentration is obtained per hour in the second ammonia water storage tank 52, and the first ammonia water may be reused in a zeolite production process.

Embodiment 3

The waste water containing ammonium salts is treated with the method described in the embodiment 1, but: waste water containing ammonium salts that contains 70 g/L NaCl, 36 g/L Na$_2$SO$_4$, 20 g/L NH$_4$Cl and 10.45 g/L (NH$_4$)$_2$SO$_4$ with pH=6.6 is treated, the concentration of Cl$^-$ is 2.557 mol/L, and the concentration of SO$_4^{2-}$ is 0.404 mol/L in the obtained waste water to be treated. After the heat exchange in the second heat exchange device 32, the temperature of the waste water to be treated is −1° C.

The temperature of the cooling crystallization is −4° C., and the time is 120 min.; the temperature of the first evaporation is 110° C., the pressure is 11.34 kPa, and the amount of evaporation is 6.262 m³/h; the temperature of the cooling treatment is 25° C., and the time is 60 min.

555.4 kg filter cake of sodium sulfate decahydrate crystal with 76 mass % water content (at 99.5 mass % purity) is obtained per hour in the first solid-liquid separation device 91; 14.823 m³ first mother liquid at concentrations of 175.87 g/L NaCl, 33.5 g/L Na$_2$SO$_4$, and 6.04 g/L NH$_3$ is obtained per hour.

In the concentration by electrodialysis, the thick solution in the concentration is at 10.89 m³/h flow rate, and contains 191.47 g/L NaCl, 36.47 g/L Na$_2$SO$_4$, and 9.46 g/L NH$_3$; the thin liquid in the concentration is at 3.93 m³/h flow rate, and contains 66.33 g/L NaCl, 12.63 g/L Na$_2$SO$_4$, and 2.28 g/L NH$_3$.

975.1 kg filter cake of sodium chloride crystal with 15 mass % water content is obtained per hour in second solid-liquid separation device 92, and finally 828.8 kg sodium chloride (at 99.5 mass % purity) is obtained per hour; 4.815 m³ second mother liquid at concentrations of 280.5 g/L NaCl, 82.5 g/L Na$_2$SO$_4$, 2.2 g/L NaOH, and 0.29 g/L NH$_3$ is obtained per hour.

6.26 m³ first ammonia water at 1.25 mass % concentration is obtained per hour in the second ammonia water storage tank 52, and the first ammonia water may be reused in a zeolite production process.

Embodiment 4

As shown in FIG. 5, waste water containing ammonium salts (containing 38 g/L NaCl, 100 g/L Na$_2$SO$_4$, 10 g/L NH$_4$Cl, 26.75 g/L (NH$_4$)$_2$SO$_4$, with pH=6.2) is fed at 10 m³/h feed rate into the pipeline of the treatment system, and then is mixed with the second mother liquid returned by the ninth circulation pump 79 to obtain waste water to be treated (the measured concentration of is 2.42 mol/L, and the measured concentration of SO$_4^{2-}$ is 0.689 mol/L); 45.16 mass % sodium hydroxide solution is introduced into the pipeline for the first pH adjustment, and the adjusted pH value is monitored with the first pH measuring device 61 (a pH meter) (the measured value is 8); then the waste water to be treated is fed by means of the first circulation pump 71 into the second heat exchange device 32 (a plastic heat exchanger) to have first heat exchange with the first mother liquid, so that the temperature of the waste water to be treated is decreased to 3° C.; next, the waste water is mixed with the circulating liquid fed from the cooling crystallization device 2 (a freezing crystallization tank) by means of the second circulation pump 72, the resultant mixture exchanges heat with the refrigerating liquid in the sixth heat exchange device 36, so that the temperature of the mixture is further decreased; then, the mixture is fed into the cooling crystallization device 2 and treated by cooling crystallization, so that crystalline solution that contains sodium sulfate crystal is obtained. Wherein the temperature of the cooling crystallization is −4° C., and the time of the cooling crystallization is 120 min., the recirculated amount in the cooling crystallization is controlled to be 1,137 m³/h, and the degree of super-saturation of sodium sulfate in the cooling crystallization process is controlled so that it is not greater than 1 g/L. The crystalline solution that contains sodium sulfate crystal is fed into the first solid-liquid separation device 91 (a centrifugal machine) for solid-liquid separation; thus, 13.69 m³ first mother liquid that contains 200.8 g/L NaCl, 27.5 g/L Na$_2$SO$_4$, and 5.4 g/L NH$_3$ is obtained per hour and is stored temporarily in the first mother liquid tank 53; in addition, 3,389.91 kg filter cake of sodium sulfate decahydrate crystal at 98.4 mass % purity, which contains 75 mass % water, is obtained per hour.

The first mother liquid is fed by means of the sixth circulation pump 76 into the second heat exchange device 32 for heat exchange, and then is fed into the concentration device 9 (a electrodialysis device) for concentration by electrodialysis, wherein the flow rate of the thick solution in the concentration is 10.87 m³/h, and the thick solution contains 202.3 g/L NaCl, 27.7 g/L Na$_2$SO$_4$, and 7.7 g/L NH$_3$; next, the thick solution is evaporated by first evaporation, wherein the flow rate of the thin solution in the concentration is 2.82 m³/h, the thin solution contains 97.5 g/L NaCl, 13.3 g/L Na$_2$SO$_4$, and 3.5 g/L NH$_3$, and the thin liquid in the concentration is returned as waste water containing ammonium salts.

The first evaporation process is executed in the first MVR evaporation device 1 (a falling film+forced circulation two-stage MVR evaporating crystallizer). The thick solution in the concentration is fed into the third heat exchange device 33 (a duplex stainless steel plate-type heat exchanger) to exchange heat with the condensate of the first ammonium-containing vapor; then the resultant mixture is fed into the fourth heat exchange device 34 (a duplex stainless steel plate-type heat exchanger) to exchange heat with the first ammonium-containing vapor after compression, and then is fed into the pipeline of the first MVR evaporation device 1, and sodium hydroxide solution at 45.16 mass % concentration is introduced into the pipeline to adjust the pH value, the adjusted pH value is monitored with the second pH measuring device 62 (a pH meter) (the measured value is 10.8); then the mixture is evaporated by the first evaporation in the first MVR evaporation device 1, so that first concentrated solution that contains sodium chloride crystal and first ammonium-containing vapor is obtained. The temperature of the first evaporation is 100° C., the pressure is −22.83 kPa, and the amount of evaporation is 5.12 m³/h. After the first ammonium-containing vapor is compressed by the compressor 102 (the temperature is increased by 16° C.), it exchanges heat with the first mother liquid in the fourth heat exchange device 34 and the third heat exchange device 33 sequentially, so that first ammonia water is obtained, and is stored in the second ammonia water storage tank 52. In addition, to improve the solid content in the first MVR evaporation device 1, a part of the liquid after the first evaporation in the first MVR evaporation device 1 is circulated as circulating liquid by means of the seventh circulation pump 77 to the first MVR evaporation device 1 again for first evaporation (the recirculation ratio is 46.3). The degree of the first evaporation is monitored with the densitometer provided on the first MVR evaporation device 1, to control the concentration of sodium sulfate in the first concentrated solution to be 0.9626 Y (51.5 g/L).

The first concentrated solution that contains sodium chloride crystal, which is obtained in the first evaporation, is fed into the second solid-liquid separation device 92 (a centrifugal machine) for second solid-liquid separation, 5.85 m$^3$ second mother liquid that contains 309.1 g/L NaCl, 51.5 g/L Na$_2$SO$_4$, 1.4 g/L NaOH and 0.27 g/L NH$_3$ is obtained per hour, and the second mother liquid is temporarily stored in the second mother liquid tank 54; second mother liquid may be transferred by means of the ninth circulation pump 79 to the pipeline into which the waste water containing ammonium salts is introduced, and is mixed with the waste water containing ammonium salts to obtain waste water to be treated. The obtained solid sodium chloride (498.83 kg filter cake of sodium chloride crystal with 14 mass % water content is obtained per hour, wherein the content of sodium sulfate is 2.0 mass % or lower) is eluted with 309 g/L sodium chloride solution in the same dry mass as the sodium chloride, and is dried in a drier, thus 428.99 kg sodium chloride (at 99.5 mass % purity) is obtained per hour; the second washing liquid obtained in the washing is returned by means of the tenth circulation pump 80 to the first MVR evaporation device 1.

In this embodiment, 5.12 m$^3$ first ammonia water at 1.7 mass % concentration is obtained per hour in the second ammonia water storage tank 52.

In addition, the tail gas discharged from the cooling crystallization device 2 and the fourth heat exchange device is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, and water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas. The MVR evaporation is initiated by charging steam at 143.3° C. temperature in the initial stage.

Embodiment 5

The waste water containing ammonium salts is treated with the method described in the embodiment 4, but: waste water containing ammonium salts that contains 46 g/L NaCl, 96 g/L Na$_2$SO$_4$, 12 g/L NH$_4$Cl and 25.5 g/L (NH$_4$)$_2$SO$_4$ with pH=6.6 is treated, the concentration of Cl$^-$ is 2.43 mol/L, and the concentration of SO$_4^{2-}$ is 0.687 mol/L in the obtained waste water to be treated. After the heat exchange in the second heat exchange device 32, the temperature of the waste water to be treated is 5° C.

The temperature of the cooling crystallization is −2° C., and the time is 125 min.; the temperature of the first evaporation is 75° C., the pressure is −72.74 kPa, and the amount of evaporation is 5.32 m$^3$/h.

3,446.63 kg filter cake of sodium sulfate decahydrate crystal with 76 mass % water content (at 98.6 mass % purity) is obtained per hour in the first solid-liquid separation device 91; 13.17 m$^3$ first mother liquid at concentrations of 202.8 g/L NaCl, 29.8 g/L Na$_2$SO$_4$, and 7.8 g/L NH$_3$ is obtained per hour.

In the concentration by electrodialysis, the thick solution in the concentration is at 10.65 m$^3$/h flow rate, and contains 200.5 g/L NaCl, 29.5 g/L Na$_2$SO$_4$, and 8.3 g/L NH$_3$; the thin liquid in the concentration is at 2.51 m$^3$/h flow rate, and contains 106.3 g/L NaCl, 15.6 g/L Na$_2$SO$_4$, and 4.0 g/L NH$_3$.

615.44 kg filter cake of sodium chloride crystal with 15 mass % water content is obtained per hour in second solid-liquid separation device 92, and finally 523.12 kg sodium chloride (at 99.5 mass % purity) is obtained per hour; 5.45 m$^3$ second mother liquid at concentrations of 305.3 g/L NaCl, 57.6 g/L Na$_2$SO$_4$, 0.50 g/L NaOH, and 0.3 g/L NH$_3$ is obtained per hour in the second solid-liquid separation device 92. 5.32 m$^3$ first ammonia water at 1.6 mass % concentration is obtained per hour in the second ammonia water storage tank 52, and the first ammonia water may be reused in a zeolite production process.

Embodiment 6

The waste water containing ammonium salts is treated with the method described in the embodiment 4, but: waste water containing ammonium salts that contains 33 g/L NaCl, 90 g/L Na$_2$SO$_4$, 10 g/L NH$_4$Cl and 27.7 g/L (NH$_4$)$_2$SO$_4$ with pH=6.3 is treated, the concentration of Cl$^-$ is 2.177 mol/L, and the concentration of SO$_4^{2-}$ is 0.693 mol/L in the obtained waste water to be treated. After the heat exchange in the second heat exchange device 32, the temperature of the waste water to be treated is 3° C.

The temperature of the cooling crystallization is −4° C., and the time is 120 min.; the temperature of the first evaporation is 50° C., the pressure is −92.67 kPa, and the amount of evaporation is 4.61 m$^3$/h.

3,197.06 kg filter cake of sodium sulfate decahydrate crystal with 74.5 mass % water content (at 98.9 mass % purity) is obtained per hour in the first solid-liquid separation device 91; 13.38 m$^3$ first mother liquid at concentrations of 178.6 g/L NaCl, 32.5 g/L Na$_2$SO$_4$, and 7.6 g/L NH$_3$ is obtained per hour.

In the concentration by electrodialysis, the thick solution in the concentration is at 9.83 m$^3$/h flow rate, and contains 194.6 g/L NaCl, 35.4 g/L Na$_2$SO$_4$, and 5.5 g/L NH$_3$; the thin liquid in the concentration is at 3.56 m$^3$/h flow rate, and contains 67.2 g/L NaCl, 12.2 g/L Na$_2$SO$_4$, and 2.8 g/L NH$_3$.

456.92 kg filter cake of sodium chloride crystal with 15 mass % water content is obtained per hour in second solid-liquid separation device 92, and finally 388.38 kg sodium chloride (at 99.5 mass % purity) is obtained per hour; 5.30 m$^3$ second mother liquid at concentrations of 294.7 g/L NaCl, 65.7 g/L Na$_2$SO$_4$, 0.14 g/L NaOH, and 0.3 g/L NH$_3$ is obtained per hour in the second solid-liquid separation device 92.

4.61 m$^3$ first ammonia water at 1.9 mass % concentration is obtained per hour in the second ammonia water storage tank 52, and the first ammonia water may be reused in a zeolite production process.

Embodiment 7

As shown in FIG. 6, waste water containing ammonium salts (containing 63 g/L NaCl, 65 g/L Na$_2$SO$_4$, 25.2 g/L NH$_4$Cl, 26.4 g/L (NH$_4$)$_2$SO$_4$, with pH=7.0) is fed at 5 m$^3$/h feed rate into the pipeline of the treatment system, 45.16 mass % sodium hydroxide solution is introduced into the pipeline for the first pH adjustment, the adjusted pH value is monitored with the first pH measuring device 61 (a pH meter) (the measured value is 8.6), and then a part of the waste water is fed by means of the first circulation pump 71 into the first heat exchange device 31 to exchange heat with the condensate of the second ammonia-containing vapor, and is mixed with the fifth mother liquid returned by the ninth circulation pump 79; the other part of the waste water is fed into the eleventh heat exchange device 30 to exchange heat with the third mother liquid; the two parts are merged to obtain waste water to be treated (wherein the molar ratio of $SO_4^{2-}$ to $Cl^-$ is 1:2.88); then the waste water to be treated is fed into the eighth heat exchange device 38 to exchange heat with the second ammonia-containing vapor, so that the temperature of the waste water to be treated is increased to 107° C.; next, sodium hydroxide solution at 45.16 mass % concentration is introduced into the pipeline through which the waste water is fed into the second MVR evaporation device 3 for second pH adjustment, and the adjusted pH value is monitored with the second pH measuring device 60 (a pH meter) (the measured value is 10.8).

The second evaporation is executed in the second MVR evaporation device 3 (falling film+forced circulation two-stage MVR evaporation crystallizer), the evaporation temperature is 100° C., the pressure is −22.82 kPa, and the amount of evaporation is 4.00 m³/h; thus, second ammonia-containing vapor and second concentrated solution that contains sodium sulfate crystal are obtained. The second ammonia-containing vapor is compressed in the first compressor 101 (the temperature is increased by 16° C.), then the second ammonia-containing vapor flows through the eighth heat exchange device 38 and the first heat exchange device 31 sequentially to exchange heat with the waste water to be treated and the waste water containing ammonium salts respectively, so that first ammonia water is obtained, and stored in the first ammonia water storage tank 51. Besides, to improve the content of solids in the second MVR evaporation device 3, a part of the liquid after the evaporation in the second MVR evaporation device 3 is taken as circulating liquid and circulated by means of the fifth circulation pump 75 to the eighth heat exchange device 38 for heat exchange, and then the circulating liquid enters into the second MVR evaporation device 3 again for second evaporation (the second recirculation ratio is 80). The degree of the second evaporation is monitored with the densitometer provided on the second MVR evaporation device 3, to control the concentration of sodium chloride in the second concentrated solution to be 273.9 g/L (4.682 mol/L).

The second concentrated solution that contains sodium sulfate crystal, which is obtained in the evaporation in the second MVR evaporation device 3, is fed into the third solid-liquid separation device 93 (a centrifugal machine) for third solid-liquid separation; thus, 2.16 m³ third mother liquid that contains 273.9 g/L NaCl, 61.9 g/L $Na_2SO_4$, 1.38 g/L NaOH, and 0.34 g/L $NH_3$ is obtained per hour (the concentration of $Cl^-$ is 4.682 mol/L, the concentration of $SO_4^{2-}$ is 0.4359 mol/L), and is stored temporarily in the third mother liquid tank 50; the sodium sulfate solid obtained in the solid-liquid separation (474.84 kg filter cake of sodium sulfate crystal with 1.5 mass % water content is obtained per hour, wherein the content of sodium chloride is 1.5 mass % or lower) is eluted with 61 g/L sodium sulfate solution that is equal to the dry mass of filter cake of sodium sulfate crystal, and is dried, so that 467.71 kg sodium sulfate (at 99.4 mass % purity) is obtained per hour, and the washing liquid is circulated by means of the fourteenth circulation pump 84 to the pipeline before the eighth heat exchange device 38 and mixed with the waste water containing ammonium salts; then the mixture is fed into the second MVR evaporation device 3 again for second evaporation.

After the third mother liquid is fed by means of the eleventh circulation pump 70 into the eleventh heat exchange device 30 and exchanged heat with the waste water containing ammonium salts, the third mother liquid is further fed into the second heat exchange device 32 (a plastic heat exchanger) to exchange heat with the third mother liquid, so that the temperature of the third mother liquid is decreased to 15.8° C.; then, the third mother liquid is mixed with the circulating liquid transferred by the second circulation pump 72 from the cooling crystallization device 2, and exchanges heat with the refrigerating liquid in the sixth heat exchange device 36 so that its temperature is further decreased; then, the third mother liquid is fed into the cooling crystallization device 2 (a freezing crystallization tank) for cooling crystallization, so that crystalline solution that contains sodium sulfate crystal is obtained. Wherein the temperature of the cooling crystallization is −2° C., and the time of the cooling crystallization is 120 min., the recirculated amount in the cooling crystallization is controlled to be 98 m³/h, and the degree of super-saturation of sodium sulfate in the cooling crystallization process is controlled so that it is not greater than 1.0 g/L.

The crystalline solution that contains sodium sulfate crystal, which is obtained in the cooling crystallization device 2, is fed into the first solid-liquid separation device 91 (a centrifugal machine) for solid-liquid separation; thus, 1.98 m³ fourth mother liquid that contains 299.2 g/L NaCl, 15.6 g/L $Na_2SO_4$, 1.5 g/L NaOH, and 0.37 g/L $NH_3$ is obtained per hour, and is stored temporarily in the first mother liquid tank 53; 228.49 kg filter cake of sodium sulfate decahydrate crystal at 98.2 mass % purity with 55 mass % water content is obtained per hour, dissolved with the waste water containing ammonium salts, and then fed by means of the first circulation pump 71 into the second MVR evaporation device 3 for second evaporation to prepare anhydrous sodium sulfate.

The third evaporation process is executed in the first MVR evaporation device 1 (falling film+forced circulation two-stage MVR evaporating crystallizer). The fourth mother liquid is fed into the third heat exchange device 33 (a duplex stainless steel plate-type heat exchanger) to exchange heat with the condensate of the third ammonium-containing vapor, then is fed into the fourth heat exchange device 34 (a duplex stainless steel plate-type heat exchanger) to exchange heat with the compressed third ammonium-containing vapor, and then is treated by third evaporation in the first MVR evaporation device 1 to obtain third concentrated solution that contains sodium chloride crystal and third ammonium-containing vapor. The temperature of the third evaporation is 50° C., the pressure is −92.67 kPa, and the amount of evaporation is 1.65 m³/h. After the third ammonium-containing vapor is compressed by the second compressor 102 (the temperature is increased by 16° C.), it exchanges heat with the fourth mother liquid in the fourth heat exchange device 34 and the third heat exchange device 33 sequentially, so that second ammonia water is obtained, and is stored in the second ammonia water storage tank 52. In addition, to improve the solid content in the first MVR evaporation device 1, a part of the liquid after the third evaporation in the first MVR evaporation device 1 is circulated as circulating liquid by means of the seventh circulation pump 77 to the first MVR evaporation device 1 again for third evaporation (the third recirculation ratio is 87.5). The degree of the third evaporation is monitored with the densitometer provided on the first MVR evaporation device 1, to control the concentration of sodium sulfate in the third concentrated solution after third evaporation to be 0.970 Y (65.3 g/L).

The third concentrated solution that contains sodium chloride crystal is fed into the second solid-liquid separation device 92 (a centrifugal machine) for fifth solid-liquid separation, and then is eluted; thus, 0.473 m³ fifth mother liquid that contains 293.6 g/L NaCl, 65.3 g/L $Na_2SO_4$, 6.3 g/L NaOH and 0.0016 g/L $NH_3$ is obtained per hour, and is temporarily stored in the second mother liquid tank 54; in addition, all of the fifth mother liquid is transferred by means of the ninth circulation pump 79 to the waste water transport pipeline, and is mixed with the waste water containing ammonium salts to obtain waste water to be treated. The obtained solid sodium chloride (458.65 kg filter cake of sodium chloride crystal with 1.4 mass % water content is obtained per hour, wherein the content of sodium sulfate is 1.5 mass % or lower) is eluted with 293 g/L sodium chloride solution in the same dry mass as the sodium chloride, and is dried in a drier, thus 452.23 kg sodium chloride (at 99.5 mass % purity) is obtained per hour; the fourth washing liquid obtained in the washing is returned by means of the tenth circulation pump 80 to the first MVR evaporation device 1.

In this embodiment, 4.00 m³ ammonia water at 1.7 mass % concentration is obtained per hour in the first ammonia water storage tank 51; 1.65 m³ ammonia water at 0.04 mass % concentration is obtained per hour in the second ammonia water storage tank 52.

In addition, the tail gas discharged from the eighth heat exchange device 38, the cooling crystallization device 2, and the fourth heat exchange device 34 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, and water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas. The MVR evaporation is initiated by charging steam at 143.3° C. temperature in the initial stage.

Embodiment 8

The waste water containing ammonium salts is treated with the method described in the embodiment 7, but: waste water containing ammonium salts that contains 45 g/L NaCl, 90 g/L $Na_2SO_4$, 15.1 g/L $NH_4Cl$ and 30.7 g/L $(NH_4)_2SO_4$ with pH=6.6 is treated, and the molar ratio of $SO_4^{2-}$ to $Cl^-$ contained in the obtained waste water to be treated is 1:1.59, and the temperature of the waste water to be treated is 102° C. after the heat exchange in the eighth heat exchange device 38.

The temperature of the second evaporation is 95° C., the pressure is −36.36 kPa, and the amount of evaporation is 4.51 m³/h; the temperature of the cooling crystallization is −4° C., and the time is 120 min.; the temperature of the third evaporation is 75° C., the pressure is −72.75 kPa, and the amount of evaporation is 1.15 m³/h.

625.74 kg filter cake of sodium sulfate crystal with 1.4 mass % water content is obtained per hour in the third solid-liquid separation device 93 (wherein the content of sodium chloride is 1.5 mass % or lower); the filter cake of sodium sulfate crystal is eluted with 64 g/L sodium sulfate solution that is in the same dry mass as the filter cake of sodium sulfate crystal; after drying, 616.98 kg sodium sulfate (at 99.5 mass % purity) is obtained per hour, and 1.56 m³ third mother liquid that contains 267.3 g/L NaCl, 64.3 g/L $Na_2SO_4$, 1.83 g/L NaOH, and 0.41 g/L $NH_3$ (the concentration of $Cl^-$ is 4.569 mol/L, and the concentration of $SO_4^{2-}$ is 0.4528 mol/L) is obtained per hour.

181.65 kg filter cake of sodium sulfate decahydrate crystal with 56 mass % water content (at 98.1 mass % purity) is obtained per hour in the first solid-liquid separation device 91, dissolved with the waste water containing ammonium salts, and then returned to the second evaporation; 1.41 m³ fourth mother liquid at concentrations of 295.1 g/L NaCl, 14.3 g/L $Na_2SO_4$, 2.0 g/L NaOH, and 0.45 g/L $NH_3$ is obtained per hour.

310.34 kg filter cake of sodium chloride crystal with 1.5 mass % water content is obtained per hour in second solid-liquid separation device 92, and finally 305.69 kg sodium chloride (at 99.6 mass % purity) is obtained per hour; 0.361 m³ fifth mother liquid at concentrations of 300.9 g/L NaCl, 55.9 g/L $Na_2SO_4$, 7.89 g/L NaOH, and 0.0018 g/L $NH_3$ is obtained per hour in the second solid-liquid separation device 92.

4.51 m³ ammonia water at 1.3 mass % concentration is obtained per hour in the first ammonia water storage tank 51; 1.15 m³ ammonia water at 0.05 mass % concentration is obtained per hour in the second ammonia water storage tank 52.

Embodiment 9

The waste water containing ammonium salts is treated with the method described in the embodiment 7, but: waste water containing ammonium salts that contains 80 g/L NaCl, 42 g/L $Na_2SO_4$, 37.1 g/L $NH_4Cl$ and 19.8 g/L $(NH_4)_2SO_4$ with pH=6.9 is treated, and the molar ratio of $SO_4^{2-}$ to $Cl^-$ contained in the obtained waste water to be treated is 1:6.03, and the temperature of the waste water to be treated is 112° C. after the heat exchange in the eighth heat exchange device 38.

The temperature of the second evaporation is 105° C., the pressure is −7.01 kPa, and the amount of evaporation is 3.43 m³/h; the temperature of the cooling crystallization is 0° C., and the time is 120 min.; the temperature of the third evaporation is 100° C., the pressure is −22.83 kPa, and the amount of evaporation is 2.11 m³/h.

319.54 kg filter cake of sodium sulfate crystal with 1.5 mass % water content is obtained per hour in the third solid-liquid separation device 93 (wherein the content of sodium chloride is 1.5 mass % or lower); the filter cake of sodium sulfate crystal is eluted with 59 g/L sodium sulfate solution that is in the same dry mass as the filter cake of sodium sulfate crystal; after drying, 314.75 kg sodium sulfate (at 99.6 mass % purity) is obtained per hour, and 3.27 m³ third mother liquid that contains 278.6 g/L NaCl, 59.2 g/L $Na_2SO_4$, 2.64 g/L NaOH, and 0.25 g/L $NH_3$ (the concentration of $Cl^-$ is 4.762 mol/L, and the concentration of $SO_4^{2-}$ is 0.4169 mol/L) is obtained per hour.

317.86 kg filter cake of sodium sulfate decahydrate crystal with 55 mass % water content (at 98.2 mass % purity) is obtained per hour in the first solid-liquid separation device 91; 3.02. m³ fourth mother liquid at concentrations of 302 g/L NaCl, 16.8 g/L Na$_2$SO$_4$, 2.8 g/L NaOH, and 0.27 g/L NH$_3$ is obtained per hour.

703.02 kg filter cake of sodium chloride crystal with 14 mass % water content is obtained per hour in second solid-liquid separation device 92, and finally 604.60 kg sodium chloride (at 99.5 mass % purity) is obtained per hour; 1.02 m³ fifth mother liquid at concentrations of 304.6 g/L NaCl, 50 g/L Na$_2$SO$_4$, 8.5 g/L NaOH, and 0.0008 g/L NH$_3$ is obtained per hour.

3.43 m³ ammonia water at 2.3 mass % concentration is obtained per hour in the first ammonia water storage tank 51; 2.11 m³ ammonia water at 0.04 mass % concentration is obtained per hour in the second ammonia water storage tank 52.

Embodiment 10

As shown in FIG. 7, waste water containing ammonium salts (containing 58 g/L NaCl, 66 g/L Na$_2$SO$_4$, 26.3 g/L NH$_4$Cl, 30.4 g/L (NH$_4$)$_2$SO$_4$, with pH=6.8) is fed at 5 m³/h feed rate into the pipeline of the treatment system, 45.16 mass % sodium hydroxide solution is introduced into the pipeline for the first pH adjustment, the adjusted pH value is monitored with the first pH measuring device 61 (a pH meter) (the measured value is 8.0), and then a part of the waste water containing ammonium salts is fed by means of the first circulation pump 71 into the first heat exchange device 31 to exchange heat with the condensate of the second ammonia-containing vapor, the other part of the waste water is mixed with the third mother liquid returned by the ninth circulation pump 79 and then is fed into the eleventh heat exchange device 30 to exchange heat with the third mother liquid; the two parts are merged to obtain waste water to be treated (wherein the molar ratio of SO$_4^{2-}$ to Cl$^-$ is 1:2.42); then the waste water to be treated is fed into the eighth heat exchange device 38 to exchange heat with the second ammonia-containing vapor, so that the temperature of the waste water to be treated is increased to 112° C.; next, sodium hydroxide solution at 45.16 mass % concentration is introduced into the pipeline through which the waste water is fed into the second MVR evaporation device 3 for second pH adjustment, and the adjusted pH value is monitored with the second pH measuring device 60 (a pH meter) (the measured value is 10.8).

The second evaporation is executed in the second MVR evaporation device 3 (falling film+forced circulation two-stage MVR evaporation crystallizer), the evaporation temperature is 105° C., the pressure is -7.01 kPa, and the amount of evaporation is 4.12 m³/h; thus, second ammonia-containing vapor and second concentrated solution that contains sodium sulfate crystal are obtained. The second ammonia-containing vapor is compressed in the first compressor 101 (the temperature is increased by 16° C.), then the second ammonia-containing vapor flows through the eighth heat exchange device 38 and the first heat exchange device 31 sequentially to exchange heat with the waste water to be treated and the waste water containing ammonium salts, so that first ammonia water is obtained, and stored in the first ammonia water storage tank 51. Besides, to improve the content of solids in the second MVR evaporation device 3, a part of the liquid after the evaporation in the second MVR evaporation device 3 is taken as circulating liquid and circulated by means of the fifth circulation pump 75 to the eighth heat exchange device 38 for heat exchange, and then the circulating liquid enters into the second MVR evaporation device 3 again for second evaporation (the second recirculation ratio is 82). The degree of the second evaporation is monitored with the densitometer provided on the second MVR evaporation device 3, to control the concentration of sodium chloride in the second concentrated solution to be 273.5 g/L (4.675 mol/L).

The second concentrated solution that contains sodium sulfate crystal, which is obtained in the evaporation in the second MVR evaporation device 3, is fed into the third solid-liquid separation device 93 (a centrifugal machine) for third solid-liquid separation; thus, 1.90 m³ third mother liquid that contains 273.5 g/L NaCl, 60.7 g/L Na$_2$SO$_4$, 1.67 g/L NaOH, and 0.43 g/L NH$_3$ is obtained per hour (the concentration of Cl$^-$ is 4.675 mol/L, the concentration of SO$_4^{2-}$ is 0.4275 mol/L), and is stored temporarily in the third mother liquid tank 50; the sodium sulfate solid obtained in the solid-liquid separation (500.52 kg filter cake of sodium sulfate crystal with 1.5 mass % water content is obtained per hour, wherein the content of sodium chloride is 2.0 mass % or lower) is eluted with 60 g/L sodium sulfate solution that is equal to the dry mass of filter cake of sodium sulfate crystal, and is dried, so that 493.51 kg sodium sulfate (at 99.5 mass % purity) is obtained per hour, and the washing liquid is circulated by means of the fourteenth circulation pump 84 to the pipeline before the eighth heat exchange device 38 and mixed with the waste water containing ammonium salts; then the mixture is fed into the second MVR evaporation device 3 again for second evaporation.

After the third mother liquid is fed by means of the eleventh circulation pump 70 into the eleventh heat exchange device 30 and exchanged heat with the waste water containing ammonium salts, the third mother liquid is further fed into the second heat exchange device 32 (a plastic heat exchanger) to exchange heat with the third mother liquid, so that the temperature of the third mother liquid is decreased to 16° C.; then, the third mother liquid is mixed with the circulating liquid transferred by the second circulation pump 72 from the cooling crystallization device 2, and exchanges heat with the refrigerating liquid in the sixth heat exchange device 36 so that its temperature is further decreased; then, the third mother liquid is fed into the cooling crystallization device 2 (a continuous freezing crystallization tank) for cooling crystallization, so that crystalline solution that contains sodium sulfate crystal is obtained. Wherein the temperature of the cooling crystallization is -2° C., and the time of the cooling crystallization is 120 min., the recirculated amount in the cooling crystallization is controlled to be 84 m³/h, and the degree of super-saturation of sodium sulfate in the freezing process is controlled to be 1.0 g/L.

The crystalline solution that contains sodium sulfate crystal, which is obtained in the cooling crystallization device 2, is fed into the first solid-liquid separation device 91 (a centrifugal machine) for solid-liquid separation; thus, 1.74 m³ second mother liquid that contains 299 g/L NaCl, 15.6 g/L Na$_2$SO$_4$, 1.8 g/L NaOH, and 0.46 g/L NH$_3$ is obtained per hour, and is stored temporarily in the first mother liquid tank 53; 200.59 kg filter cake of sodium sulfate decahydrate crystal at 98 mass % purity with 56 mass % water content is obtained per hour, dissolved with the waste water containing ammonium salts, and then fed by means of the first circulation pump 71 into the second MVR evaporation device 3 for second evaporation to prepare anhydrous sodium sulfate.

The third evaporation process is executed in the first MVR evaporation device 1 (falling film+forced circulation two-stage MVR evaporating crystallizer). A part of the second mother liquid is fed into the third heat exchange device 33 (a duplex stainless steel plate-type heat exchanger) to exchange heat with the condensate of the third ammonium-containing vapor after compression, the other part is fed into the fifth heat exchange device 35 (a duplex stainless steel plate-type heat exchanger) to exchange heat with the third concentrated solution that contains sodium chloride crystal obtained in the third evaporation, and then the two parts of second mother liquid are merged and loaded into the fourth heat exchange device 34 (a duplex stainless steel plate-type heat exchanger) to exchange heat with the third ammonium-containing vapor; next, the second mother liquid is treated by third evaporation is executed in the first MVR evaporation device 1 to obtain third concentrated solution that contains sodium chloride crystal and third ammonium-containing vapor. The temperature of the third evaporation is 105° C., the pressure is −7.02 kPa, and the amount of evaporation is 1.57 m³/h. After the third ammonium-containing vapor is compressed by the second compressor 102 (the temperature is increased by 16° C.), it exchanges heat with the second mother liquid in the fourth heat exchange device 34 and the third heat exchange device 33 sequentially, so that second ammonia water is obtained, and is stored in the second ammonia water storage tank 52. In addition, to improve the solid content in the first MVR evaporation device 1, a part of the liquid after the third evaporation in the first MVR evaporation device 1 is circulated as circulating liquid by means of the seventh circulation pump 77 to the first MVR evaporation device 1 again for third evaporation (the third recirculation ratio is 90). The degree of the third evaporation is monitored with the mass flow meter provided on the first MVR evaporation device 1, to control the amount of evaporation in the third evaporation to be 1.57 m³/h (equivalent to controlling the concentration of sodium sulfate in the treated solution to be 0.978 Y (87.4 g/L)).

The third concentrated solution that contains sodium sulfate crystal and sodium chloride crystal, which is obtained in the third evaporation, is treated by cooling treatment in the low temperature treatment tank 55 (temperature: 20° C., time: 60 min.) to obtain treated solution that contains sodium chloride crystal. A stirring paddle is provided in the low temperature treatment tank 55 and operates at 60 r/min. rotation speed.

The treated solution that contains sodium chloride crystal, which is obtained in the cooling treatment, is fed into the second solid-liquid separation device 92 (a centrifugal machine) for fifth solid-liquid separation, and then is eluted; thus, 0.31 m³ third mother liquid that contains 277.5 g/L NaCl, 87.4 g/L Na₂SO₄, 10.2 g/L NaOH and 0.0026 g/L NH₃ is obtained per hour, and is temporarily stored in the second mother liquid tank 54; in addition, all of the third mother liquid is transferred by means of the ninth circulation pump 79 to the waste water transport pipeline, and is mixed with the waste water containing ammonium salts to obtain waste water to be treated. The obtained solid sodium chloride (440.53 kg filter cake of sodium chloride crystal with 1.5 mass % water content is obtained per hour, wherein the content of sodium sulfate is 1.5 mass % or lower) is eluted with 277 g/L sodium chloride solution in the same dry mass as the sodium chloride, and is dried in a drier, thus 433.92 kg sodium chloride (at 99.5 mass % purity) is obtained per hour; the fourth washing liquid obtained in the washing is returned by means of the tenth circulation pump 80 to the first MVR evaporation device 1.

In this embodiment, 4.12 m³ ammonia water at 1.9 mass % concentration is obtained per hour in the first ammonia water storage tank 51; 1.57 m³ ammonia water at 0.05 mass % concentration is obtained per hour in the second ammonia water storage tank 52.

In addition, the tail gas discharged from the eighth heat exchange device 38, the cooling crystallization device 2, and the fourth heat exchange device 34 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas. The MVR evaporation is initiated by charging steam at 143.3° C. temperature in the initial stage.

Embodiment 11

The waste water containing ammonium salts is treated with the method described in the embodiment 10, but: waste water containing ammonium salts that contains 46 g/L NaCl, 89 g/L Na₂SO₄, 15 g/L NH₄Cl and 29.5 g/L (NH₄)₂SO₄ with pH=6.7 is treated, and the molar ratio of $SO_4^{2-}$ to $Cl^-$ contained in the obtained waste water to be treated is 1:1.46, and the temperature of the waste water to be treated is 102° C. after the heat exchange in the eighth heat exchange device 38.

The temperature of the second evaporation is 95° C., the pressure is −36.36 kPa, and the amount of evaporation is 4.51 m³/h; the temperature of the cooling crystallization is −4° C., and the time is 120 min.; the temperature of the third evaporation is 107° C., the pressure is 0 kPa, and the amount of evaporation is 0.54 m³/h; the temperature of the cooling treatment is 25° C., and the time is 58 min.

614.99 kg filter cake of sodium sulfate crystal with 1.5 mass % water content is obtained per hour in the third solid-liquid separation device 93 (wherein the content of sodium chloride is 1.5 mass % or lower); the filter cake of sodium sulfate crystal is eluted with 64 g/L sodium sulfate solution that is in the same dry mass as the filter cake of sodium sulfate crystal; after drying, 605.77 kg sodium sulfate (at 99.4 mass % purity) is obtained per hour, and 1.39 m³ third mother liquid that contains 268.7 g/L NaCl, 64.4 g/L Na₂SO₄, 1.15 g/L NaOH, and 0.44 g/L NH₃ (the concentration of $Cl^-$ is 4.593 mol/L, and the concentration of $SO_4^{2-}$ is 0.4535 mol/L) is obtained per hour.

158.68 kg filter cake of sodium sulfate decahydrate crystal with 55 mass % water content (at 98.3 mass % purity) is obtained per hour in the first solid-liquid separation device 91, dissolved with the waste water containing ammonium salts, and then returned to the second evaporation; 1.27 m³ second mother liquid at concentrations of 295.5 g/L NaCl, 14.4 g/L Na₂SO₄, 1.26 g/L NaOH, and 0.48 g/L NH₃ is obtained per hour.

314.32 kg filter cake of sodium chloride crystal with 1.4 mass % water content is obtained per hour in second solid-liquid separation device 92, and finally 309.92 kg sodium chloride (at 99.5 mass % purity) is obtained per hour; 0.222 m³ third mother liquid at concentrations of 279.5 g/L NaCl, 82.2 g/L Na₂SO₄, 7.2 g/L NaOH, and 0.0028 g/L NH₃ is obtained per hour.

4.51 m³ ammonia water at 1.3 mass % concentration is obtained per hour in the first ammonia water storage tank 51; 1.14 m³ ammonia water at 0.05 mass % concentration is obtained per hour in the second ammonia water storage tank 52.

Embodiment 12

The waste water containing ammonium salts is treated with the method described in the embodiment 10, but: waste water containing ammonium salts that contains 82 g/L NaCl, 42 g/L Na$_2$SO$_4$, 36.5 g/L NH$_4$Cl and 19 g/L (NH$_4$)$_2$SO$_4$ with pH=6.2 is treated, and the molar ratio of SO$_4^{2-}$ to Cl$^-$ contained in the obtained waste water to be treated is 1:5.20, and the temperature of the waste water to be treated is 107° C. after the heat exchange in the eighth heat exchange device 38.

The temperature of the second evaporation is 100° C., the pressure is −22.82 kPa, and the amount of evaporation is 3.47 m³/h; the temperature of the cooling crystallization is 0° C., and the time is 120 min.; the temperature of the third evaporation is 105° C., the pressure is −7.02 kPa, and the amount of evaporation is 2.16 m³/h; the temperature of the cooling treatment is 30° C., and the time is 55 min.

315.15 kg filter cake of sodium sulfate crystal with 1.4 mass % water content is obtained per hour in the third solid-liquid separation device 93 (wherein the content of sodium chloride is 1.5 mass % or lower); the filter cake of sodium sulfate crystal is eluted with 60 g/L sodium sulfate solution that is in the same dry mass as the filter cake of sodium sulfate crystal; after drying, 310.74 kg sodium sulfate (at 99.5 mass % purity) is obtained per hour, and 2.71 m³ third mother liquid that contains 279.1 g/L NaCl, 60.3 g/L Na$_2$SO$_4$, 2.2 g/L NaOH, and 0.30 g/L NH$_3$ (the concentration of Cl$^-$ is 4.771 mol/L, and the concentration of SO$_4^{2-}$ is 0.4246 mol/L) is obtained per hour.

278.01 kg filter cake of sodium sulfate decahydrate crystal with 56 mass % water content (at 98.6 mass % purity) is obtained per hour in the first solid-liquid separation device 91, dissolved with the waste water containing ammonium salts, and then returned to the second evaporation; 2.49 m³ second mother liquid at concentrations of 304.3 g/L NaCl, 16.8 g/L Na$_2$SO$_4$, 2.39 g/L NaOH, and 0.33 g/L NH$_3$ is obtained per hour.

620.36 kg filter cake of sodium chloride crystal with 1.5 mass % water content is obtained per hour in second solid-liquid separation device 92, and finally 611.05 kg sodium chloride (at 99.5 mass % purity) is obtained per hour; 0.527 m³ third mother liquid at concentrations of 281 g/L NaCl, 78.5 g/L Na$_2$SO$_4$, 11.3 g/L NaOH, and 0.0016 g/L NH$_3$ is obtained per hour.

3.47 m³ ammonia water at 2.2 mass % concentration is obtained per hour in the first ammonia water storage tank 51; 2.16 m³ ammonia water at 0.038 mass % concentration is obtained per hour in the second ammonia water storage tank 52.

Embodiment 13

As shown in FIG. 8, waste water containing ammonium salts (containing 130 g/L NaCl, 26 g/L Na$_2$SO$_4$, 40 g/L NH$_4$Cl, 8.1 g/L (NH$_4$)$_2$SO$_4$, with pH=6.5) is fed at 5.859 m³/h feed rate into the pipeline of the treatment system, sodium hydroxide solution at 45.16 mass % concentration is introduced into the pipeline for first pH adjustment, and the adjusted pH value is monitored with the first pH measuring device 61 (a pH meter) (the measured value is 9.0); a part of the waste water containing ammonium salts is fed at 5.0 m³/h feed rate by means of the first circulation pump 71 and mixed with the seventh mother liquid returned by the ninth circulation pump 79 to obtain waste water to be treated (wherein the concentration of Cl$^-$ is 3.737 mol/L, the concentration of SO$_4^{2-}$ is 0.197 mol/L, and the molar ratio of Cl$^-$/SO$_4^{2-}$ is 18.97); then a part of the waste water to be treated is fed into the first heat exchange device 31 to exchange heat with the condensate of the fourth ammonia-containing vapor, so that the temperature of the waste water is increased to 102° C.; at the same time, the remaining part of the waste water to be treated is fed into the fifth heat exchange device 35 to exchange heat with the fourth concentrated solution that contains sodium chloride crystal, which is obtained by evaporation, so that the temperature of the waste water is increased to 103° C.; next, the two parts of waste water to be treated is merged and fed into the second heat exchange device 32; the waste water to be treated is fed into the pipeline of the second heat exchange device 32, sodium hydroxide solution at 45.16 mass % concentration is introduced into the pipeline for second pH adjustment, and the adjusted pH value is monitored with the second pH measuring device 62 (a pH meter) (the measured value is 11); next, the waste water to be treated is fed into the second heat exchange device 32 to exchange heat with the fourth ammonia-containing vapor, so that the temperature of the waste water to be treated is increased to 112° C.; finally, the waste water to be treated is fed into the first MVR evaporation device 1 (a falling film+forced circulation two-stage MVR evaporating crystallizer) for fourth evaporation; thus, fourth ammonia-containing vapor and fourth concentrated solution that contains sodium chloride crystal and sodium sulfate crystal are obtained, the evaporation temperature is 105° C., the pressure is −7.02 kPa, and amount of evaporation is 6.116 m³/h. After the fourth ammonium-containing vapor is compressed by the compressor 101 (the temperature is increased by 19° C.), it exchanges heat with the waste water to be treated in the second heat exchange device 32 and the first heat exchange device 31 sequentially, so that ammonia water is obtained, and is stored in the first ammonia water storage tank 51. In addition, to improve the solid content in the first MVR evaporation device 1, a part of the liquid after the evaporation in the first MVR evaporation device 1 is circulated as circulating liquid by means of the seventh circulation pump 77 to the first MVR evaporation device 1 again for evaporation (the recirculation ratio is 120). The degree of the evaporation is monitored with the mass flow meter provided on the first MVR evaporation device 1, to control the amount of evaporation in the evaporation to 6.012 m³/h (equivalent to controlling the concentration of sodium sulfate in the treated solution to 0.9787 Y (91.7 g/L)).

After the fourth concentrated solution that contains sodium chloride crystal and sodium sulfate crystal exchanges heat with a part of the waste water to be treated in the fifth heat exchange device 35, it is fed into the low temperature treatment tank 22 for cooling treatment (temperature: 17.9° C., time: 70 min.), to obtain treated solution that contains sodium chloride crystal. A stirring paddle is provided in the low temperature treatment tank 22 and operates at 60 r/min. rotation speed.

The treated solution that contains sodium chloride crystal is fed into the first solid-liquid separation device 91 (a centrifugal machine) for solid-liquid separation, and then is eluted; thus, 2.606 m³ sixth mother liquid that contains 277.7 g/L NaCl, 91.7 g/L Na$_2$SO$_4$, 2.2 g/L NaOH and 0.66 g/L NH$_3$ is obtained per hour, and is temporarily stored in the first mother liquid tank 53. The obtained solid sodium chloride (1,202.7 kg filter cake of sodium chloride crystal with 15 mass % water content is obtained per hour, wherein the content of sodium sulfate is 3.1 mass % or lower) is eluted with 277.7 g/L sodium chloride solution in the same dry mass as the sodium chloride, and is dried in a drier, thus 1,022.3 kg sodium chloride (at 99.3 mass % purity) is obtained per hour; the seventh washing liquid obtained in the washing is returned by means of the eighth circulation pump 78 to the fifth heat exchange device 35.

The other part of waste water containing ammonium salts is fed at 0.859 m³/h feed rate and mixed with the sixth mother liquid in the first mother liquid tank 53 (wherein the concentration of NaCl is 241 g/L, and the concentration of $Na_2SO_4$ is 69 g/L); the sixth mother liquid exchanges heat with the seventh mother liquid in the third heat exchange device 33 via the sixth circulation pump 76, so that the temperature of the sixth mother liquid is decreased to 2.1° C.; then the sixth mother liquid is mixed with sodium sulfate crystal eluent and cooled circulating liquid, and the resultant mixture further exchanges heat with the refrigerating liquid in the sixth heat exchange device 36; then the mixture is fed into the cooling crystallization device 2 (a continuous cooling crystallization tank) for cooling crystallization, so that crystalline solution that contains sodium sulfate crystal is obtained. Wherein the temperature of the cooling crystallization is −2° C., and the time of the cooling crystallization is 130 min., the recirculated amount in the cooling crystallization is controlled to be 181 m³/h, and the degree of super-saturation of sodium sulfate in the cooling crystallization process is controlled so that it is not greater than 1.0 g/L.

The crystalline solution that contains sodium sulfate crystal, which is obtained in the cooling crystallization device 2, is fed into the second solid-liquid separation device 92 (a centrifugal machine) and treated by solid-liquid separation and elution; thus, 2.793 m³ sixth mother liquid that contains 299 g/L NaCl, 15.8 g/L $Na_2SO_4$, and 5.08 g/L $NH_3$ is obtained per hour, stored temporarily in the second mother liquid tank 54, and then returned to mix with the waste water containing ammonium salts to obtain waste water to be treated; the obtained sodium sulfate decahydrate crystal (wherein the content of sodium chloride is 3.0 mass % or lower) is eluted with 15.8 g/L sodium sulfate solution that is in the same dry mass as the sodium sulfate; so that 797.2 kg filter cake of sodium sulfate decahydrate crystal with 75 mass % water content at 98.6 mass % purity is obtained per hour.

In this embodiment, 6.012 m³ ammonia water at 1.39 mass % concentration is obtained per hour in the first ammonia water storage tank 51.

In addition, the tail gas discharged from the cooling crystallization device 2 and the second heat exchange device 32 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, and water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas. The MVR evaporation is initiated by charging steam at 143.3° C. temperature in the initial stage.

Embodiment 14

The waste water containing ammonium salts is treated with the method described in the embodiment 13, but: waste water containing ammonium salts that contains 68 g/L NaCl, 68 g/L $Na_2SO_4$, 25 g/L $NH_4Cl$, and 25.4 g/L $(NH_4)_2SO_4$ with pH=6.3 is treated, at 6.84 m³/h feed rate; a part of the waste water is fed at 5.0 m³/h feed rate and mixed with the seventh mother liquid returned by the ninth circulation pump 79 to obtain waste water to be treated, in which the molar ratio of $Cl^-$ to $SO_4^{2-}$ is 10.848; the remaining part of waste water containing ammonium salts is mixed with the sixth mother liquid in the first mother liquid tank 53 to obtain waste water to be treated, in which the concentration of NaCl is 237.85 g/L, and the concentration of $Na_2SO_4$ is 71.39 g/L.

The evaporation temperature is 100° C., the pressure is −22.83 kPa, and the amount of evaporation is 5.530 m³/h. The temperature of the cooling treatment is 20° C., and the time is 65 min. The temperature of the cooling crystallization is 0° C., and the time is 120 min.

755.64 kg filter cake of sodium chloride crystal with 14.5 mass % water content is obtained per hour in the first solid-liquid separation device 91, and finally 646.08 kg sodium chloride (at 99.2 mass % purity) is obtained per hour; 7.433 m³ sixth mother liquid at concentrations of 279.9 g/L NaCl, 88.9 g/L $Na_2SO_4$, 2.2 g/L NaOH, and 0.27 g/L $NH_3$ is obtained per hour.

2,531.56 kg filter cake of sodium sulfate decahydrate crystal with 74 mass % water content (at 98.3 mass % purity) is obtained per hour in the second solid-liquid separation device 92; 7.265 m³ first mother liquid at concentrations of 303.9 g/L NaCl, 17 g/L $Na_2SO_4$, and 3.86 g/L $NH_3$ is obtained per hour.

5.530 m³ ammonia water at 1.7 mass % concentration is obtained per hour in the first ammonia water storage tank 51, and the ammonia water may be reused in a zeolite production process.

Embodiment 15

The waste water containing ammonium salts is treated with the method described in the embodiment 13, but: waste water containing ammonium salts that contains 50 g/L NaCl, 100 g/L $Na_2SO_4$, 21 g/L $NH_4Cl$, and 42.69 g/L $(NH_4)_2SO_4$ with pH=6.7 is treated, at 9.39 m³/h feed rate; a part of the waste water is fed at 5.0 m³/h feed rate and mixed with the seventh mother liquid returned by the ninth circulation pump 79 to obtain waste water to be treated, in which the molar ratio of to $SO_4^{2-}$ is 11.640; the remaining part of waste water containing ammonium salts is mixed with the sixth mother liquid in the first mother liquid tank 53 to obtain waste water to be treated, in which the concentration of NaCl is 224.49 g/L, and the concentration of $Na_2SO_4$ is 62.84 g/L. After the heat exchange in the second heat exchange device 32, the temperature of the waste water to be treated is 105° C.

The evaporation temperature is 110° C., the pressure is 11.34 kPa, and the amount of evaporation is 5.999 m³/h. The temperature of the cooling treatment is 25° C., and the time is 60 min. The temperature of the cooling crystallization is −4° C., and the time is 120 min.

775.47 kg filter cake of sodium chloride crystal with 14 mass % water content is obtained per hour in the first solid-liquid separation device 91, and finally 666.90 kg sodium chloride (at 99.4 mass % purity) is obtained per hour; 13.876 m³ sixth mother liquid at concentrations of 279.7 g/L NaCl, 82.4 g/L Na$_2$SO$_4$, 2.2 g/L NaOH, and 0.23 g/L NH$_3$ is obtained per hour.

5,445.10 kg filter cake of sodium sulfate decahydrate crystal with 74.5 mass % water content (at 98.4 mass % purity) is obtained per hour in the second solid-liquid separation device 92; 13.900 m³ seventh mother liquid at concentrations of 295 g/L NaCl, 14.5 g/L Na$_2$SO$_4$, and 5.70 g/L NH$_3$ is obtained per hour.

5.999 m³ ammonia water at 2.6 mass % concentration is obtained per hour in the first ammonia water storage tank 51, and the ammonia water may be reused in a zeolite production process.

Embodiment 16

As shown in FIG. 9, waste water containing ammonium salts (containing 120 g/L NaCl, 48 g/L Na$_2$SO$_4$, 23 g/L NH$_4$Cl, 9.35 g/L (NH$_4$)$_2$SO$_4$, with pH=6.8) is fed at 8.40 m³/h feed rate into the pipeline of the treatment system, sodium hydroxide solution at 45.16 mass % concentration is introduced into the pipeline for first pH adjustment, and the adjusted pH value is monitored with the first pH measuring device 61 (a pH meter) (the measured value is 9.1); then 3.40 m³/h waste water containing ammonium salts is fed by means of the first circulation pump 71 into the first mother liquid tank 53 to mix with the sixth mother liquid, another part of waste water containing ammonium salts is fed into the first heat exchange device 31 to exchange heat with the condensate of the fourth ammonia-containing vapor, the remaining part of the waste water containing ammonium salts is mixed with the seventh mother liquid returned by the ninth circulation pump 79, and then is fed into the fifth heat exchange device 35 to exchange heat with the sixth mother liquid; next, the parts of waste water that have exchanged heat in the first heat exchange device 31 and the fifth heat exchange device 35 are merged to obtain waste water to be treated, wherein the temperature of the waste water to be treated is 80° C., the concentration of Cl$^-$ is 4.284 mol/L, the concentration of SO$_4^{2-}$ is 0.1945 mol/L, and the molar ratio of Cl$^-$/SO$_4^{2-}$ is 22.025; the waste water to be treated is fed into the pipeline of the second heat exchange device 32, sodium hydroxide solution at 45.16 mass % concentration is introduced into the pipeline for second pH adjustment, and the adjusted pH value is monitored with the second pH measuring device 62 (a pH meter) (the measured value is 11); next, the waste water to be treated is fed into the second heat exchange device 32 to exchange heat with the fourth ammonia-containing vapor, so that the temperature of the waste water to be treated is increased to 107° C.; finally, the waste water to be treated is fed into the first MVR evaporation device 1 (a falling film+forced circulation two-stage MVR evaporating crystallizer) for evaporation; thus, fourth ammonia-containing vapor and fourth concentrated solution that contains sodium chloride crystal and sodium sulfate crystal are obtained, the evaporation temperature is 100° C., the pressure is −22.83 kPa, and the amount of evaporation is 7.71 m³/h. After the fourth ammonium-containing vapor is compressed by the compressor 101 (the temperature is increased by 17° C.), it exchanges heat with the waste water to be treated and the waste water containing ammonium salts in the second heat exchange device 32 and the first heat exchange device 31 sequentially, so that ammonia water is obtained, and is stored in the first ammonia water storage tank 51. In addition, to improve the solid content in the first MVR evaporation device 1, a part of the liquid after the evaporation in the first MVR evaporation device 1 is circulated as circulating liquid by means of the seventh circulation pump 77 to the first MVR evaporation device 1 again for evaporation (the recirculation ratio is 154). The degree of the evaporation is monitored with the densitometer provided on the first MVR evaporation device 1, to control the concentration of sodium sulfate in the fourth concentrated solution after evaporation to be 0.9625 Y (51.3 g/L).

The fourth concentrated solution that contains sodium chloride crystal is fed into the first solid-liquid separation device 91 (a centrifugal machine) for solid-liquid separation, and then is eluted; thus, 9.81 m³ sixth mother liquid that contains 308.6 g/L NaCl, 51.3 g/L Na$_2$SO$_4$, 2.2 g/L NaOH and 0.17 g/L NH$_3$ is obtained per hour, and is temporarily stored in the first mother liquid tank 53. After the obtained solid sodium chloride (the content of sodium sulfate is 3.2 mass % or lower) is eluted with 308.6 g/L sodium chloride solution in the same dry mass as the sodium chloride, a part of the filter cake of sodium chloride crystal is used to prepare 308.6 g/L sodium chloride solution; 1,419.17 kg filter cake of sodium chloride crystal with 14 mass % water content is obtained per hour and dried in a drier; thus, 1,220.49 kg sodium chloride (at 99.5 mass % purity) is obtained per hour, and the washing liquid obtained in the washing is circulated by means of the eighth circulation pump 78 to a position before the second pH adjustment.

As described above, 3.40 m³/h waste water containing ammonium salts is mixed with the sixth mother liquid in the first mother liquid tank 53 (the measured concentration of NaCl is 260 g/L, and the measured concentration of Na$_2$SO$_4$ is 38.2 g/L), the sixth mother liquid is fed by the sixth circulation pump 76 and exchanges heat with the mixed solution of waste water containing ammonium salts and the seventh mother liquid in the fifth heat exchange device 35, and then exchanges heat with the seventh mother liquid in the third heat exchange device 33 so that the temperature of the sixth mother liquid is decreased to 0° C.; next, the sixth mother liquid is mixed with sodium sulfate crystal eluent and cooled circulating liquid, and the resultant mixture further exchanges heat with the refrigerating liquid in the sixth heat exchange device 36, and then is fed into the cooling crystallization device 2 (a consecutive freezing crystallization tank) for cooling crystallization, to obtain crystalline solution that contains sodium sulfate crystal. Wherein the temperature of the cooling crystallization is −4° C., and the time of the cooling crystallization is 125 min., the recirculated amount in the cooling crystallization is controlled to be 300 m³/h, and the degree of super-saturation of sodium sulfate in the cooling crystallization process is controlled so that it is not greater than 1.0 g/L.

The crystalline solution that contains sodium sulfate crystal, which is obtained in the cooling crystallization device 2, is fed into the second solid-liquid separation device 92 (a centrifugal machine) for solid-liquid separation, and then is eluted; thus, 11.60 m³ sixth mother liquid that contains 296 g/L NaCl, 14.5 g/L Na$_2$SO$_4$, and 2.93 g/L NH$_3$ is obtained per hour, and is stored temporarily in the second mother liquid tank 54; after the obtained sodium sulfate crystal (the content of sodium chloride is 3.1 mass % or lower) is eluted with 14.5 g/L sodium sulfate solution that is in the same dry mass as the sodium sulfate, 1,946.10 kg filter cake of sodium sulfate decahydrate crystal at 99.0 mass % purity with 75 mass % water content is obtained per hour.

In this embodiment, 7.71 m³ ammonia water at 1.0 mass % concentration is obtained per hour in the first ammonia water storage tank 51.

In addition, the tail gas discharged from the cooling crystallization device 2 and the second heat exchange device 32 is introduced by means of the vacuum pump 81 into the tail gas absorption tower 83 for absorption. The tail gas absorption tower 83 has circulating water in it, the circulating water is circulated in the tail gas absorption tower 83 under the action of the fourth circulation pump 74, and water is replenished to the tail gas absorption tower 83 by means of the third circulation pump 73 from the circulating water tank 82 at the same time; in addition, fresh water is replenished to the circulating water tank 82, and thereby the temperature and ammonia content of the service water of the vacuum pump 81 are decreased. Dilute sulfuric acid is further charged into the tail gas absorption tower 83 to absorb ammonia or the like in the tail gas. The MVR evaporation is initiated by charging steam at 143.3° C. temperature in the initial stage.

Embodiment 17

The waste water containing ammonium salts is treated with the method described in the embodiment 16, but: waste water containing ammonium salts that contains 68 g/L NaCl, 100 g/L $Na_2SO_4$, 24 g/L $NH_4Cl$, and 35.9 g/L $(NH_4)_2SO_4$ with pH=6.7 is treated, at 13.3 m³/h feed rate; 5.0 m³/h waste water containing ammonium salts is mixed with the seventh mother liquid returned by the ninth circulation pump 79 to obtain waste water to be treated, in which the molar ratio of $Cl^-$ to $SO_4^{2-}$ is 18.948; the remaining part of waste water containing ammonium salts is mixed with the sixth mother liquid in the first mother liquid tank 53 to obtain mixed solution, in which the concentration of NaCl is 247.0 g/L, and the concentration of $Na_2SO_4$ is 43.6 g/L.

The evaporation temperature is 75° C., the pressure is −72.75 kPa, and the amount of evaporation is 8.9 m³/h. The temperature of the cooling crystallization is −2° C., and the time is 120 min.

1,462.30 kg filter cake of sodium chloride crystal with 15 mass % water content is obtained per hour in the first solid-liquid separation device 91, and finally 1,242.96 kg sodium chloride (at 99.5 mass % purity) is obtained per hour; 25.58 m³ sixth mother liquid at concentrations of 305.1 g/L NaCl, 57.5 g/L $Na_2SO_4$, 0.80 g/L NaOH, and 0.35 g/L $NH_3$ is obtained per hour.

7269.86 kg filter cake of sodium sulfate decahydrate crystal with 74.5 mass % water content (at 99.1 mass % purity) is obtained per hour in the second solid-liquid separation device 92; 28.02 m³ seventh mother liquid at concentrations of 298.9 g/L NaCl, 15.7 g/L $Na_2SO_4$, and 5.11 g/L $NH_3$ is obtained per hour.

8.90 m³ ammonia water at 2.3 mass % concentration is obtained per hour in the first ammonia water storage tank 51, and the ammonia water may be reused in a zeolite production process.

Embodiment 18

The waste water containing ammonium salts is treated with the method described in the embodiment 16, but: waste water containing ammonium salts that contains 99 g/L NaCl, 101 g/L $Na_2SO_4$, 26 g/L $NH_4Cl$, and 27 g/L $(NH_4)_2SO_4$ with pH=6.9 is treated, at 12.15 m³/h feed rate; 5.0 m³/h waste water containing ammonium salts is mixed with the seventh mother liquid returned by the ninth circulation pump 79 to obtain waste water to be treated, in which the molar ratio of $Cl^-$ to $SO_4^{2-}$ is 16.938; the remaining part of waste water containing ammonium salts is mixed with the sixth mother liquid in the first mother liquid tank 53 to obtain mixed solution, in which the concentration of NaCl is 238.5 g/L, and the concentration of $Na_2SO_4$ is 47.1 g/L.

The evaporation temperature is 50° C., the pressure is −92.67 kPa, and the amount of evaporation is 8.76 m³/h; the temperature of the cooling crystallization is −4° C., and the time is 120 min.

1,788.93 kg filter cake of sodium chloride crystal with 14 mass % water content is obtained per hour in the first solid-liquid separation device 91, and finally 1,538.48 kg sodium chloride (at 99.5 mass % purity) is obtained per hour; 17.77 m³ sixth mother liquid at concentrations of 294.6 g/L NaCl, 65.7 g/L $Na_2SO_4$, 0.22 g/L NaOH, and 0.23 g/L $NH_3$ is obtained per hour.

6,113.15 kg filter cake of sodium sulfate decahydrate crystal with 74 mass % water content (at 98.9 mass % purity) is obtained per hour in the second solid-liquid separation device 92; 20.05 m³ seventh mother liquid at concentrations of 296.3 g/L NaCl, 14.6 g/L $Na_2SO_4$, and 5.6 g/L $NH_3$ is obtained per hour.

8.76 m³ ammonia water at 1.9 mass % concentration is obtained per hour in the first ammonia water storage tank 51, and the ammonia water may be reused in a zeolite production process.

While some preferred embodiments of the present invention are described above, the present invention is not limited in those embodiments. Those skilled in the art can make modifications and variations to the technical scheme of the present invention, including combination of technical features in any appropriate form, all these variations and combinations shall be deemed as the disclosure of the present invention, and fall into the scope of the present invention.

The invention claimed is:

1. A method for treating waste water containing ammonium salts, comprising:
   1) adjusting a pH value of the waste water to greater than 9, and evaporating the waste water to obtain an ammonia-containing vapor and a first concentrated solution, the waste water contains $NH_4^+$, $SO_4^{2-}$, $Cl^-$ and $Na^+$, wherein a molar ratio between $Cl^-$ and $SO_4^{2-}$ in the waste water is 2.15 or more, and sodium chloride crystals precipitate from the first concentrated solution,
   2) separating the first concentrated solution to obtain the sodium chloride crystals and a first liquid phase, and cooling the first liquid phase to obtain a crystalline solution and to precipitate sodium sulfate crystals from the crystalline solution; and
   3) separating the crystalline solution to obtain the sodium sulfate crystals and a second liquid phase.

2. The method according to claim 1, wherein a molar ratio between $Cl^-$ and $SO_4^{2-}$ in the waste water is 8 or more.

3. The method according to claim 1, wherein a molar ratio between $Cl^-$ and $SO_4^{2-}$ in the waste water is 9.5 or more.

4. The method according to claim 1, wherein the pH of the waste water is greater than 10.8.

5. The method according to claim 1, wherein, in the first liquid phase, a concentration of $SO_4^{2-}$ is 0.01 mol/L or higher, and a concentration of $Cl^-$ is 5.2 mol/L or lower.

6. The method according to claim 1, wherein, in step (1), sodium sulfate crystals precipitate from the first concentrated solution.

7. The method according to claim 6, further comprising cooling the first concentrated solution to a temperature between 13° C. to 100° C. to dissolve sodium sulfate crystal therein prior to step (2).

8. The method according to claim 7, wherein the first concentrated solution is cooled to a temperature of 12.9° C. to 35° C. for a duration of 45 minutes to 90 minutes.

9. The method according to claim 1, wherein, in the first concentrated solution obtained from step (1), the concentration of sodium sulfate 0.9 Y to 0.99 Y, Y being the saturation concentration of sodium sulfate in the first concentrated solution when both sodium sulfate and sodium chloride reach saturation.

10. The method according to claim 1, wherein, in the crystalline solution obtained from step (2), the concentration of sodium chloride is 095 X to 0.999 X, X being the saturated concentration of sodium chloride in the crystalline solution when both sodium sulfate and sodium chloride reach saturation.

11. The method according to claim 1, wherein, in step (1), evaporating the waste water is carried out at a temperature of 35° C. or above at a pressure of −98 kPa or above.

12. The method according to claim 1, wherein, in step (1), evaporating the waste water is carried out at a temperature of 95° C. to 110° C. at a pressure of −32 kPa to 12 kPa.

13. The method according to claim 1, wherein, in step (2), cooling the first liquid phase is carried out at a temperature of −21.2° C. to 12.5° C. for more than 5 minutes.

14. The method according to claim 1, wherein, in step (2), cooling the first liquid phase is carried out at a temperature of −10° C. to 0° C. for 90 minutes to 150 minutes.

\* \* \* \* \*